US012578965B2

(12) United States Patent
Al-Otoom et al.

(10) Patent No.: US 12,578,965 B2
(45) Date of Patent:     Mar. 17, 2026

(54) BIASED INDIRECT CONTROL TRANSFER PREDICTION

(71) Applicant: Apple Inc., Cupertino, CA (US)

(72) Inventors: Muawya M Al-Otoom, Lake Oswego, OR (US); Pruthivi Vuyyuru, San Jose, CA (US); Andrew H Lin, Mountain View, CA (US); Ian D Kountanis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 18/358,894

(22) Filed: Jul. 25, 2023

(65) Prior Publication Data

US 2025/0036416 A1     Jan. 30, 2025

(51) Int. Cl.
G06F 9/38          (2018.01)
G06F 12/0875     (2016.01)

(52) U.S. Cl.
CPC ........ G06F 9/3808 (2013.01); G06F 12/0875 (2013.01); G06F 2212/452 (2013.01)

(58) Field of Classification Search
CPC ..................................................... G06F 9/323
See application file for complete search history.

(56) References Cited

U.S. PATENT DOCUMENTS

| | | | |
|---|---|---|---|
| 5,142,634 A | 8/1992 | Fite et al. | |
| 5,287,467 A | 2/1994 | Blaner | |
| 5,644,779 A | 7/1997 | Song | |

| | | | | |
|---|---|---|---|---|
| 5,870,579 A | 2/1999 | Tan | | |
| 5,920,710 A | 7/1999 | Tan | | |
| 6,157,998 A | 12/2000 | Rupley, II | | |
| 6,240,510 B1 | 5/2001 | Yeh | | |
| 6,304,960 B1 | 10/2001 | Yeh | | |
| 6,308,322 B1 * | 10/2001 | Serocki | ............... | G06F 9/30061 |
| | | | | 712/240 |
| 6,430,682 B1 | 8/2002 | Dwyer, III | | |
| 6,571,331 B2 | 5/2003 | Henry et al. | | |

(Continued)

FOREIGN PATENT DOCUMENTS

| | | |
|---|---|---|
| CN | 102156634 A | 8/2011 |
| CN | 104423929 | 7/2017 |

(Continued)

OTHER PUBLICATIONS

International Search Report and the Written Opinion from International Application No. PCT/US2024/039396, dated Nov. 6, 2024, pp. 1-10.

(Continued)

*Primary Examiner* — Michael J Metzger
(74) *Attorney, Agent, or Firm* — Robert C. Kowert; Kowert, Hood, Munyon, Rankin & Goetzel, P.C.

(57)          ABSTRACT

A processor may include an indirect control transfer prediction circuit. During fetch of an indirect control transfer instruction from memory to an instruction cache of the processor, the indirect control transfer prediction circuit may predict whether the indirect control transfer instruction is biased. Responsive to a prediction that the indirect control transfer instruction is biased, the indirect control transfer prediction circuit may cause the indirect control transfer instruction to be executed as an unconditional direct control transfer instruction according to the predicted bias.

20 Claims, 30 Drawing Sheets

(56) References Cited

U.S. PATENT DOCUMENTS

| | | | |
|---|---|---|---|
| 7,302,556 B2 | 11/2007 | Ludden et al. | |
| 7,434,037 B2 | 10/2008 | Park et al. | |
| 7,809,933 B2 | 10/2010 | Levitan | |
| 7,814,298 B1 * | 10/2010 | Thaik | G06F 12/0875 |
| | | | 712/207 |
| 8,055,492 B2 | 11/2011 | Adir | |
| 8,521,996 B2 | 8/2013 | Henry et al. | |
| 9,122,487 B2 | 9/2015 | Golla | |
| 9,465,615 B2 | 10/2016 | Smeets et al. | |
| 9,489,203 B2 | 11/2016 | Dundas | |
| 9,529,595 B2 | 12/2016 | Lin | |
| 10,209,993 B2 | 2/2019 | Wang | |
| 10,235,173 B2 | 3/2019 | Rasale | |
| 10,379,858 B2 | 8/2019 | Branscome | |
| 10,747,539 B1 * | 8/2020 | Hakewill | G06F 12/0875 |
| 10,795,683 B2 | 10/2020 | Eickemeyer | |
| 10,866,805 B2 | 12/2020 | Grisenthwaite | |
| 10,901,484 B2 | 1/2021 | Blasco | |
| 11,061,677 B1 | 7/2021 | Seth | |
| 11,169,807 B2 | 11/2021 | Bhat et al. | |
| 11,269,638 B2 | 3/2022 | Zbiciak | |
| 11,379,240 B2 | 7/2022 | Al-Otoom | |
| 11,416,256 B2 | 8/2022 | Evers | |
| 11,449,343 B2 | 9/2022 | Gonion | |
| 11,809,874 B2 | 11/2023 | Schuchman et al. | |
| 12,067,399 B2 | 8/2024 | Kountanis et al. | |
| 2001/0032309 A1 | 10/2001 | Henry et al. | |
| 2002/0040429 A1 | 4/2002 | Dowling | |
| 2004/0003215 A1 | 1/2004 | Krimer | |
| 2004/0093485 A1 | 5/2004 | Nguyen et al. | |
| 2004/0210749 A1 * | 10/2004 | Biles | G06F 9/3848 |
| | | | 712/240 |
| 2004/0225866 A1 | 11/2004 | Williamson | |
| 2006/0026408 A1 | 2/2006 | Morris | |
| 2008/0059779 A1 | 3/2008 | Davis | |
| 2008/0077781 A1 | 3/2008 | Smith | |
| 2008/0162905 A1 | 7/2008 | Luick | |
| 2009/0249037 A1 | 10/2009 | Webber | |
| 2010/0031010 A1 | 2/2010 | Moyer | |
| 2010/0064123 A1 | 3/2010 | Zuraski et al. | |
| 2010/0274972 A1 | 10/2010 | Babayan et al. | |
| 2012/0079255 A1 * | 3/2012 | Combs | G06F 9/30061 |
| | | | 712/E9.045 |
| 2012/0124346 A1 | 5/2012 | Hardage | |
| 2013/0007425 A1 | 1/2013 | Cantin | |
| 2013/0067202 A1 | 3/2013 | Henry | |
| 2014/0156977 A1 | 6/2014 | Dechene | |
| 2014/0156978 A1 | 6/2014 | Al-Otoom | |
| 2014/0164748 A1 * | 6/2014 | Dundas | G06F 9/3804 |
| | | | 712/237 |
| 2014/0195790 A1 | 7/2014 | Merten | |
| 2015/0052338 A1 | 2/2015 | Kuwahara et al. | |
| 2015/0277916 A1 * | 10/2015 | Khartikov | G06F 9/3836 |
| | | | 712/205 |

| | | | |
|---|---|---|---|
| 2015/0363203 A1 | 12/2015 | Lipasti | |
| 2016/0026470 A1 | 1/2016 | Manoukian | |
| 2017/0075689 A1 | 3/2017 | Branscome | |
| 2017/0153894 A1 | 6/2017 | Hornung | |
| 2017/0322810 A1 | 11/2017 | Navada | |
| 2018/0101385 A1 | 4/2018 | Wang | |
| 2018/0173533 A1 | 6/2018 | Soundararajan et al. | |
| 2019/0004802 A1 | 1/2019 | Tarsa | |
| 2019/0004803 A1 | 1/2019 | Al Sheikh | |
| 2020/0110615 A1 | 4/2020 | Ishii et al. | |
| 2020/0151019 A1 | 5/2020 | Yu | |
| 2020/0167163 A1 | 5/2020 | Levenstein | |
| 2021/0240476 A1 | 8/2021 | Kountanis | |
| 2022/0113976 A1 | 4/2022 | Kothinti Naresh et al. | |
| 2022/0121446 A1 | 4/2022 | Mcdonald | |
| 2023/0244494 A1 | 8/2023 | Kountanis et al. | |
| 2023/0244495 A1 | 8/2023 | Schuchman et al. | |

FOREIGN PATENT DOCUMENTS

| | | |
|---|---|---|
| CN | 110321160 A | 10/2019 |
| CN | 113383320 A | 9/2021 |
| CN | 114637537 A | 6/2022 |
| EP | 2063355 | 9/2017 |
| JP | 6273718 | 2/2018 |
| WO | 2009-066063 | 5/2009 |
| WO | 2017-072615 | 5/2017 |

OTHER PUBLICATIONS

A. Seznec, et al., "A case for (partially) TAggged GEometric history length branch prediction", Retrieved from https://iilp.org/vol8/v8paper1.pdf, 2006 AI Access Foundation and Morgan Kaufmann Publishers, pp. 1-23.

A. Seznec, "A 256 Kbits L-TAGE branch predictor", Retrieved from https://www.irisa.fr/caps/people/seznec/L-TAGE.pdf, Journal of Instruction-Level Parallelism (JILP) Special Issue: The Second Championship Branch Prediction Competition (CBP-2) 9 (2007), 2007, pp. 1-6.

Biswa, "Lecture-10 (Branch Prediction) CS422-Spring 2018", Retrieved from https://www.cse.iitk.ac.in/users/biswap/CS422/L10-BP.pdf, 2018, pp. 1-16.

International Search Report and Written Opinion from PCT/US2023/011993, dated May 24, 2023, pp. 1-12.

U.S. Appl. No. 17/590,722, filed Feb. 1, 2022, Schuchman et al.

U.S. Appl. No. 17/590,719, filed Feb. 1, 2022, Kountanis, et al.

U.S. Appl. No. 18/358,890, filed Jul. 25, 2023, Duggal, et al.

U.S. Appl. No. 18/774,678, filed Jul. 16, 2024, Kountanis, et al.

Daniel A. Jimenez and Calvin Lin, "branch Path Re-Aliasing," Proceedings of the 4th Workshop on Feedback Directed and Dynamic Optimization (FDDO-4), pp. 1-10, 2001.

Office Action from TW Application No. 113127934, dated Apr. 9, 2025, pp. 1-9.

* cited by examiner

State Machine of a Bias Prediction Circuit

State Machine of an Instruction Prediction Circuit

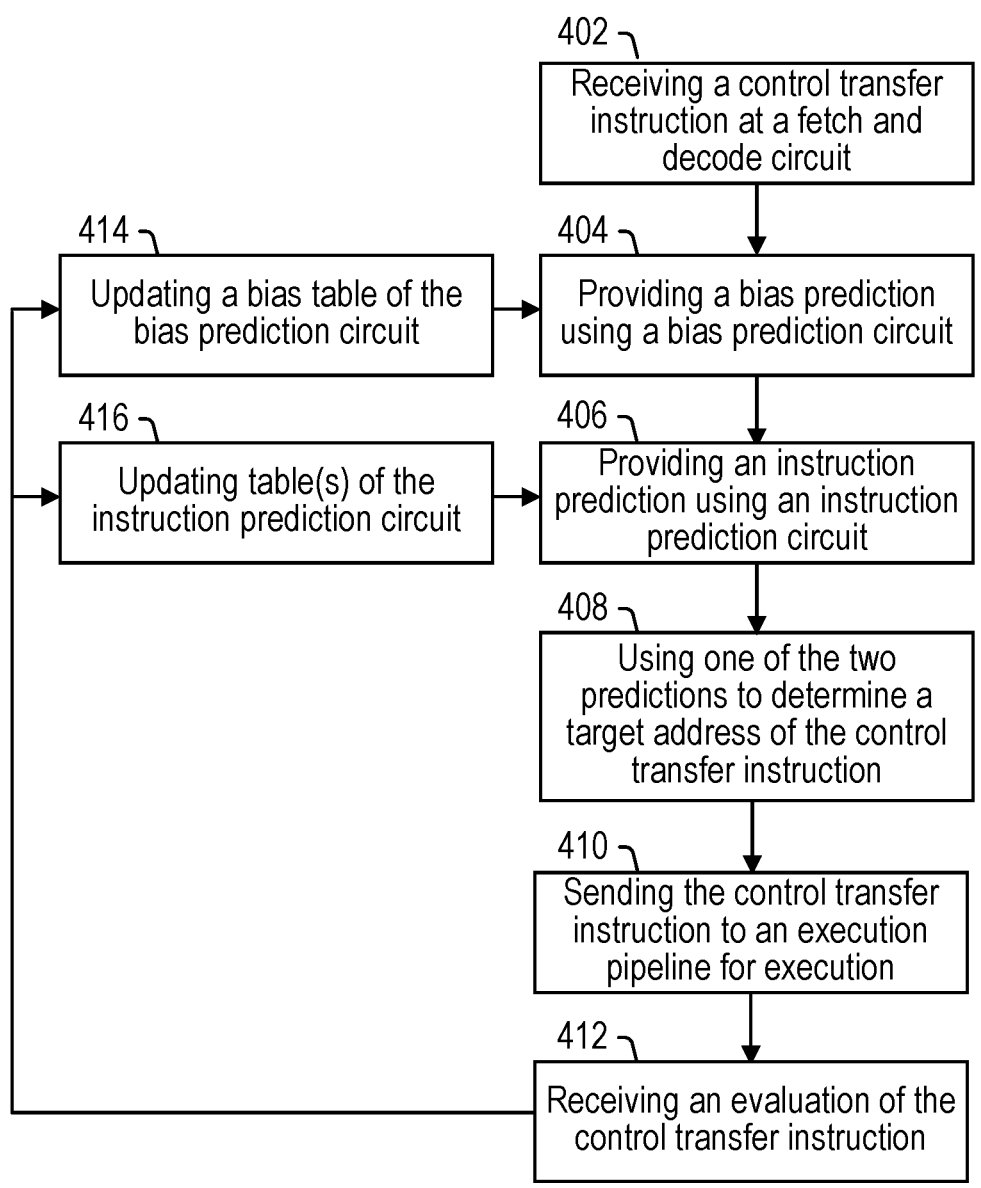

402 ⌐
Receiving a control transfer instruction at a fetch and decode circuit

414 ⌐
Updating a bias table of the bias prediction circuit

404 ⌐
Providing a bias prediction using a bias prediction circuit

416 ⌐
Updating table(s) of the instruction prediction circuit

406 ⌐
Providing an instruction prediction using an instruction prediction circuit 408 ⌐
Using one of the two predictions to determine a target address of the control transfer instruction 410 ⌐
Sending the control transfer instruction to an execution pipeline for execution 412 ⌐
Receiving an evaluation of the control transfer instruction

FIG. 4

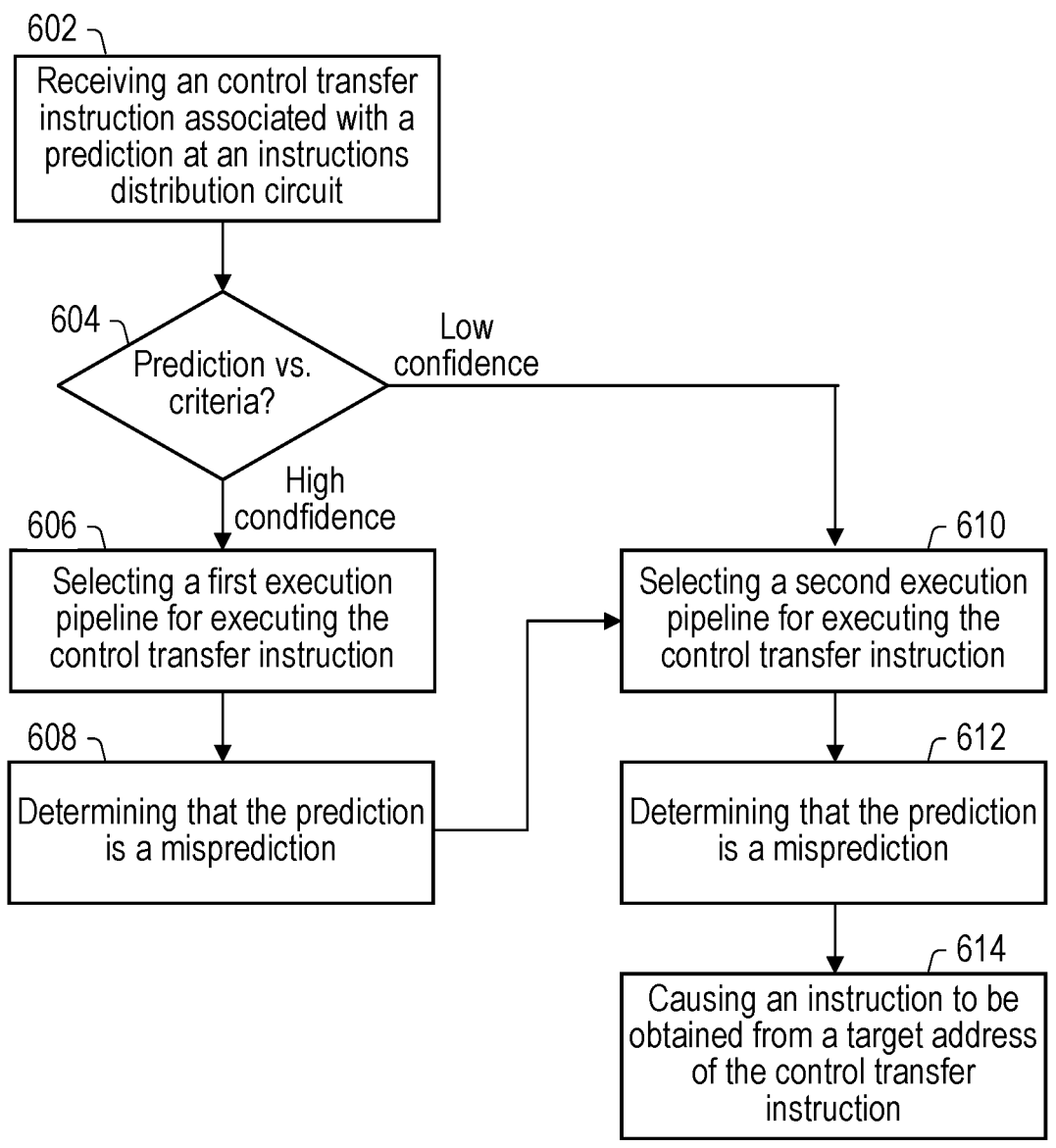

602
Receiving an control transfer instruction associated with a prediction at an instructions distribution circuit 604
Prediction vs. criteria?

Low confidence

High condfidence

606
Selecting a first execution pipeline for executing the control transfer instruction 608
Determining that the prediction is a misprediction 610
Selecting a second execution pipeline for executing the control transfer instruction 612
Determining that the prediction is a misprediction 614
Causing an instruction to be obtained from a target address of the control transfer instruction

FIG. 6

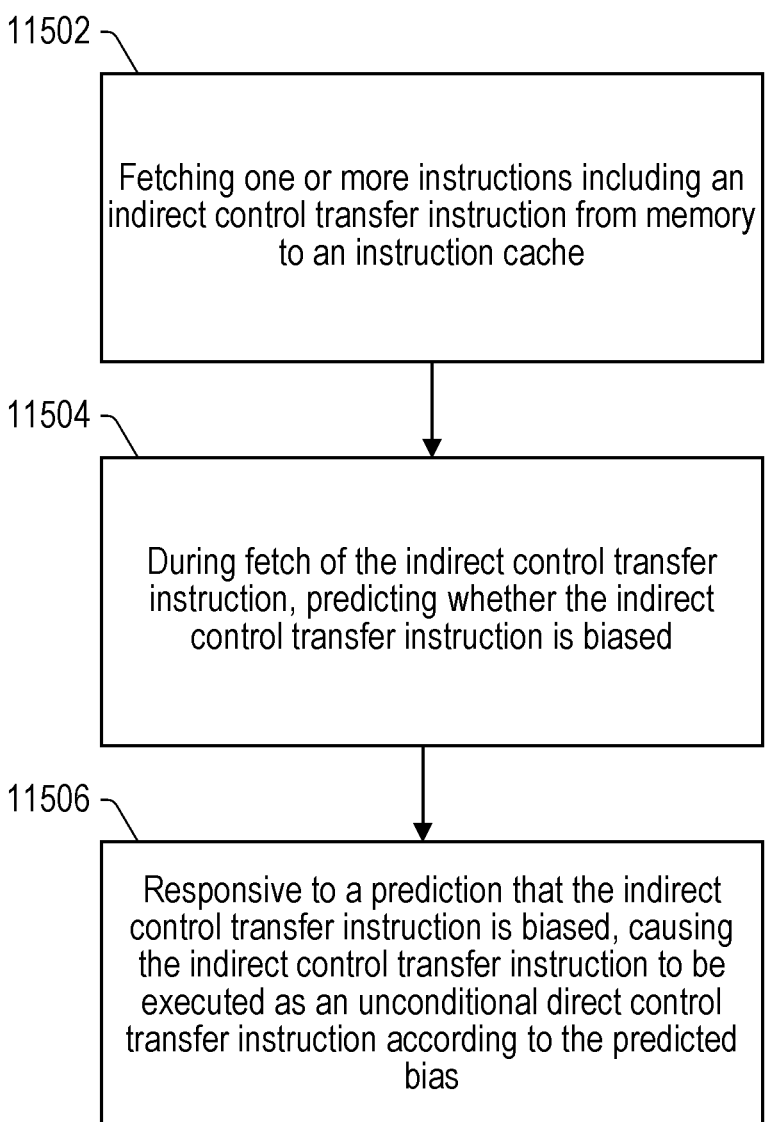

11502

Fetching one or more instructions including an indirect control transfer instruction from memory to an instruction cache

11504

During fetch of the indirect control transfer instruction, predicting whether the indirect control transfer instruction is biased

11506

Responsive to a prediction that the indirect control transfer instruction is biased, causing the indirect control transfer instruction to be executed as an unconditional direct control transfer instruction according to the predicted bias

FIG. 15

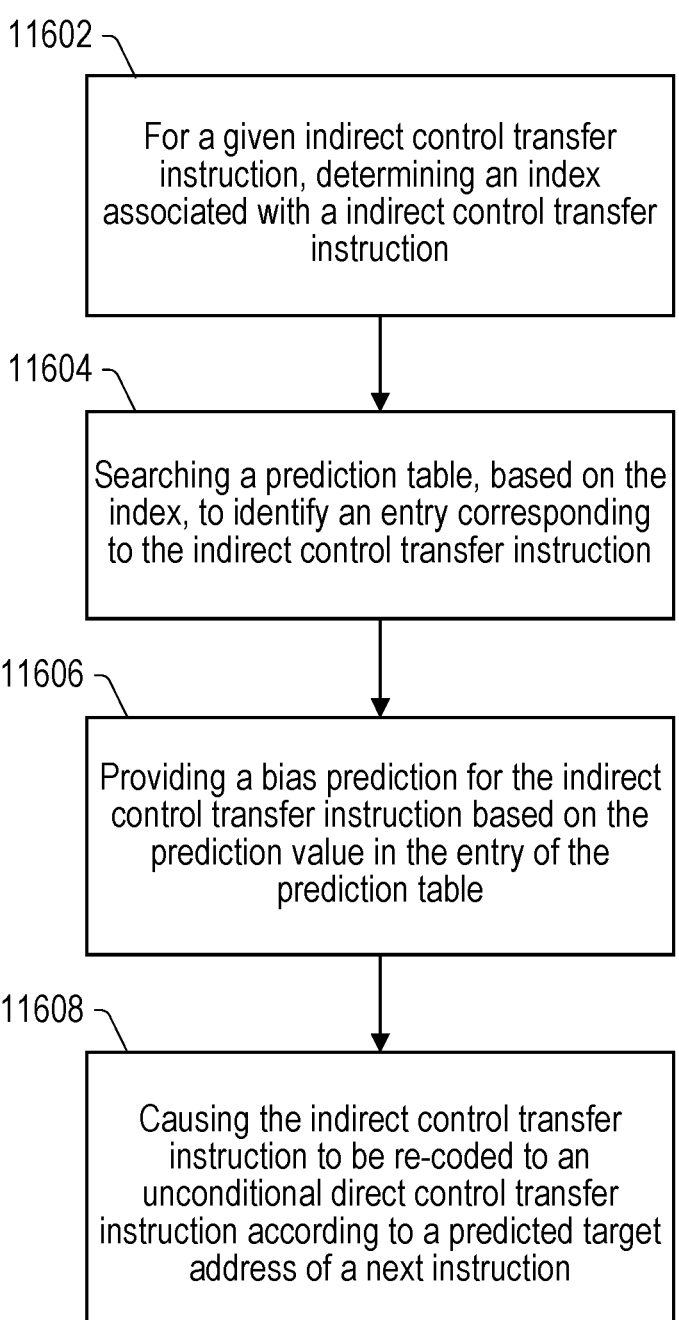

11602
For a given indirect control transfer instruction, determining an index associated with a indirect control transfer instruction 11604
Searching a prediction table, based on the index, to identify an entry corresponding to the indirect control transfer instruction 11606
Providing a bias prediction for the indirect control transfer instruction based on the prediction value in the entry of the prediction table 11608
Causing the indirect control transfer instruction to be re-coded to an unconditional direct control transfer instruction according to a predicted target address of a next instruction

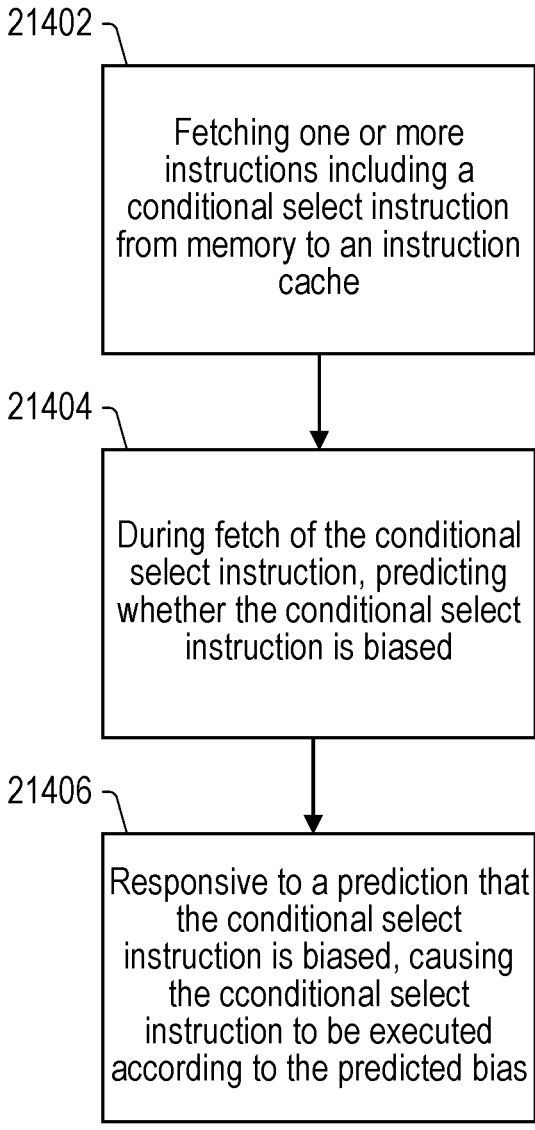

Fetching one or more instructions including a conditional select instruction from memory to an instruction cache

21404

During fetch of the conditional select instruction, predicting whether the conditional select instruction is biased

21406

Responsive to a prediction that the conditional select instruction is biased, causing the cconditional select instruction to be executed according to the predicted bias

FIG. 24

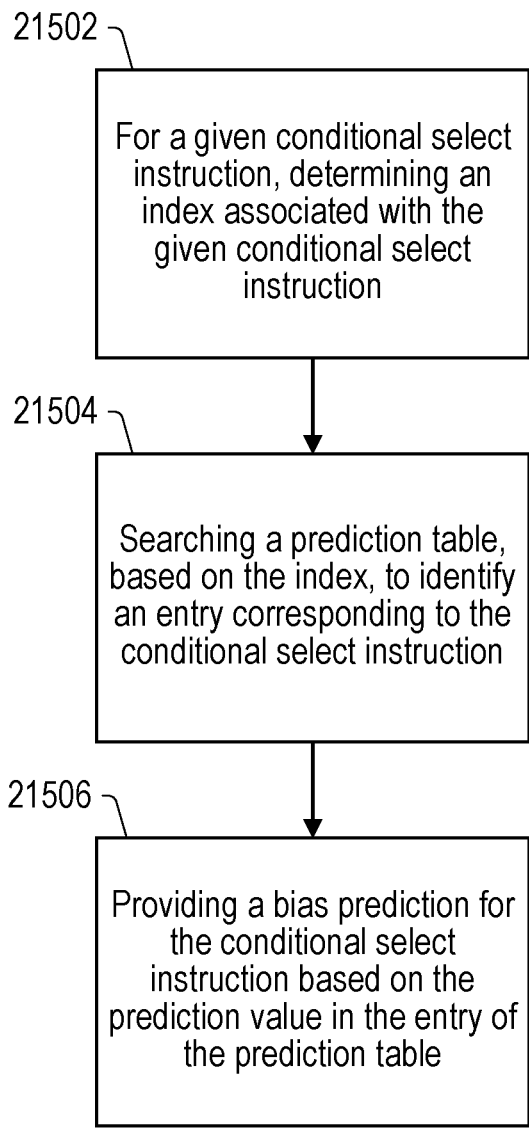

21502

For a given conditional select instruction, determining an index associated with the given conditional select instruction

21504

Searching a prediction table, based on the index, to identify an entry corresponding to the conditional select instruction

21506

Providing a bias prediction for the conditional select instruction based on the prediction value in the entry of the prediction table

FIG. 25

BIASED INDIRECT CONTROL TRANSFER PREDICTION

BACKGROUND

Technical Field

Embodiments described herein are related to a processor and, more particularly, to a processor including circuit(s) for predicting the bias of indirect control transfer instructions and/or processing indirect control transfer instructions according to the predictions.

Description of the Related Art

Computing systems generally include one or more processors that serve as central processing units (CPUs). The CPUs execute the control software (e.g., an operating system) that controls operation of the various peripherals. The CPUs can also execute applications, which provide user functionality in the system. Sometimes, a processor may implement an instruction pipeline that includes multiple stages, where instructions are divided into a series of steps individually executed at the corresponding stages of the pipeline. As a result, the instruction pipeline can execute multiple instructions in parallel. To improve efficiency, the processor may further implement a control transfer prediction circuit (also called "control transfer predictor") that can predict the execution path of control transfer instructions. Based on the predictions, the processor may speculatively fetch instructions from target addresses for execution. However, if a biased control transfer instruction is mis-predicted, the speculative work has to be discarded and the processor may have to re-fetch instructions from the correct target addresses for execution. Therefore, accuracy of the predictions of biased control transfer instructions can play a critical role in performance of processors and it thus becomes desirable to have techniques to improve the prediction accuracy. Moreover, with the increase of width and depth of execution pipelines, a processor may process multiple biased control transfer instructions and/or mispredictions in a cycle. Therefore, it is also desirable to have techniques to improve efficiency of biased control transfer instructions processing in processors.

BRIEF DESCRIPTION OF THE DRAWINGS

The following detailed description refers to the accompanying drawings, which are now briefly described.

FIG. 4 is a flowchart illustrating one embodiment of operations of a processor including a bias prediction circuit and an instruction prediction circuit.

FIG. 6 is a flowchart illustrating one embodiment of operations of a processor including an instruction distribution circuit and a plurality of execution pipelines.

FIG. 15 is a flowchart illustrating one embodiment of operations of a processor including an indirect control transfer prediction circuit.

FIG. 16 is a flowchart illustrating another embodiment of operations of a processor including an indirect control transfer prediction circuit.

FIG. 24 is a flowchart illustrating one embodiment of operations of a processor including a control transfer prediction circuit.

FIG. 25 is a flowchart illustrating another embodiment of operations of a processor including a control transfer prediction circuit.

Figure 1:
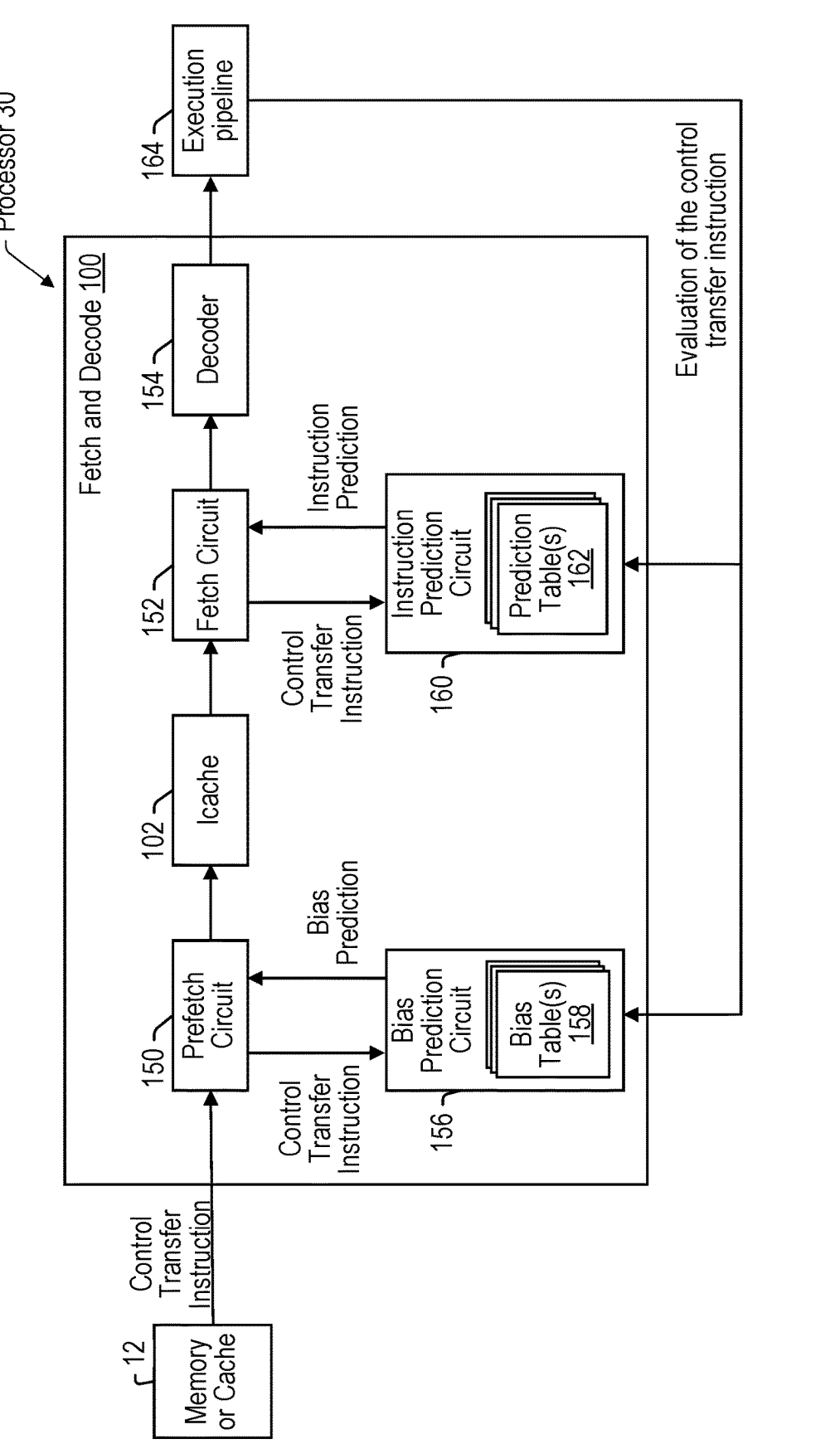
FIG. 1 is a block diagram of one embodiment of a portion of a processor including a bias prediction circuit and an instruction prediction circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Biased Direct Control Transfer Prediction

Figure 9:
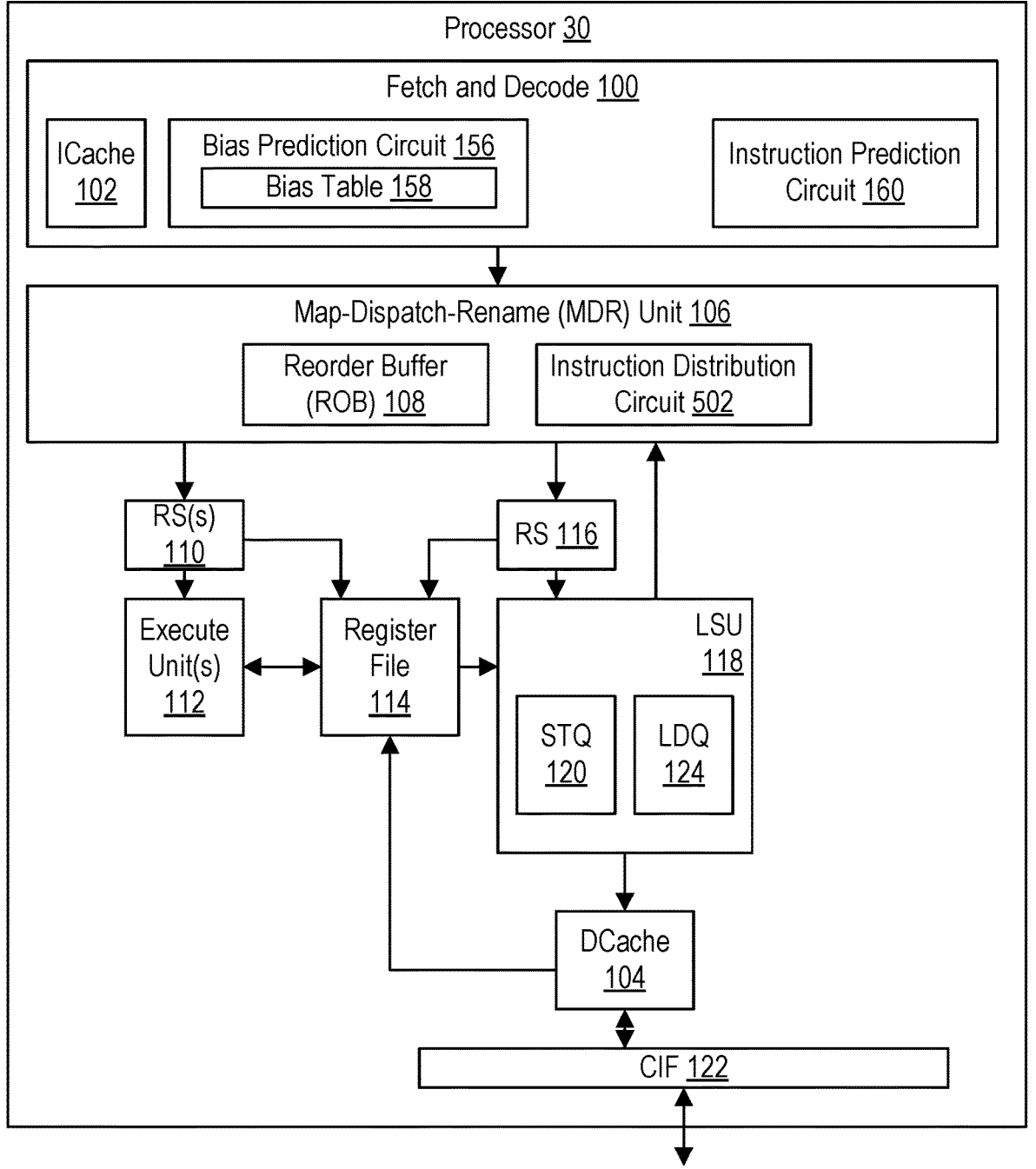
FIG. 9 is a block diagram of one embodiment of a processor shown in FIGS. 1-8 that includes a bias prediction circuit, an instruction prediction circuit, and/or an instruction distribution circuit.

Turning now to FIG. 1, a block diagram of one embodiment of a portion of a processor 30 including a bias integer, floating point, and/or vector execution unit) and associated reservation station 110 that are described in FIG. 9. Also, for purposes of illustration, FIG. 1 may not necessarily depict all the components of the processor 30. For example, sometimes the fetch and decode circuit 100 may not necessarily be directly coupled to the execution pipeline 164. Instead, there may be one or more other components in-between. For example, sometimes the processor 30 may include a map-dispatch-rename (MDR) unit 106 between the fetch and decode circuit 100 and the execution pipeline 164, which may map the operation(s) and/or micro-operation(s) to speculative resources (e.g., physical registers) to permit out-of-order and/or speculative execution, and may dispatch the operation(s) and/or micro-operation(s) to the reservation stations 110.

Execution of a code including a biased control transfer instruction may depend on the condition of the biased control transfer instruction. When the condition of the biased control transfer instruction is true, a first instruction from a first target address may be loaded, fetched and executed. Conversely, when the condition of the biased control transfer instruction is false, a second instruction from a second target address may be loaded, fetched and executed. For purposes of illustration, below is an example code including a biased control transfer instruction:

```
================================================================
if (a > b) // the control transfer instruction
{
    x = 1; // the instruction to be executed when the condition is true
}
else
{
    x = 2; // the instruction to be executed when the condition is false
}
================================================================
``` prediction circuit 156 and an instruction prediction circuit 160 is shown. In the illustrated embodiment, the bias prediction circuit 156 and the instruction prediction circuit 160 may be implemented as part of a fetch and decode circuit 100 of the processor 30. Alternatively, in some other embodiments, the bias prediction circuit 156 and/or the instruction prediction circuit 160 may be implemented as component(s) separate from the fetch and decode circuit 100.

As indicated in FIG. 1, in the illustrated embodiment, the fetch and decode circuit 100 may implement a pipeline having several stages. For example, to process an instruction, the fetch and decode circuit 100 may first use a prefetch circuit 150 to load the instruction from memory or cache 12 to an instruction cache (Icache) 102 (hereinafter named the "prefetch" stage). Next, the instruction may be fetched by a fetch circuit 152 from the Icache 102 to a decoder 154 for decoding (hereinafter named the "fetch" stage). The decoder 154 may decode the instruction, convert it to operation(s) and/or micro-operation(s) (hereinafter called the "decoding" stage), and send the operation(s) and/or micro-operation(s) to an execution pipeline 164 for execution. Note that sometimes an instruction may already exist in the Icache 102, e.g., when the Icache 102 stores an instruction in Icache 102 that was previously loaded from memory or cache 12. In that case, the prefetch stage may be avoided, and the instruction may be fetched directly from the Icache 102 for execution. In the illustrated embodiment, the execution pipeline 164 may be implemented using an execution unit 112 (e.g., an In this example, the control transfer instruction involves a comparison between the values of two variables "a" and "b." If the comparison of the control transfer instruction is true (i.e., the value of "a" is greater than the value of "b"), a first instruction from a first target address may be executed to assign the value of the variable "x" to 1. Conversely, if the comparison of the control transfer instruction is false (i.e., the value of "a" is less than or equal to the value of "b"), a second instruction from a second target address may be executed to assign the value of the variable "x" to 2.

As used herein, a "biased control transfer instruction" refers to a control transfer instruction that (a) depends on a condition, typically involving a comparison, that is not guaranteed to be known with certainty (i.e., remains speculative) until the instruction actually executes (for example, whether the control transfer instruction is taken or not taken, the target address of the control transfer instruction, and/or any other aspect of the control transfer instruction that may remain speculative prior to execution) and (b) based on actual execution behavior (i.e., dynamically, as opposed to statically), is treated as an unconditional control transfer instruction during a period of time.

That is, when a control transfer instruction is dynamically designated as "biased" (or equivalently, in a "biased state"), this is a prediction that the control transfer instruction will behave unconditionally in a consistent manner for a period of time.

It is noted that designating a control transfer instruction as biased is a dynamic form of prediction that is dependent upon runtime behavior of the instruction, not a static prediction that could be performed independently of instruction execution (e.g., at compile time).

In some embodiments, a control transfer instruction that is initially not designated as biased could transition to a biased state based on its execution behavior the first time it is encountered. For example, if the control transfer instruction is a conditional control transfer instruction that is initially taken, it may be designated as biased, and thereafter treated as an unconditional taken branch. If on some later occasion, the control transfer instruction is determined to be not taken when executed, it may transition to an unbiased state. In other embodiments, other criteria may be used to determine the transition into and out of the biased state. For example, the behavior of multiple instances of instruction execution may be considered before transitioning into or out of the biased state. Thus, for the period of time between when a control transfer instruction is designated as biased until this designation is removed, the control transfer instruction may be treated as unconditional. During this period, other forms of prediction, if available, may not be utilized. Once a control transfer instruction is no longer in a biased state, other types of predictors may be used to predict the instruction's behavior.

In the illustrated embodiment, the fetch and decode circuit 100 may speculatively process conditional, biased control transfer instructions. For example, the fetch and decode circuit 100 may predict the execution path of a control transfer instruction prior to the (actual) execution of the control transfer instruction and, based on the prediction, speculatively determine a target address of a subsequent instruction for execution. As described above, the target address may reside in memory or cache 12, or Icache 102. Further, as illustrated in the foregoing example, the subsequent instruction may or may not be immediately next to the biased control transfer instruction. To improve efficiency, the fetch and decode circuit 100 may further use the bias prediction circuit 156 with one or more bias tables 158 to provide a bias prediction whether the control transfer instruction is biased true or biased false. When a control transfer instruction is predicted to be biased true or biased false, the fetch and decode circuit 100 may use the bias prediction from the bias prediction circuit 156 to process the biased control transfer instruction. Conversely, when the control transfer instruction is predicted not to be biased true or biased false, the fetch and decode circuit 100 may use instruction prediction circuit 160 with one or more prediction table(s) 162 to provide another prediction, such as an instruction prediction, of whether the comparison of the control transfer instruction is true or false and use the instruction prediction to speculatively process the control transfer instruction.

In the illustrated example, the bias prediction circuit 156 and instruction prediction circuit 160 may perform respective predictions at different stages of the processing of a control transfer instruction in the fetch and decode circuit 100. For example, in the illustrated embodiment, the bias prediction circuit may provide the bias prediction for a control transfer instruction at the prefetch stage when the instruction is loaded from the memory or cache 12 to the Icache 102. By comparison, in the illustrated embodiment, the instruction prediction circuit 160 may provide the instruction prediction at a relatively "later" stage, such as the fetch stage when the control transfer instruction is fetched from the Icache 102 to the decoder 154. Note that the above is provided only as an example for purposes of illustration. In some embodiments, the bias prediction circuit 156 and instruction prediction circuit 160 may provide their respective predictions around the same time, e.g., both at the same stage such as the prefetch stage, the fetch stage, etc.

Sometimes, when a control transfer instruction is predicted to be biased true or biased false, the fetch and decode circuit 100 may simply cause the instruction to "bypass" the instruction prediction circuit 160. In other words, the instruction prediction circuit 160 may not necessarily provide the second prediction such as the instruction prediction. Alternatively, sometimes the fetch and decode circuit 100 may still use the instruction prediction circuit 160 to provide the instruction prediction. However, when the biased control transfer instruction is predicted to be biased true or biased false, the fetch and decode circuit 100 may ignore the instruction prediction from the instruction prediction circuit 160, and instead use the bias prediction from the bias prediction circuit 156 to speculatively process the biased control transfer instruction as described above.

In the illustrated embodiment, the bias prediction from the bias prediction circuit 156 and the instruction prediction from the instruction prediction circuit 160 may indicate different properties of a control transfer instruction. Also, they may be generated in different ways, as described in FIGS. 2-3. In the illustrated embodiment, the bias prediction from the bias prediction circuit 156 may indicate whether or not a control transfer instruction is predicted to be biased (e.g., biased true or biased false). A control transfer instruction being biased refers to the scenario where the condition of a biased control transfer instruction is always true or false. For example, if the condition is always true, the condition of the biased control transfer instruction is considered biased true. Conversely, if it is always false, the condition is considered biased false. Referring back to the bias prediction, when the condition of a biased control transfer instruction is predicted to be biased true (or biased false), it means that the condition of the instruction is predicted to be always true (or always false), and accordingly the instruction is presumed to behave always one way (or another). By comparison, the instruction prediction from the instruction prediction circuit 160 may indicate whether the condition of a control transfer instruction is predicted to be true or false. However, unlike the bias prediction, the instruction prediction may not necessarily indicate whether the control transfer instruction is biased true or biased false, or in other words, always true or always false.

Note that the bias prediction and the instruction prediction are merely predictions. Thus, either of them may be erroneous. In the illustrated embodiment, the quality of the predictions may be determined after the control transfer instruction is executed, e.g., by the execution pipeline 164. Consider the foregoing example code, once values of the operands (e.g., the variables "a" and "b") are obtained, and the operator (e.g., the comparator ">") is applied to the operands, the processor 30 may be able to determine whether the condition of the biased control transfer instruction is actually true or false, and accordingly evaluate whether the bias prediction and/or the instruction prediction is correct. In the illustrated embodiment, the bias prediction circuit 156 and/or the instruction prediction circuit 160 may be updated based on the evaluation of the instruction. For example, when the bias prediction and/or the instruction prediction is a misprediction, the bias table(s) 158 of the bias prediction circuit 156 and/or the prediction table(s) 162 of the instruction prediction circuit 160 may be updated.

When a misprediction occurs, the processor 30 may have to discard the speculative work and get another instruction from the correct target address for execution. For example, the execution pipeline 164 may discard the instruction in the execution pipe that was speculatively fetched, and the fetch and decode circuit 100 may have to redirect the prefetch circuit 150 and/or the fetch circuit 152 to obtain the instruction from the correct target address for execution (also called re-fetch). Sometimes, this can cause additional delays to operations of the processor 30. However, in practice, most control transfer instructions may be biased instructions. Thus, even with the above penalty caused by mispredictions, use of the additional bias prediction circuit may still increase the overall efficiency of the processor 30, especially if the processor 30 allows predictively-biased control transfer instructions to "bypass" the instruction prediction circuit 160, this may greatly reduce the overall workload and improve efficiency of the processor 30.

Figure 2A:
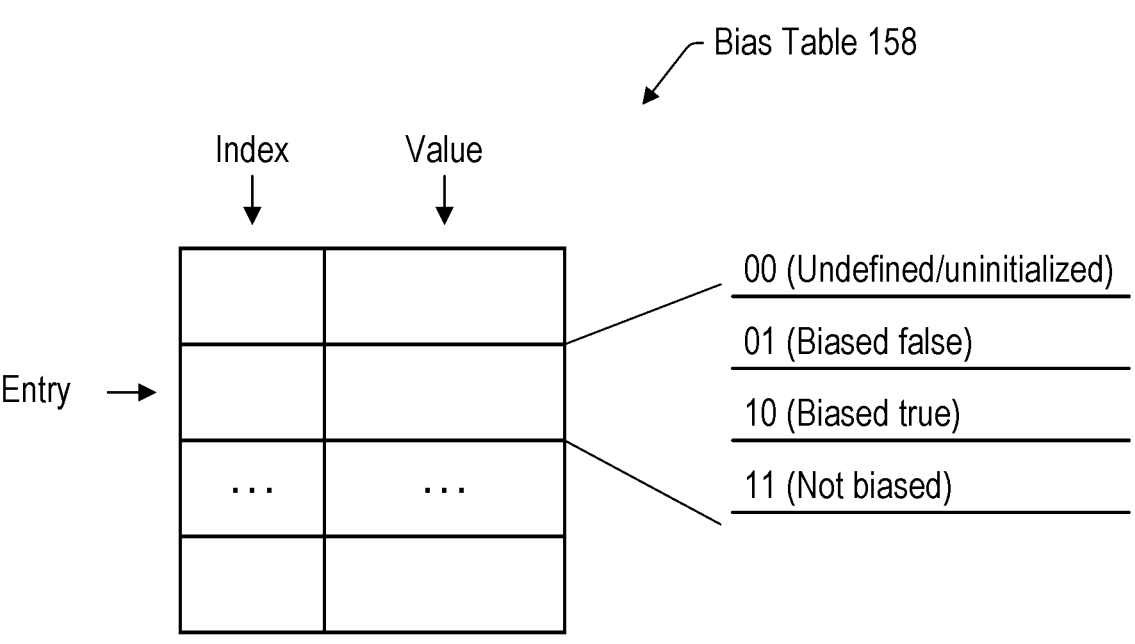
FIG. 2A shows one embodiment of a bias table of a bias prediction circuit.

In the illustrated embodiment, the bias prediction circuit 156 may use a bias table 158 to provide the bias prediction for a control transfer instruction. FIG. 2A shows an example bias table 158. In the figure, the bias table 158 may be organized into one or more entries, where each entry may be identified by a corresponding index and include a corresponding value. In the illustrated embodiment, the indices of the bias table 158 may be associated with addresses of biased control transfer instructions. For example, the indices may be created by hashing the addresses of biased control transfer instructions using a hash function. In the context of hashing, the addresses of the instructions may be considered the "keys," and the values in the entries may be considered the "values," two of which may be associated via the indices (and the hash function). Accordingly, for a given instruction, the bias prediction circuit 156 may identify a value in a corresponding entry of the bias table 158 (e.g., the "value") based on the address of the instruction (e.g., the "key"), and then provide a bias prediction for the instruction based on the identified value in the bias table 158. For example, when the bias prediction circuit 156 receives a control transfer instruction, the bias prediction circuit 156 may obtain the address of the instruction, e.g., from the program counter (PC). The bias prediction circuit 156 may determine an index based on the address of the instruction, e.g., using the hash function. The bias prediction circuit 156 may then use the index to search the bias table 158 to find an entry matching the index, identify the value in the entry, and use the value to determine the bias prediction for the instruction. Note that sometimes the indices of the bias table 158 may be subject to hashing collision, e.g., a phenomenon where different addresses of different instructions may be hashed into an identical index. In other words, different keys may correspond to the same value in the bias table 158. Sometimes, the hashing collision may cause mispredictions for control transfer instructions.

In FIG. 2A, in the illustrated embodiment, the values in the bias table 158 may be 2-bit values indicating different predictions as to the biasness of a biased control transfer instruction. For example, in some embodiments a value "00" may indicate that no control transfer instruction corresponding to the entry of this value has been encountered before by the bias prediction circuit 156 while in other embodiments a value "00" may indicate that control transfer instruction corresponding to the entry of this value does not have a prediction of bias. A value "01" may indicate that the condition of a biased control transfer instruction is biased false. A value "10" may indicate that the condition of a biased control transfer instruction is biased true. And a value "11" may indicate that the condition of a biased control transfer instruction is not biased (e.g., neither biased true nor biased false), albeit the control transfer instruction corresponding to the entry of this value has been encountered before by the bias prediction circuit 156. Note that the bias table 158 in FIG. 2A is provided only as an example for purposes of illustration. In some embodiments, the values in the bias table 158 may have less or more bits and may use any number of value encodings. For example, sometimes the values may have more than two bits to provide a certain level of hysteresis. Furthermore, the bias prediction circuit 156 may use different bias tables 158 for different purposes, where the different bias tables use different encodings, such as discussed below in FIG. 12.

In the illustrated embodiment, the instruction prediction circuit 160 may also use one or more prediction table(s) 162 to predict the instruction prediction of a biased control transfer instruction. However, unlike the bias prediction circuit 156, at least some of the prediction table(s) 162 may be heavily associated with the previous prediction history (e.g., by the instruction prediction circuit 160) and/or evaluation history of control transfer instructions. Further, sometimes the history may involve history of the specific control transfer instruction, but also history of other control transfer instructions in the same code. For example, sometimes the instruction prediction circuit 160 may be a TAgged GEometric length predictor (also called the TAGE predictor) that includes a basic predictor T0 and a set of (partially) tagged predictors Ti ($1 \leq i \leq M$). The basic predictor T0 may use a basic prediction table 162(0) to provide a basic prediction. In the illustrated embodiment, the indices of the basic prediction table 162(0) may be generated by hashing the addresses of control transfer instructions. By comparison, the tagged predictors Ti ($1 \leq i \leq M$) may each have a prediction table 162(i) ($1 \leq i \leq M$), whose indices may be created by hashing (a) the addresses of control transfer instructions and (b) the previous prediction and/or evaluation history of the control transfer instructions. The history may be considered a geometric series. For example, the addresses of the control transfer instructions may be concatenated with the history, and then the two may be hashed together to generate the indices. The prediction tables 162(i) of different tagged predictors Ti ($1 \leq i \leq M$) may be associated with different history lengths. For example, the higher the order of a tagged predictor (e.g., the larger the i), the longer the history may be used to generate the indices for the prediction table 162(i) of the tagged predictor Ti ($1 \leq i \leq M$). Accordingly, the tagged predictor Ti ($1 \leq i \leq M$) may use their respective prediction tables 162(i) ($1 \leq i \leq M$) to provide a respective prediction for a control transfer instruction. Sometimes, the hashing functions for the bias table 158 of the bias prediction circuit 156 and the basic prediction table 162(0) of the instruction prediction circuit 160 may be different. Further, sometimes the hashing functions for the different prediction tables 162(i) of the different predictors Ti ($0 \leq i \leq M$) may be also different. In addition, the hashing functions described above may be implemented based on any appropriate hashing functions, including exclusive or (XOR) operations.

In the illustrated embodiment, for a given control transfer instruction, to provide an instruction prediction, the instruction prediction circuit 160 may determine the indices for the respective (M+1) predictors ($0 \leq i \leq M$) based on the address of the control transfer instruction and history (for tagged predictors only), identify a matching predictor with the longest history (e.g., with the highest order), and use the prediction from the matched predictor as the (final) instruction prediction for the control transfer instruction. According to the above description, it can be seen that the instruction prediction circuit 160 may be more complicated than the bias prediction circuit 156 and thus consume more time to make a prediction. Thus, use of the additional bias prediction circuit 156 to allow predictively-biased control transfer instructions to "bypass" the instruction prediction circuit 160 may reduce the overall workload and improve efficiency of the processor 30.

Figure 2B:
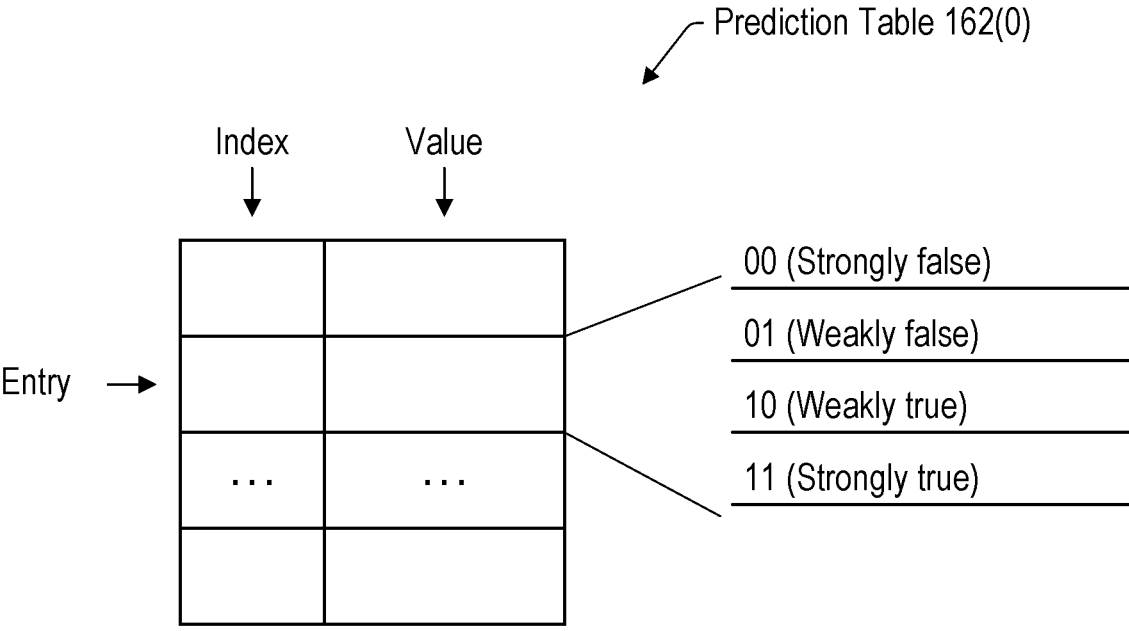
FIG. 2B shows one embodiment of a basic table of an instruction prediction circuit.

FIG. 2B shows an example basic prediction table 162(0) of the instruction prediction circuit 160. For purposes of illustration, the basic prediction table 162(0) is provided also as an example to illustrate the prediction tables 162(i) of the tagged predictors Ti (1≤i≤M). In the illustrated embodiment, the prediction tables 162(i) of the tagged predictors Ti (1≤i≤M) may be similar to the basic prediction table 162(0), e.g., also provide a value at each entry, but further include additional information such as the history-related geometric series. In addition, the basic prediction table 162(0) may also illustrate distinctions between the bias prediction circuit 156 and the instruction prediction circuit 160. As indicated in FIG. 2B, in the illustrated embodiment, the values in the basic prediction table 162(0) may be 2-bit values. For example, a value "00" may indicate that the condition of a control transfer instruction is strongly false. A value "01" may indicate that the condition of a control transfer instruction is weakly false. A value "10" may indicate that the condition of a control transfer instruction is weakly true. A value "11" may indicate that the condition of a control transfer instruction is strongly true. Thus, the values in the prediction table 162(0) of the instruction prediction circuit 160 may not necessarily indicate the bias of a control transfer instruction, but only whether it is true or false with certain relativity. For example, the value "00" may indicate that a control transfer instruction is predictively more likely to be false, compared to the value "01." Similarly, the value "11" may indicate that control transfer instruction is predictively more likely to be true, compared to the value "10." Note that the basic prediction table 162(0) in FIG. 2B is provided only as an example for purposes of illustration. In some embodiments, the values in the basic prediction table 162(0) and/or the prediction tables 162(i) of the tagged predictors Ti (1≤i≤M) may have less or more bits and may use any number of different encoding values.

Figure 3A:
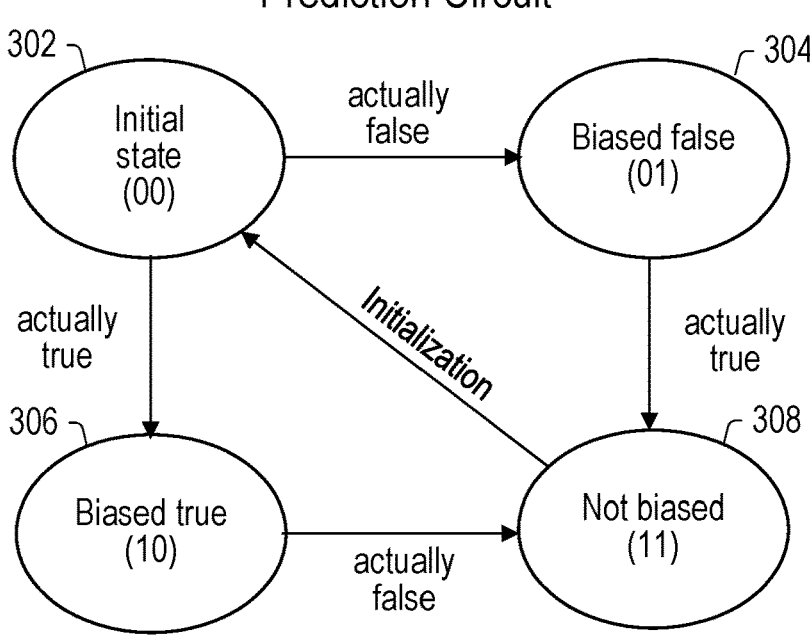
FIG. 3A is a block diagram of one embodiment of operations of a bias prediction circuit.
Figure 3B:
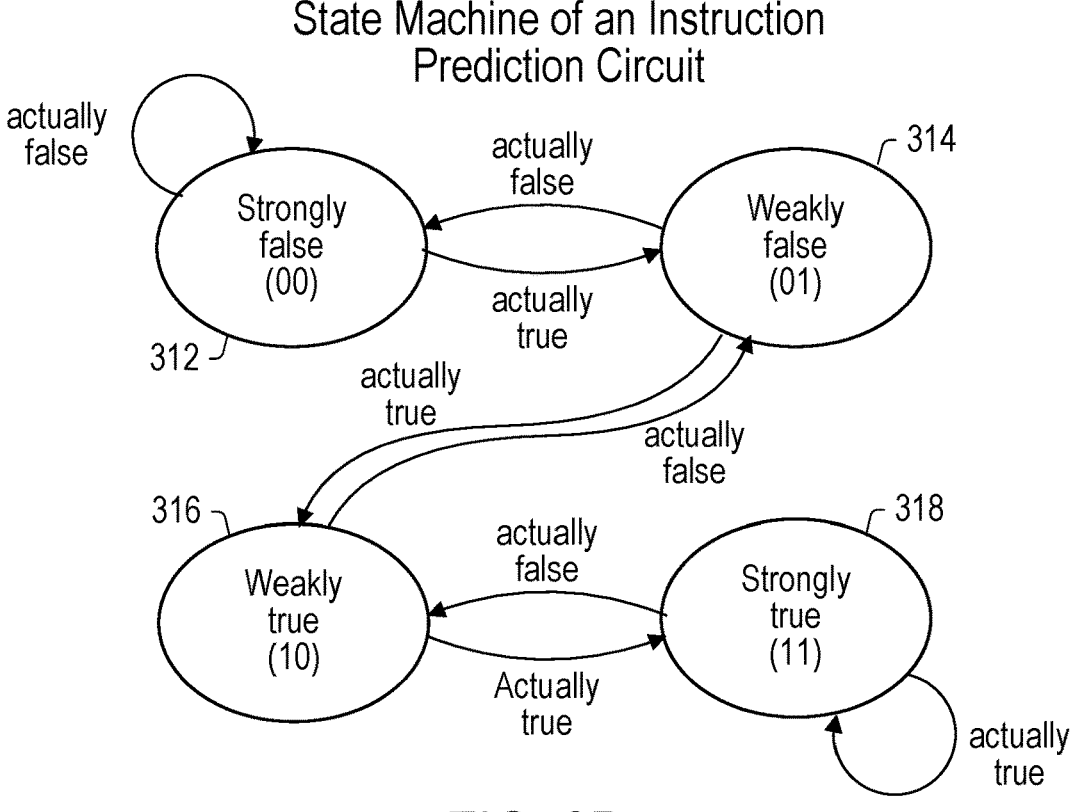
FIG. 3B is a block diagram of one embodiment of operations of an instruction prediction circuit.

Turning now to FIGS. 3A and 3B, state machines of the bias prediction circuit 156 and instruction prediction circuit 160 are shown to illustrate operations of the respective prediction circuits. As indicated in FIG. 3A, the circles 302, 304, 306, and 308 may correspond to the four possible predictions in the bias table 158 of the bias prediction circuit 156 in FIG. 2A. Similarly, in FIG. 3B, the circles 312, 314, 316, and 318 may correspond to the four possible predictions in the prediction table(s) 162 of the instruction prediction circuit 160 in FIG. 2B. Further, the edges connecting the circles in the respective tables may indicate the change of the values at update.

Referring back to FIG. 3A, in the illustrated embodiment, the value "00" may be designed as an initial state or default value for control transfer instructions. For example, at start-up, the value for a control transfer instruction in the bias table 158 may be set as the default value "00." When a control transfer instruction is loaded from memory or cache 12 to Icache 102 for the first time, assuming that there is no hash collision yet with respect to the control transfer instruction, it may be the first time for the bias prediction circuit 156 to encounter a control transfer instruction that corresponds to an entry of the control transfer instruction in the bias table 158. Accordingly, the value for the control transfer instruction in the bias table 158 may be "00" (e.g., corresponding to the circle 302). Because the value "00" does not indicate that the comparison of the control transfer instruction is biased true or bias false, the fetch and decode circuit 100 may further use the instruction prediction circuit 160 to provide a second prediction, such as an instruction prediction, for the control transfer instruction. Alternatively, when a control transfer instruction is loaded from memory or cache 12 to Icache 102 for the first time, the value for the control transfer instruction in the bias table 158 may be set to an initial state indicating a biased or unbiased condition, thus allowing a value of '00' to be used for another purpose, in some embodiments.

As described above, the instruction prediction circuit 160 may use the prediction table(s) 162 to provide the instruction prediction. In the illustrated embodiment, similarly, the processor 30 may designate one of the four possible states as the initial state or default value for the control transfer instruction. For purposes of illustration, it is assumed that the initial state or default value for the control transfer instruction is "10" (e.g., corresponding to the circle 316), indicating that the condition is predicted as weakly true. According to the instruction prediction from the instruction prediction circuit 160, the fetch and decode circuit 100 may determine a target address based on which a subsequent instruction may be speculatively obtained for execution. Consider the foregoing example code including the control transfer instruction "if (a>b)." Since the control transfer instruction is predicted to be "weakly true," the fetch and decode circuit 100 may speculatively obtain the subsequent instruction "x=1" for execution.

After execution of the instruction, e.g., in the execution pipeline 164, the comparison of the control transfer instruction may be actually determined, and the bias prediction from the bias prediction circuit 156 and the instruction prediction from the instruction prediction circuit 160 may be evaluated according to the outcome of the execution of the control transfer instruction. In the illustrated embodiment, the bias table 158 of the bias prediction circuit 156 and/or the prediction table(s) 162 of the instruction prediction circuit 160 may get updated based on the evaluation. For example, when the evaluation turns out that the comparison of the control transfer instruction is actually true, it may mean that the previous bias prediction from the bias prediction circuit 156 (which is the initial state or default value "00") is a misprediction. Accordingly, in the bias table 158, the value for the control transfer instruction may change from "00" (e.g., initial state) to "10" (e.g., biased true). In FIG. 3A, this is illustrated by the change from the circle 302 (e.g., corresponding to "00") to the circle 306 (e.g., corresponding to "10"). By comparison, the evaluation of the control transfer instruction may confirm that the previous instruction prediction from the instruction prediction circuit 160 is not a misprediction. Accordingly, in the prediction table(s) 162, the value(s) for the control transfer instruction may change from "10" (e.g., weakly true) to "11" (e.g., strongly true), representing that the instruction prediction circuit 160 gets a reward. In FIG. 3B, this is illustrated by the change from the circle 316 (e.g., corresponding to "10") to the circle 318 (e.g., corresponding to "11").

Conversely, when the evaluation of the control transfer instruction turns out that the comparison of the control transfer instruction is actually false, it means that the previous bias prediction from the bias prediction circuit 156 is a misprediction. Accordingly, in the bias table 158, the value for the control transfer instruction may change from "00" (e.g., initial state) to "01" (e.g., biased false). In FIG. 3A, this is illustrated by the change from the circle 302 (e.g., corresponding to "00") to the circle 304 (e.g., corresponding to "01"). Also, the evaluation of the control transfer instruction may indicate that the previous instruction prediction from the instruction prediction circuit 160 is also a misprediction. Accordingly, in the prediction table(s) 162, the value(s) for the control transfer instruction may change from "10" (e.g., weakly true) to "01" (e.g., weakly true), representing that the instruction prediction circuit 160 get a penalty. In FIG. 3B, this is illustrated by the change from the circle 316 (e.g., corresponding to "10") to the circle 314 (e.g., corresponding to "01").

As indicated in FIG. 3A, once being updated to the value "10" (e.g., biased true) or "01" (e.g., biased false), the value of the control transfer instruction in the bias table 158 may stay at "10" or "01" until a misprediction occurs. In other words, once the value for a control transfer instruction in the bias table 158 gets updated from the initial state, the bias prediction circuit 156 may refrain from changing it to another value until a misprediction happens. From an operational perspective, it means that the bias prediction circuit 158 may unconditionally predict the execution path of the control transfer instruction in the same manner, until an evaluation of the control transfer instruction indicates that the bias prediction is a misprediction. When such a misprediction occurs, the value of the control transfer instruction in the bias table 158 may be updated from "10" or "01" to "11" (e.g., not biased). In FIG. 3A, this is illustrated by the change from the circle 304 (e.g., corresponding to "01") or 306 (e.g., corresponding to "10") to the circle 308 (e.g., corresponding to "11"). In addition, once being updated to the value "11," the value of the control transfer instruction in the bias table 158 may stay at "11" (e.g., not biased) until the prediction circuit 156 resets the value to the initial state or default value "00."

As indicated in FIG. 3B, the value(s) of the control transfer instruction in the prediction table(s) 162 may change from one value to another at update, depending on whether the instruction prediction circuit 160 gets a reward or penalty. For example, when an evaluation of the control transfer instruction confirms that the instruction prediction from the instruction prediction circuit 160 is not a misprediction, the instruction prediction circuit 160 may receive a reward to change the value(s) of the control transfer instruction in the prediction table(s) 162 from a relatively weaker prediction to a relatively stronger prediction (e.g., from weakly true to strongly true, or from weakly false to strongly false), or remain at the relatively stronger prediction (e.g., strongly true or strongly false). Conversely, when an evaluation of the control transfer instruction indicates that the instruction prediction from the instruction prediction circuit 160 is a misprediction, the instruction prediction circuit 160 may receive a penalty to change the value(s) of the control transfer instruction in the prediction table(s) 162 from a relatively stronger prediction to a relatively weaker prediction (e.g., from strongly true to weakly true, or from strongly false to weakly false), or even from a relatively weaker prediction to an opposite relatively weaker prediction (e.g., from weakly true or weakly false, or vice versa). Note that in the illustrated embodiment, the value for a control transfer instruction in the prediction table(s) 162 may not change from one relatively stronger prediction directly to an opposite relatively stronger prediction (e.g., from strongly true to strongly false, or vice versa). Thus, the prediction table(s) 162 may be considered to have a certain level of hysteresis.

Further, as described above, when the condition of a control transfer instruction is predicted to be biased true or biased false, e.g., when the value for the control transfer instruction in the bias table 158 is "10" or "01", the fetch and decode circuit 100 may use the bias prediction from the bias prediction 156 to speculatively process the control transfer instruction. Conversely, when the condition of a control transfer instruction is predicted not to be biased true or biased false, e.g., when the value for the control transfer instruction in the bias table 158 is "00" or "11", the fetch and decode circuit 100 may use the instruction prediction from the instruction prediction circuit 160 to speculatively process the control transfer instruction.

In the illustrated embodiment, the bias table 158 and/or the prediction table(s) 162 may be implemented using one or more registers. In addition, the fetch and decode circuit 100 may encode the bias prediction from the bias prediction circuit 156 and/or the instruction prediction from the instruction prediction circuit 160 in the instruction line that contains the control transfer instruction. For example, the fetch and decode circuit 100 may append the value (e.g., the 2-bit value) for the control transfer instruction from the bias table 158 and/or the prediction table(s) 162 to the machine code of the instruction line that includes the control transfer instruction at the front, back, or in the middle. Alternatively, the fetch and decode circuit 100 may recode the machine code of the instruction line that includes the control transfer instruction to embed the prediction(s) for the control transfer instruction. For example, the fetch and decode circuit 100 may change the values of one or more bits of the machine code. Accordingly, when the instruction with the appended value is received at the Icache 102 and/or the decoder 154, the Icache 102 and/or the decoder 154 may recognize the prediction(s) of the control transfer instruction, and speculatively process the control transfer instruction based on the prediction(s) as described above.

In the illustrated embodiment, when a control transfer instruction is predicted to be biased true or biased false, sometimes the fetch and decode circuit 100 may cause the control transfer instruction to "bypass" the instruction prediction circuit 160. In the illustrated embodiment, to implement the "bypass," the fetch and decode circuit 100 may recode the control transfer instruction to a non-control transfer instruction. As a result, the instruction prediction circuit 160 may treat the control transfer instruction as a non-control transfer instruction, and thus may not necessarily provide an instruction prediction for the recoded control transfer instruction.

As described above, the bias prediction circuit 156 and/or the instruction prediction circuit 160 may mis-predict control transfer instructions. As a result, the bias prediction circuit 156 and/or the instruction prediction circuit 160 may get saturated. For example, when a code is executed by the processor 30 for a relatively long time, the bias prediction circuit 156 may experience sufficient mispredictions for one or more control transfer instructions of the code. As a result, the values for the control transfer instructions in the bias table 158 may change to the value "11." As described above, once the values change to "11," they may remain as "11" until reset. Thus, to resolve the saturation, in the illustrated embodiment, the bias prediction circuit 156 and/or the instruction prediction circuit 160 may respectively detect occurrence of a saturation, and responsively reset the bias table 158 and/or the prediction table(s) 162. For example, the bias prediction circuit 156 may monitor the number of values "11" in the bias table 158. When it reaches a specified threshold, e.g., a specified percentage, the bias prediction circuit 156 may determine that the bias table 158 has saturated. As a result, the bias prediction circuit 156 may reset those values "11" to the initial state "00." Sometimes, the bias prediction circuit 156 may also reset other values in the bias table 158, e.g., the entire bias table 158, to the initial state "00" as well.

Turning now to FIG. 4, a flowchart illustrating one embodiment of operations of a processor 30 including a bias prediction circuit 156 and an instruction prediction circuit 160 is shown. In the illustrated embodiment, a control transfer instruction may be received at a fetch and decode circuit 100, as indicated in block 402. As described above, the control transfer instruction may be loaded from the memory or cache 12 to the Icache 102, or fetched from the Icache 102 to the decoder 154. The fetch and decode circuit 100 may use the bias prediction circuit 156 to provide a bias prediction whether the comparison of the control transfer instruction is biased true or biased false, as indicated in block 404. In the illustrated embodiment, the bias prediction circuit 156 may make the bias prediction using the bias table 158, as indicated in block 404. As described above, when the comparison of the control transfer instruction is predicted to be biased true or biased false, it represents that the bias prediction circuit 156 predicts that the comparison of the control transfer instruction is always true or always false.

When the bias prediction from the bias prediction circuit 156 predicts that the comparison of the control transfer instruction is not biased true or biased false, the fetch and decode circuit 100 may use the instruction prediction circuit 160 to provide an instruction prediction whether the comparison of the control transfer instruction is true or false, as indicated in block 406. As described above, in the illustrated embodiment, the instruction prediction circuit 160 may be a TAGE predictor having a total of (M+1) predictors, such as a basic predictor T0 with a basic prediction table 162(0) and one or more additional (partially) tagged predictors Ti with respective prediction tables 162(i) (1≤i≤M). The prediction tables 162(i) of the tagged predictors Ti (1≤i≤M) may be associated with a history-related geometric series of a respective history length.

As described above, in the illustrated embodiment, when the bias prediction circuit 156 predicts that the comparison of the control transfer instruction is biased true or biased false, the fetch and decode circuit 156 may cause the control transfer instruction to "bypass" the instruction prediction circuit 160. As a result, the operations in block 406 may be avoided. For example, the fetch and decode circuit 100 may recode the control transfer instruction to a non-control transfer instruction. Further, as described above, in the illustrated embodiment, the bias prediction from the bias prediction circuit 156 and the instruction prediction from the instruction prediction circuit 160 may be provided as different stages of processing the control transfer instruction in the fetch and decode circuit. For example, the bias prediction circuit 156 may provide the bias prediction at the prefetch stage when the control transfer instruction is loaded from the memory or cache 12 to Icache 102, while the instruction prediction circuit 160 may perform the instruction prediction at the fetch stage when the control transfer instruction is fetched from the Icache 102 to the decoder 154.

In the illustrated embodiment, the fetch and decode circuit 100 may use one of the bias prediction from the bias prediction circuit 156 and the instruction prediction from the instruction prediction circuit 160 to speculatively determine a target address for the control transfer instruction, as indicated in block 408. For example, the fetch and decode circuit 100 may speculatively determine a target address of the control transfer instruction from which a subsequent instruction may be obtained for execution, according to the bias prediction from the bias prediction circuit 156 or the instruction prediction from the instruction prediction circuit 160.

In the illustrated embodiment, the fetch and decode circuit 100 may send the control transfer instruction to the execution pipeline 164 for execution, as indicated in block 410. Further, the fetch and decode circuit 100 may receive an evaluation of the control transfer instruction based on an outcome of the execution of the control transfer instruction, as indicated in block 412. As described above, the execution of the control transfer instruction may determine whether the comparison of the control transfer instruction is actually true or false, and accordingly whether the previous bias prediction from the bias prediction circuit 156 and/or the previous instruction prediction from the instruction prediction circuit 160 is a misprediction.

In the illustrated embodiment, the bias prediction circuit 156 and/or the instruction prediction circuit 160 respectively update their bias table 158 and prediction table(s) 162 based on the evaluation of the control transfer instruction, as indicated in block 414 and 416. As described above in FIGS. 2-3, the update of the bias table 158 may change the value for the control transfer instruction from an initial state such as "00" to "01" (e.g., indicating biased false) or "10" (e.g., indicating biased true) respectively when the evaluation indicates that the comparison of the control transfer instruction is actually true or false, or change the value from "01" or "10" to "11" (e.g., indicating not biased) when the evaluation indicates that the previous biased true or biased false prediction is actually a misprediction. By comparison, the instruction prediction circuit 160 may update the value(s) for the control transfer instruction in the prediction table(s) 162(i) of the basic and tagged predictors Ti (0≤i≤M) from a relatively weaker prediction to a relatively stronger prediction (e.g., from weakly true "10" to strongly true "11," or from weakly false "01" to strongly false "00"), or remain the value at the relatively stronger prediction (e.g., strongly true "11" or strongly false "00"), when the evaluation confirms that the instruction prediction from the instruction prediction circuit 160 is not a misprediction; or from a relatively stronger prediction to a relatively weaker prediction (e.g., from strongly true "11" to weakly true "10," or from strongly false "00" to weakly false "01"), or from a relatively weaker prediction to an opposite relatively weaker prediction (e.g., from weakly true "10" or weakly false "01," or vice versa), when the evaluation indicates that the instruction prediction from the instruction prediction circuit 160 is a misprediction.

Figure 5:
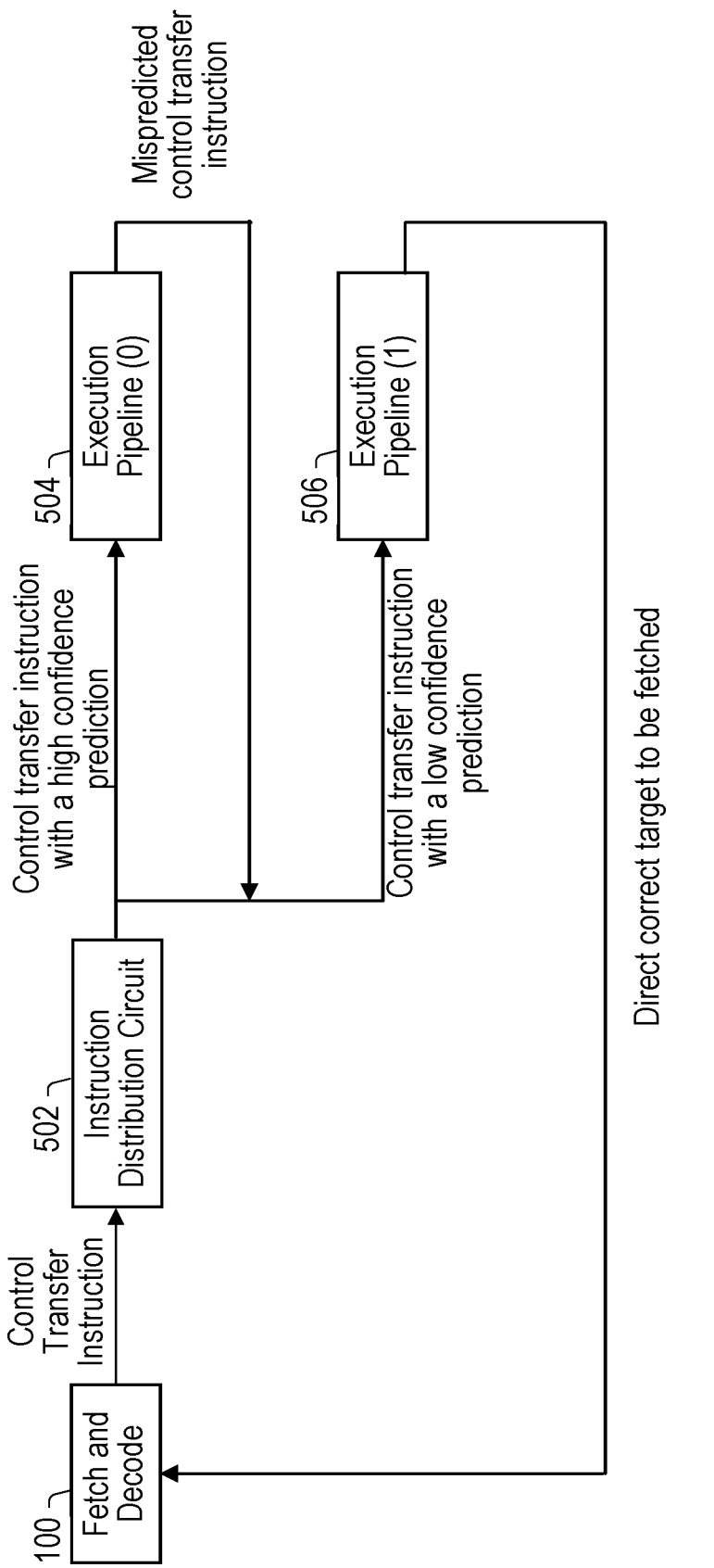
FIG. 5 is a block diagram of one embodiment of a portion of a processor including an instruction distribution circuit and a plurality of execution pipelines.

Turning now to FIG. 5, a block diagram of one embodiment of a portion of a processor 30 including an instruction distribution circuit 520 and execution pipelines 504 and 506 is shown. In FIG. 5, the instruction distribution circuit 520 may receive a control transfer instruction associated with a prediction from the fetch and decode circuit 100, and distribute the control transfer instruction to one of the plurality of execution pipelines such as 504 and 506 according to a confidence level of the prediction of the control transfer instruction. When it is determined that the control transfer instruction has a relatively high confidence level, the instruction distribution circuit may distribute the control transfer instruction to a first execution pipeline 504. Conversely, when it is determined that the control transfer instruction has a relatively low confidence level, the instruction distribution circuit may distribute the control transfer instruction to a second execution pipeline 506. One difference between the execution pipelines 504 and 506 may be that the execution pipeline 506, but not the execution pipeline 504, may have the ability to redirect the fetch and decode 100 to obtain an instruction from a correct target address for execution, when the control transfer instruction is mis-predicted (also called re-fetch).

Therefore, when the execution pipeline 504 detects a misprediction for a control transfer instruction, the execution pipeline 504 may have to use the execution pipeline 506 to instruct the fetch of an instruction from a correct target address for execution. For example, the execution pipeline 504 may create a bubble in the execution pipeline 506, and then insert the control transfer instruction in the bubble for it to be executed by the execution pipeline 506. Once the execution pipeline 506 executes the control transfer instruction also determine that the control transfer instruction is mis-predicted, the execution pipeline 506 may redirect the fetch and decode 100 to fetch the instruction from the correct target address for execution. For example, the execution pipeline 506, but not the execution pipeline 504, may have a communication path to the fetch and decode circuit 100, through which the execution pipeline 506 may instruct the fetch and decode circuit 100 to perform the re-fetch. Given that the control transfer instruction is already executed in the execution pipeline 504, the second execution of the control transfer instruction in the execution pipeline 506 may be also considered a re-execution or replay of the control transfer instruction. Further, in the illustrated embodiment, the execution pipeline 506 may also use the bubble to execute one or more non-control transfer instructions together with the mis-predicted control transfer instruction. For example, the execution pipeline 506 may execute the one or more non-control transfer instructions in the same cycle, created by the bubble, as the mis-predicted control transfer instruction.

In the illustrated embodiment, when it detects a mis-predicted control transfer instruction, the execution pipeline 504 may not necessarily write back results to any registers or memory until the instruction from the correct target address is successfully executed by the execution pipeline 504. This warrants that only the correct result be written to the registers or memory. However, this may also delay the retirement in the execution pipeline 504 and thus cause additional delays to the execution pipeline 404. By comparison, when the mis-predicted control transfer instruction is initially distributed to the execution pipeline 506, the execution pipeline 506 may detect the misprediction and directly cause the fetch and decode circuit 100 to obtain the execution from the correct target address for execution, thus causing minimal delays to the execution. Thus, the execution pipeline 504 may be considered a "slow" execution pipeline, while the execution pipeline 506 as a "fast" execution pipeline, due to the different latencies in the processing of mis-predicted control transfer instructions. Sometimes, the execution pipelines 504 and 506 may include identical stages or an identical number of stages. In other words, for control transfer instructions without mispredictions, the execution pipelines 504 and 506 may not necessarily have different latencies, and the different latencies only exist for mis-predicted control transfer instructions because the execution pipeline 504 lacks the ability to directly instruct the fetch and decode circuit 100 for re-fetch. Alternatively, sometimes the execution pipeline 504 may have more stages or a larger number of stages than the execution pipeline 506. As a result, regardless of whether a control transfer instruction is mis-predicted or not, the execution pipeline 504 may always have a larger latency than the execution pipeline 506.

In the illustrated embodiment, the prediction of an control transfer instruction that is used by the instruction distribution circuit 502 to distribute the control transfer instruction may be (a) the bias prediction from the bias prediction circuit 156 or (b) the instruction prediction from the instruction prediction circuit 160. For example, as described above, when the bias prediction circuit 156 provides a bias prediction that the comparison of the control transfer instruction is biased true or biased false, the fetch and decode circuit 100 may use the bias prediction to speculatively process the control transfer instruction. In that case, the instruction distribution circuit 502 may use the bias prediction from the bias prediction circuit 156 to determine the distribution of the control transfer instruction. Conversely, when the bias prediction circuit 156 predicts that the comparison of the control transfer instruction is not biased true or biased false, the fetch and decode circuit 100 may use the instruction prediction from the instruction prediction circuit 160 to speculatively process the control transfer instruction. In that case, the instruction distribution circuit 502 may use the instruction prediction from the instruction prediction circuit 160 to determine the distribution of the control transfer instruction. In other words, the prediction of the control transfer instruction disclosed herein may be the prediction of the control transfer instruction based on which the fetch and decode circuit 100 speculatively process the control transfer instruction.

In the illustrated embodiment, the confidence level of the prediction may be determined with respect to one or more criteria. For example, when the prediction of a control transfer instruction is a bias prediction from the bias prediction circuit 156 (e.g., when the control transfer instruction is predicted as biased true or biased false), the instruction distribution circuit 502 may determine that the prediction has a high confidence level. Also, when the prediction is an instruction prediction from the instruction prediction circuit 160 (e.g., when the control transfer instruction is not predicted as biased true or biased false), the instruction distribution circuit 502 may determine that the prediction has a high confidence level if the instruction prediction is provided by a tagged predictor Ti with a saturated counter or a tagged predictor Ti with a high-order table (e.g., when the instruction prediction circuit 160 is a TAGE predictor). Otherwise, when the prediction of a control transfer instruction fails to satisfy the above one or more criteria, the instruction distribution circuit 502 may determine that the prediction has a low confidence level.

When the confidence level is high, the instruction distribution circuit 502 may distribute the control transfer instruction to the "slow" execution pipeline 504. Conversely, when the confidence level is low, the instruction distribution circuit 502 may distribute the control transfer instruction to the execution pipeline 506 (e.g., the "slow" execution pipeline). From an operational perspective, it means that when a control transfer instruction is predicted with a high confidence level, the instruction distribution circuit 502 may presume that the control transfer instruction is less likely to be mis-predicted, and thus execution of the control transfer instruction in the execution pipeline 504 (e.g., the "slow" execution pipeline) may have a lower probability to cause re-fetch. By comparison, when a control transfer instruction is predicted with a low confidence level, the instruction distribution circuit 502 may presume that the prediction is more likely to be erroneous. Thus, the instruction distribution circuit 502 may distribute the control transfer instruction to the execution pipeline 506 (e.g., the "fast" execution pipeline) to reduce potential delays for re-fetch.

Sometimes, the instruction distribution circuit 502 may perform load balancing between the execution pipelines 504 and 506. For example, the instruction distribution circuit 502 may distribute control transfer instructions to the execution pipelines 504 and 506 based on occupancies of the execution pipelines, rather than the predictions of the control transfer instructions. For example, when the execution pipeline 504 is overloaded and the execution pipeline 506 is underoccupied, the instruction distribution circuit 502 may distribute a control transfer instruction associated with a prediction of a high confidence level to the execution pipeline 506 for execution.

Turning now to FIG. 6, a flowchart illustrating one embodiment of operations of a processor 30 including an instruction distribution circuit 502 and different execution pipelines 504 and 506 is shown. In the illustrated embodiment, a control transfer instruction associated with a prediction may be received at the instruction distribution circuit 502, as indicated in block 602. As described above, the prediction of the control transfer instruction may be (a) a bias prediction from a bias prediction circuit 156 or (b) an instruction prediction from an instruction prediction circuit 160.

In the illustrated embodiment, the instruction distribution circuit 502 may evaluate the prediction of the control transfer instruction with respect to one or more criteria to determine a confidence level of the prediction, as indicated in block 604. For example, the instruction distribution circuit 502 may determine whether the prediction is a bias prediction (e.g., bias true or biased false) provided by the bias prediction circuit 156, or an instruction prediction (e.g., true or false) provided by a tagged predictor Ti with a saturated counter or a tagged predictor Ti with a high-order table of the instruction prediction circuit 160 (e.g., when the instruction prediction circuit 160 is a TAGE predictor). If so, the instruction distribution circuit 502 may determine that the control transfer instruction has a high confidence level. Otherwise, the instruction distribution circuit 502 may determine that the control transfer instruction has a low confidence level.

The instruction distribution circuit 502 may distribute the control transfer instruction to one of a plurality of execution pipelines according to the confidence level of the prediction of the control transfer instruction with respect to the one or more criteria. For example, when the confidence level is high, the instruction distribution circuit 502 may distribute the control transfer instruction to the execution pipeline 504 (e.g., the "slow" execution pipeline) for execution, as indicated in block 606. Otherwise, when the confidence level is low, the instruction distribution circuit 502 may distribute the control transfer instruction to the execution pipeline 506 (e.g., the "fast" execution pipeline) for execution, as indicated in block 610.

When the control transfer instruction is distributed to the execution pipeline 504, the execution of the control transfer instruction may determine that the prediction of the control transfer instruction is a misprediction, as indicated in block 608. In response, the execution pipeline 504 may cause the mis-predicted control transfer instruction to be re-executed or replayed in the execution pipeline 506, as indicated in block 610. As described above, in the illustrated embodiment, the execution pipeline 504 may create a bubble in the execution pipeline 506 and insert the mis-predicted control transfer instruction in the bubble for it to be executed by the execution pipeline 506. As described above, the execution of the control transfer instruction in the execution pipeline 506 may determine that the control transfer instruction is mis-predicted, as indicated in block 612. The execution pipeline 506 may direct the fetch and decode circuit 100 to obtain an instruction from a correct target address of the control transfer instruction for execution, as indicated in block 614.

Figure 7:
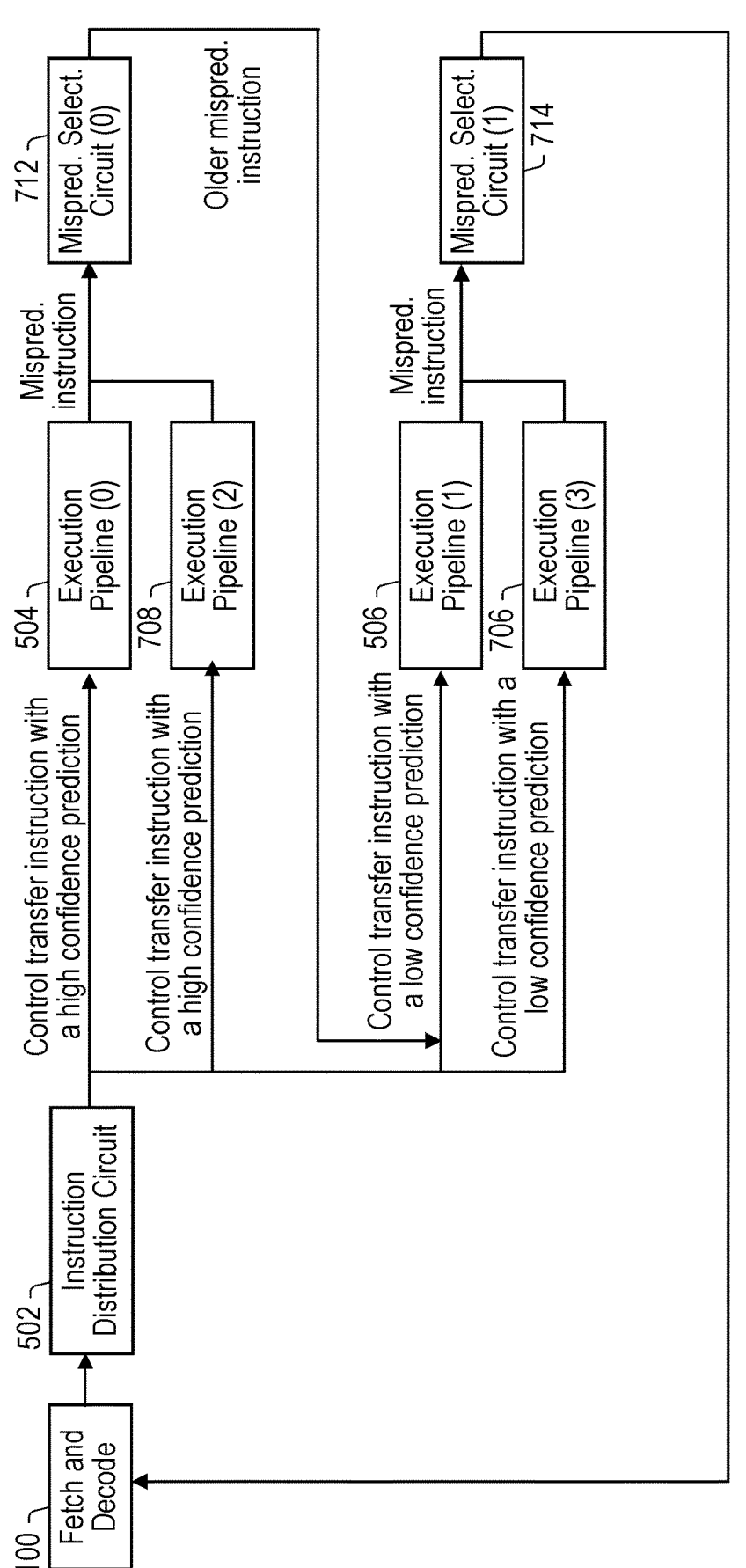
FIG. 7 is a block diagram of another embodiment of a portion of a processor including an instruction distribution circuit and a plurality of execution pipelines.

Turning now to FIG. 7, a block diagram of one embodiment of a portion of a processor 30 including an instruction distribution circuit 520 and execution pipelines 504, 506, 706, and 708 is shown. In the illustrated embodiment, the execution pipeline 708 may be similar to the execution pipeline 504 (e.g., the "slow" execution pipeline) such that the execution pipeline 708 lacks the ability to directly instruct the fetch and decode circuit 100 to perform re-fetch for mis-predicted control transfer instruction. By comparison, the execution pipeline 706 may be similar to the execution pipeline 506 (e.g., the "fast" execution pipeline) such that the execution pipeline 706 may also be able to directly instruct the fetch and decode circuit 100 to perform re-fetch for mis-predicted control transfer instruction. For example, like the execution pipeline 506, the execution pipeline 706 may also have a communication path to the fetch and decode circuit to direct re-fetch for mis-predicted control transfer instructions. Thus, in FIG. 7, the processor 30 includes two "slow" execution pipelines (e.g., the execution pipelines 504 and 708) and two "fast" execution pipelines (e.g., the execution pipelines 507 and 706). Note that that FIG. 7 is provided only as an example for purposes of illustration. Sometimes, the processor 30 may include less or more "slow" execution pipelines, and/or less or more "fast" execution pipelines.

As indicated in FIG. 7, the instruction distribution circuit 502 may distribute control transfer instructions to the execution pipelines 504, 506, 706, and 708 according to confidence levels of predictions of the control transfer instructions. In the illustrated embodiment, the confidence level of the predictions of a control transfer instruction may be determined with respect to one or more criteria, as described above in FIG. 5-6. Accordingly, the instruction distribution circuit 502 may distribute control transfer instruction associated with predictions of high confidence levels to the execution pipelines 504 and 708 (e.g., the "slow" execution pipelines) for execution, and control transfer instruction associated with predictions of low confidence levels to the execution pipelines 506 and 706 (e.g., the "fast" execution pipelines) for execution.

In the illustrated embodiment, the executions pipelines 504, 506, 706, and 708 may operate in parallel, thus processing one or more control transfer instructions around the same time. However, in the illustrated embodiment, only one of the "fast" execution pipelines, such as the execution pipeline 506, may be used to re-execute or replay a mis-predicted condition instruction (in order to cause re-fetch) that is provided from the "slow" execution pipelines such as the execution pipelines 504 and 708. Thus, when both execution pipelines 504 and 708 respectively detect a mis-predicted control transfer instruction, the processor 30 may use a first misprediction selection circuit 712 to select one of the mis-predicted control transfer instructions from the execution pipelines 504 and 708 for re-execution or replay in the execution pipeline 506, as indicated in FIG. 7.

In the illustrated embodiment, the selection may be performed according to ages of the two mis-predicted control transfer instructions respectively of the execution pipelines 504 and 708. For example, the first misprediction selection circuit 712 may compare the age of a first mis-predicted control transfer instruction in the execution pipeline 504 and the age of a second mis-predicted control transfer instruction in the execution pipeline 708, and cause the older one of the two control transfer instructions to be executed in the execution pipeline 506. The age of a control transfer instruction may be obtained in one of various ways. For example, the fetch and decode circuit 100 may assign a number, such as a Gnum, to a control transfer instruction when it is decoded by the decoder 154. The Gnum may be a unique, monotonically increasing (or decreasing) number for each instruction. Thus, a younger instruction may be assigned with a smaller Gnum (or a larger Gnum), while an older instruction may be assigned with a larger Gnum (or a smaller Gnum). Accordingly, the first misprediction selection circuit 712 may compare the Gnums of the two control transfer instructions to select the older control transfer instruction. In addition, sometimes the age of a control transfer instruction may also be determined based on the order of the control transfer instruction in a reorder buffer (ROB) 108 of the processor 30.

Once the first misprediction selection circuit 712 makes the selection, the corresponding execution pipeline (e.g., the execution pipeline 504) may create a bubble in the execution pipeline 506 and insert the selected control transfer instruction in the bubble for it to be executed by the execution pipeline 506. Once the execution pipeline 506 executes the control transfer instruction and detects that it is mis-predicted, the execution pipeline 506 may direct the fetch and decode circuit 100 to obtain an instruction from the correct target address of the mis-predicted control transfer instruction for execution, as described above. Note that the selection by the first misprediction selection circuit 712 may not necessarily mean the unselected mis-predicted control transfer instruction will not be re-executed or replayed by the execution pipeline 506. Instead, it only means that when both "slow" execution pipelines 504 and 708 detects a misprediction around the same time, to resolve the conflict, one of the control transfer instructions may be selected to cause re-fetch first. Afterwards, the other unselected control transfer instruction may be re-executed or replayed by the execution pipeline 506 to direct another re-fetch.

However, in the illustrated embodiment, given that the plurality of execution pipelines including the two "fast" execution pipelines 506 and 706 may process instructions in parallel, it is possible that the execution pipeline 706 (e.g., the second "fast" execution pipeline) may also detect a mis-predicted control transfer instruction around the same time when the execution pipeline 506 (e.g., the first "fast" execution pipeline) detects a mis-predicted control transfer instruction. This may also create a conflict. As indicated in FIG. 7, in that case, the processor 30 may use a second prediction selection circuit 714 to select one of the two mis-predicted control transfer instructions from the two "fast" execution pipelines 506 and 706 for re-fetch. For example, the second misprediction circuit 714 may compare the age of a first mis-predicted control transfer instruction in the execution pipeline 506 and the age of a second mis-predicted control transfer instruction in the execution pipeline 706, and select the older one of the two control transfer instructions to direct the fetch and decode circuit 100 to obtain an instruction from a target address for execution.

Figure 8:
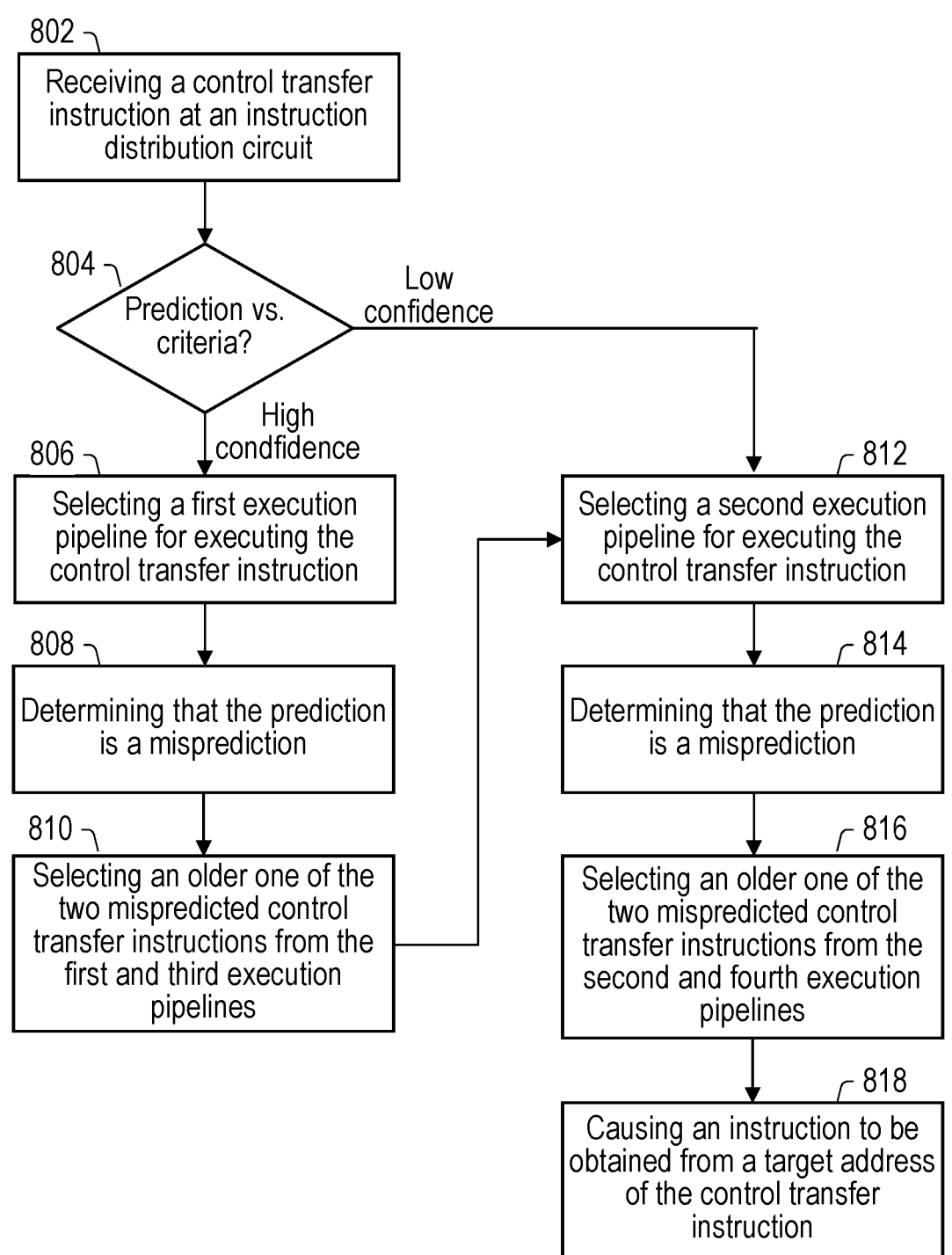
FIG. 8 is a flowchart illustrating another embodiment of operations of a processor including an instruction distribution circuit and a plurality of execution pipelines.

Turning now to FIG. 8, a flowchart illustrating one embodiment of operations of a processor 30 including the instruction distribution circuit 502 and different execution pipelines 504, 506, 706, and 708 is shown. In the illustrated embodiment, a control transfer instruction associated with a prediction may be received at the instruction distribution circuit 502, as indicated in block 802. As described above, the prediction of the control transfer instruction may be (a) a bias prediction from a bias prediction circuit 156 or (b) an instruction prediction from an instruction prediction circuit 160.

In the illustrated embodiment, the instruction distribution circuit 502 may evaluate the prediction of the control transfer instruction with respect to one or more criteria to determine a confidence level of the prediction, as indicated in block 804. The instruction distribution circuit 502 may distribute the control transfer instruction to one of a plurality of execution pipelines according to the confidence level of the prediction of the control transfer instruction with respect to the one or more criteria. For example, when the confidence level is high, the instruction distribution circuit 502 may distribute the control transfer instruction to one of the execution pipelines 504 and 708 (e.g., the "slow" execution pipeline) for execution, as indicated in block 806. Otherwise, when the confidence level is low, the instruction distribution circuit 502 may distribute the control transfer instruction to one of the execution pipelines 506 and 706 (e.g., the "fast" execution pipeline) for execution, as indicated in block 812.

When the control transfer instruction is distributed to one of the execution pipelines 504 and 708, the execution of the control transfer instruction may determine that the prediction of the control transfer instruction is a misprediction, as indicated in block 808. However, the other one of the execution pipelines 504 and 708 may also detect a mis-predicted control transfer instruction around the same time. Thus, to resolve the conflict, the processor 30 may use the first misprediction selection circuit 712 to select one of the two mis-predicted control transfer instructions from the execution pipelines 504 and 708 to be re-executed or replayed by the execution pipeline 506, as indicated in block 810. In the illustrated embodiment, the selection may be performed based on ages of the two control transfer instructions. For example, the first misprediction selection circuit 712 may compare the age of a first mis-predicted control transfer instruction in the execution pipeline 504 and the age of a second mis-predicted control transfer instruction in the execution pipeline 708 and cause the older one of the two control transfer instructions to be executed in the execution pipeline 506, as indicated in block 812.

In the illustrated embodiment, the execution of the control transfer instruction in the execution pipeline 506 may determine that the control transfer instruction is mis-predicted, as indicated in block 814. Further, the other execution pipeline 706 (e.g., the second "fast" execution pipeline) may also detect a mis-predicted control transfer instruction around the same time when the execution pipeline 506 detects a mis-predicted control transfer instruction. Thus, the processor 30 may use the second misprediction circuit 714 to select one of the two mis-predicted control transfer instructions from the execution pipelines 506 and 706, as indicated in block 816. Accordingly, the execution pipeline 506 or 706 of the selected mis-predicted control transfer instruction may instruct the fetch and decode circuit 100 to obtain an instruction from the correct target address of the selected mis-predicted control transfer instruction for execution, as indicated by block 818.

FIG. 9 is a block diagram of one embodiment of a processor 30 that includes a bias prediction circuit 156, an instruction prediction circuit 160, and/or an instruction distribution circuit 502 described in FIGS. 1-8. Note that FIG. 9 is provided only as an example for purposes of illustration. Thus, sometimes the processor 30 may include not all but only part of the illustrated components. For example, sometimes the processor 30 may include a bias prediction circuit 156 and an instruction prediction circuit 160, but not an instruction distribution circuit 502.

In the illustrated embodiment, the processor 30 includes a fetch and decode unit 100 (including an instruction cache, or ICache, 102), a map-dispatch-rename (MDR) unit 106 (including a reorder buffer (ROB) 108), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102 and may be configured to fetch a speculative path of instructions for the processor 30. As described above, in the illustrated embodiment, the fetch and decode unit 100 may include a bias prediction circuit 156 and an instruction prediction circuit 160 to provide respective predictions for control transfer instruction. The fetch and decode unit 100 may implement various prediction structures to predict the fetch path. For example, a next fetch predictor may be used to predict fetch addresses based on previously executed instructions. Branch predictors of various types may be used to verify the next fetch prediction or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The MDR unit 106 may be configured to map the ops to speculative resources (e.g., physical registers) to permit out-of-order and/or speculative execution and may dispatch the ops to the reservation stations 110 and 116. As indicated in FIG. 9, in the illustrated embodiment, the MDR unit 106 may include an instruction distribution circuit 502. The ops may be mapped to physical registers in the register file 114 from the architectural registers used in the corresponding instructions. That is, the register file 114 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for the speculative execution and retiring ops or flushing mis-speculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116 as shown in FIG. 6.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that pre-allocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledgement/non-acknowledgement signals from/to a peripheral device of the system including the processor 30.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units. As described above, the execution units 112 and associated reservation stations 110 may implement one or more execution pipelines 164, 504, 506, 706, and/or 708 as described in FIGS. 1-8.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of one other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 10:
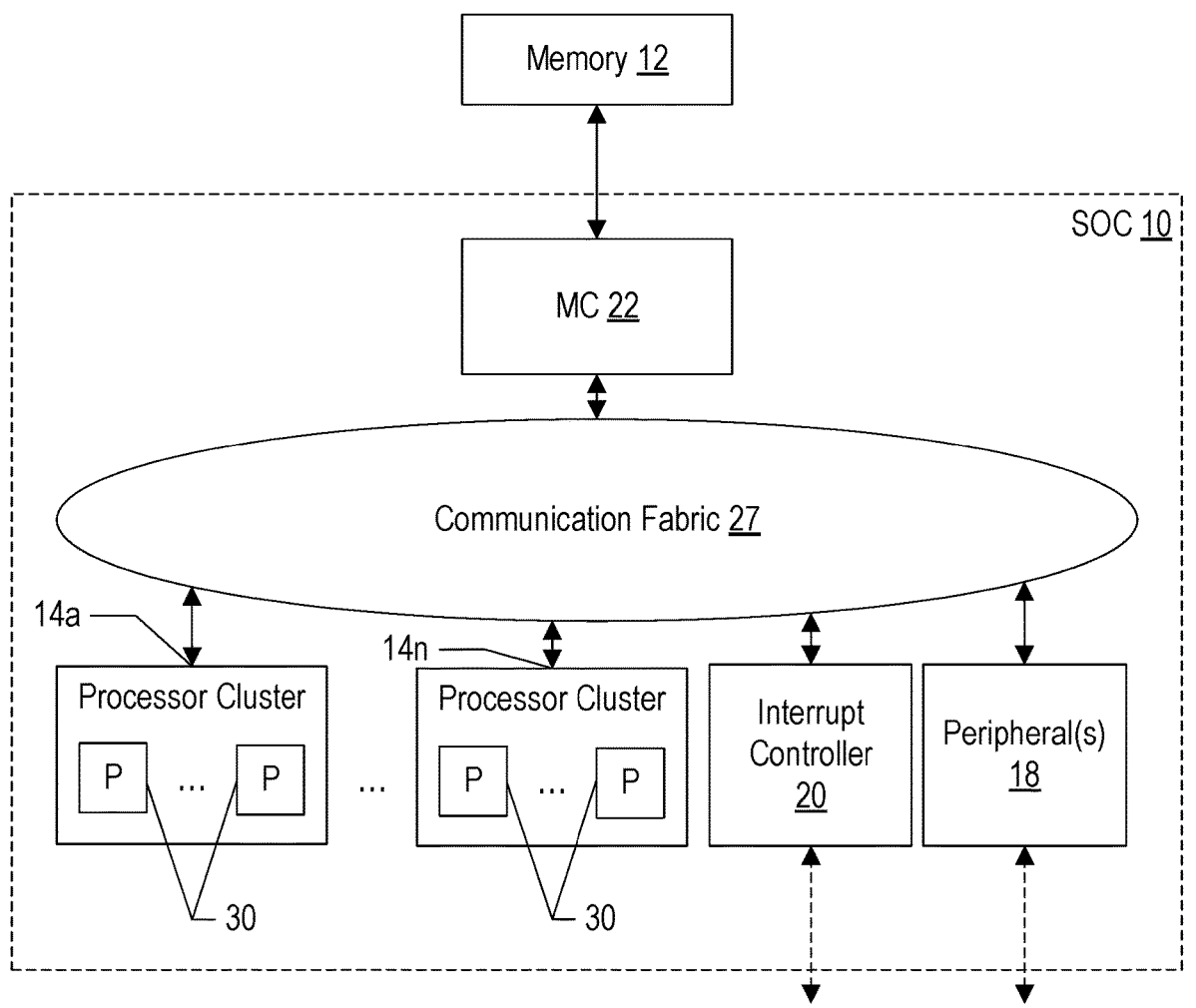
FIG. 10 is a block diagram of one embodiment of system on a chip (SOC) that may include one or more processors shown in FIG. 9.

Turning now to FIG. 10, a block diagram one embodiment of a system that may include one or more processors 30. In the illustrated embodiment, the system may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14a-14n, the interrupt controller 20, one or more peripheral components 18 (more briefly, "peripherals"), a memory controller 22, and a communication fabric 27. The components 14a-14n, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14a-14n may include the respective plurality of processors (P) 30 and the respective processors (P) 30 may further include a respective bias prediction circuit 156, a respective instruction prediction circuit 160, and/or a respective instruction distribution circuit 502 as described in FIGS. 1-9. The processors 30 may form the central processing units (CPU(s)) of the SOC 10. In an embodiment, one or more processor clusters 14a-14n may not be used as CPUs.

As mentioned above, the processor clusters 14a-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding re-access of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 4, such as the processors 30 in each processor cluster 14a-14n may vary from embodiment to embodiment. Additionally, the number of processors 30 in one processor cluster 14a-14n may differ from the number of processors 30 in another processor cluster 14a-14n. There may be more or fewer of each component/subcomponent than the number shown in FIG. 4.

Biased Indirect Control Transfer Prediction

Computing systems generally include one or more processors that serve as central processing units (CPUs). The CPUs execute the control software (e.g., an operating system) that controls operation of the various peripherals. The CPUs can also execute applications, which provide user functionality in the system. Sometimes a processor may implement an instruction pipeline that includes multiple stages, where instructions are divided into a series of steps individually executed at the corresponding stages of the pipeline. Sometimes the instructions of a program may include indirect control transfer instructions, e.g., branch to register (BR) instructions, branch to address-in-memory instructions, indirect jump (BR Xi) instructions, indirect jump and link (BLR Xi) instructions, and so forth. Unlike a direct control transfer instruction that explicitly includes the target address of the next instruction to execute in the body of the instruction, an indirect control transfer instruction only specifies one or more memory locations (e.g., one or more registers) (also called "arguments" of the instruction) where the target address of the next instruction may be contained. Sometimes an indirect control transfer instruction may be used, e.g., with a branch table, to implement conditional jumping to multiple target addresses with only a fewer number of instructions than direct control transfer instructions.

Sometimes an indirect control transfer instruction may be biased, meaning that the indirect control transfer instruction always branches to the same target address for executing the same next instruction. Thus, if the bias of an indirect control transfer instruction can be predicted ahead of time, a processor may not have to wait for the target address to be determined. Instead, the processor may fetch and execute the next instruction from a target address that has been predetermined through bias prediction. may improve execution speed and performance of a processor in at least the following ways. First, by predicting a target address as part of bias prediction, control transfer may be performed faster, as discussed in further detail below, than if the target address were determined or predicted as part of instruction deciding and execution. Second, bias predictions, by virtue of being performed separately from instruction target predictions, may reduce pressure on instruction prediction tables and thus may further enhance performance, not only of biased instructions, but of unbiased instructions. Third, use of bias predictions may improve accuracy and reduce target address mispredictions, as discussed in further detail below, due to reduction in the reliance on hashes as part of target address prediction during instruction decoding and execution. Thus, it is desirable for a processor to have the ability to predict the bias of indirect control transfer instructions and execute the indirect control transfer instructions according to those predictions.

Figure 11:
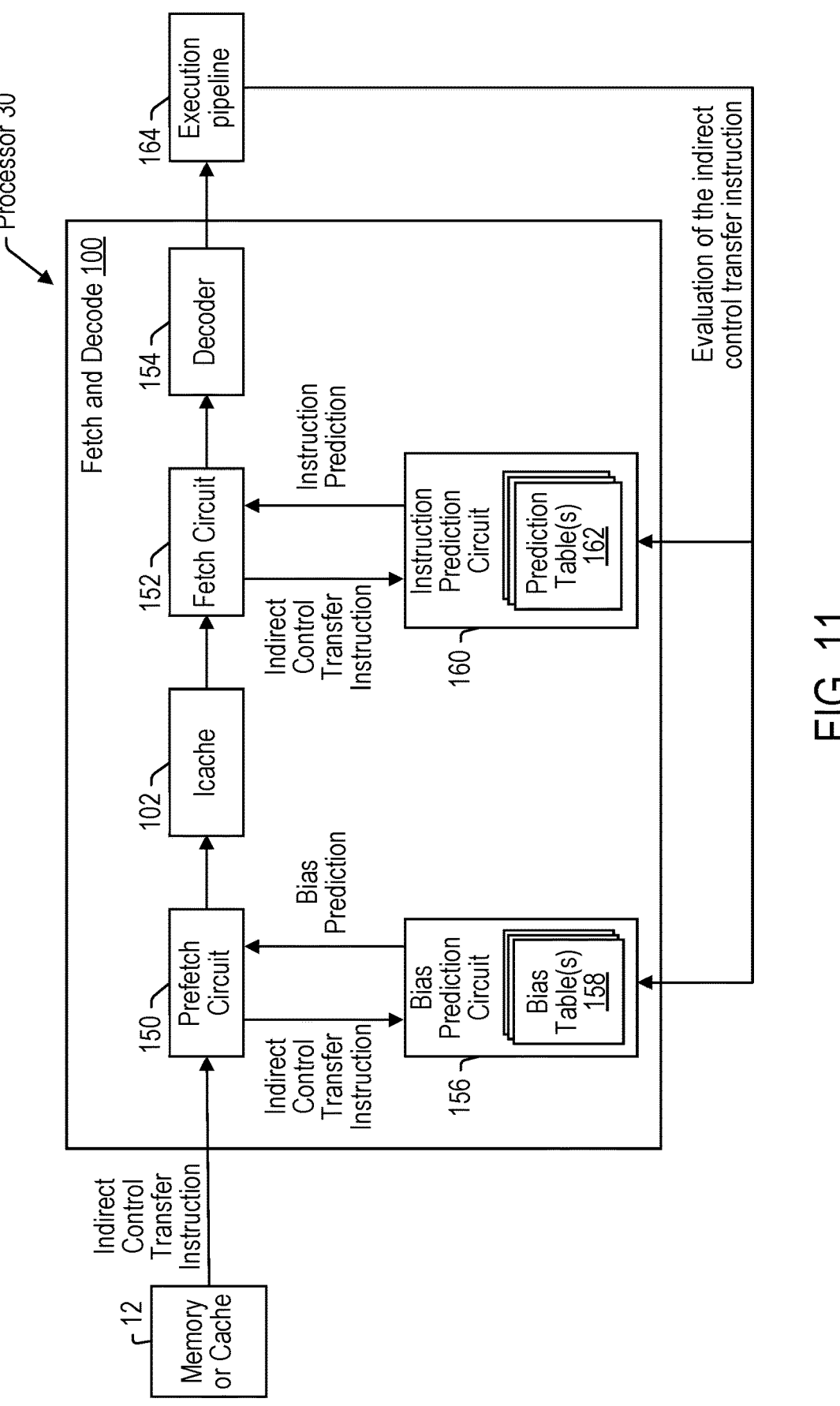
FIG. 11 is a block diagram of one embodiment of a portion of a processor including an indirect control transfer prediction circuit.

Turning now to FIG. 11, a block diagram of one embodiment of a portion of a processor 30 including an indirect control transfer prediction circuit 156 (hereinafter "prediction circuit") is shown. As indicated in FIG. 11, in the illustrated embodiment, a fetch and decode unit 100 of the processor 30 may include a prefetch circuit 150, a prediction circuit 156, an instruction cache (hereinafter "Icache") 102, a fetch circuit 152, and an instruction decoding circuit (hereinafter "decoder") 154. In the illustrated embodiment, the prediction circuit 156 is shown as an example for purposes of illustration to be implemented as a component separate from the prefetch circuit 150 of the fetch and decode unit 100. Alternatively, in some embodiments, the prediction circuit 156 may be implemented as part of the prefetch circuit 150, or outside the fetch and decode unit 100.

The fetch and decode unit 100 may fetch and decode instructions in a series of stages. For example, given an instruction, the fetch and decode unit 100 may first use the prefetch circuit 150 to fetch the instruction from a memory or cache 12 to the Icache 102 (hereinafter the "prefetch" stage). Sometimes the memory or cache 12 may be a main memory, such as a hard disk or flash memory, outside the processor 30, and/or a cache (e.g., a level-2 cache) functioning as an intermediary through which instructions may be fetched from a main memory to the instruction cache 102. Next, the instruction may be fetched by the fetch circuit 152 out of the Icache 102 to the decoder 154 (hereinafter the "fetch" stage). Then the decoder 154 may decode the instruction, convert it to operation(s) and/or micro-operation(s) (hereinafter the "decoding" stage), and send the operation(s) and/or micro-operation(s) to an execution unit 112 for execution. Sometimes the execution unit 112 may be an integer, a floating point, and/or a vector execution unit, and may be associated with a reservation station 110, as described in FIG. 19. For purposes of illustration, FIG. 11 may not necessarily depict all the components of the processor 30. For example, sometimes the fetch and decode unit 100 may not necessarily send the operation(s) and/or micro-operation(s) to the execution unit 112 directly. Instead, there may be one or more other components coupled operatively in-between. For example, sometimes the processor 30 may include a map-dispatch-rename (MDR) unit 106 between the fetch and decode unit 100 and the execution pipeline 164, which may map the operation(s) and/or micro-operation(s) to speculative resources (e.g., physical registers) to permit out-of-order and/or speculative execution, and may dispatch the operation(s) and/or micro-operation(s) to the reservation stations 110.

Execution of a program including an indirect control transfer instruction may depend on the target address of the indirect control transfer instruction. Unlike a direct control transfer instruction that explicitly includes the target address of the next instruction to execute in the body of the instruction, an indirect control transfer instruction may only specify information from which a target address may be determined, such as by providing one or more memory locations or one or more registers from which the target address of the next instruction may be obtained or calculated. For example, a branch to register (BR) instruction may specify a register in the body of the instruction, and the register may contain the target address of the next instruction to execute. In another example, an indirect jump (Br Xi) instruction may specify an address offset in the body of the instruction. The address offset may be added to the program counter (PC) to determine the target address of the next instruction to execute.

As used herein, a "biased indirect control transfer instruction" refers to an indirect control transfer instruction that (a) depends on a condition that is not guaranteed to be known with certainty (i.e., remains speculative) until the instruction actually executes (for example, whether the indirect control transfer instruction is taken or not taken, the target address of the indirect control transfer instruction, and/or any other aspect of the indirect control transfer instruction that may remain speculative prior to execution) and (b) based on actual execution behavior (i.e., dynamically, as opposed to statically), is treated as an unconditional control transfer instruction during a period of time. That is, when an indirect control transfer instruction is dynamically designated as "biased" (or equivalently, in a "biased state"), this is a prediction that the indirect control transfer instruction will behave unconditionally in a consistent manner for a period of time.

It is noted that designating an indirect control transfer instruction as biased is a dynamic form of prediction that is dependent upon runtime behavior of the instruction, not a static prediction that could be performed independently of instruction execution (e.g., at compile time).

In some embodiments, an indirect control transfer instruction that is initially not designated as biased could transition to a biased state based on its execution behavior the first time it is encountered. For example, if a target address of the indirect control transfer instruction is initially determined, the instruction may be designated as biased and thereafter treated as an unconditional branch to the determined target address. Thus, if the bias of an indirect control transfer instruction can be predicted ahead of time, a processor may not necessarily have to wait for the target address to be determined. Instead, the processor may fetch and execute the next instruction from the same, predicted target address.

If on some later occasion, the branch instruction is determined to be not taken, or the target address is determined to be different than predicted, when executed, it may transition to an unbiased state. In other embodiments, other criteria may be used to determine the transition into and out of the biased state. For example, the behavior of multiple instances of instruction execution may be considered before transitioning into or out of the biased state. Thus, for the period of time between when an indirect control transfer instruction is designated as biased until this designation is removed, the control transfer instruction may be treated as unconditional. During this period, other forms of prediction, if available, may not be utilized. When a control transfer instruction is not in a biased state, other types of predictors may be used to predict instruction behavior.

Turning now to FIG. 11, a block diagram of one embodiment of a portion of a processor 30 including an bias prediction circuit 156 (hereinafter "prediction circuit") is shown. As indicated in FIG. 11, in the illustrated embodiment, a fetch and decode unit 100 of the processor 30 may include a prefetch circuit 150, a bias prediction circuit 156, an instruction cache (hereinafter "Icache") 102, a fetch circuit 152, and an instruction decoding circuit (hereinafter "decoder") 154. In the illustrated embodiment, the bias prediction circuit 156 is shown as an example for purposes of illustration to be implemented as a component separate from the prefetch circuit 150 of the fetch and decode unit 100. Alternatively, in some embodiments, the bias prediction circuit 156 may be implemented as part of the prefetch circuit 150, or outside the fetch and decode unit 100.

The fetch and decode unit 100 may fetch and decode instructions in a series of stages. For example, given an instruction, the fetch and decode unit 100 may first use the prefetch circuit 150 to fetch the instruction from a memory or cache 12 and write instructions to the Icache 102 (hereinafter the "prefetch" stage). Sometimes the memory or cache 12 may be a main memory, such as a hard disk or flash memory, outside the processor 30, and/or a cache (e.g., a level-2 cache) functioning as an intermediary through which instructions may be fetched from a main memory to the instruction cache 102. Next, the instruction may be fetched by the fetch circuit 152 out of the Icache 102 to the decoder 154 (hereinafter the "fetch" stage). Then the decoder 154 may decode the instruction, convert it to operation(s) and/or micro-operation(s) (hereinafter the "decoding" stage), and send the operation(s) and/or micro-operation(s) to an execution unit of an execution pipeline 164 for execution. Sometimes the execution unit may be an integer, a floating point, and/or a vector execution unit, and may be associated with a reservation station 116, as described in FIG. 19. For purposes of illustration, FIG. 11 may not necessarily depict all the components of the processor 30. For example, sometimes the fetch and decode unit 100 may not necessarily send the operation(s) and/or micro-operation(s) to the execution unit directly. Instead, there may be one or more other components coupled operatively in-between. For example, sometimes the processor 30 may include a map-dispatch-rename (MDR) unit 106 between the fetch and decode unit 100 and the execution pipeline 112, which may map the operation(s) and/or micro-operation(s) to speculative resources (e.g., physical registers) to permit out-of-order and/or speculative execution, and may dispatch the operation(s) and/or micro-operation(s) to the reservation stations 110.

Execution of a program including an indirect control transfer instruction may depend on the target address of the indirect control transfer instruction. Unlike a direct control transfer instruction that explicitly includes the target address of the next instruction to execute in the body of the instruction, an indirect control transfer instruction may only specify information from which a target address may be determined, such as by providing one or more memory locations or one or more registers from which the target address of the next instruction may be obtained or calculated. For example, a branch to register (BR) instruction may specify a register in the body of the instruction, and the register may contain the target address of the next instruction to execute. In another example, an indirect jump (Br Xi) instruction may specify an address offset in the body of the instruction. The address offset may be added to the program counter (PC) to determine the target address of the next instruction to execute.

Figure 12:
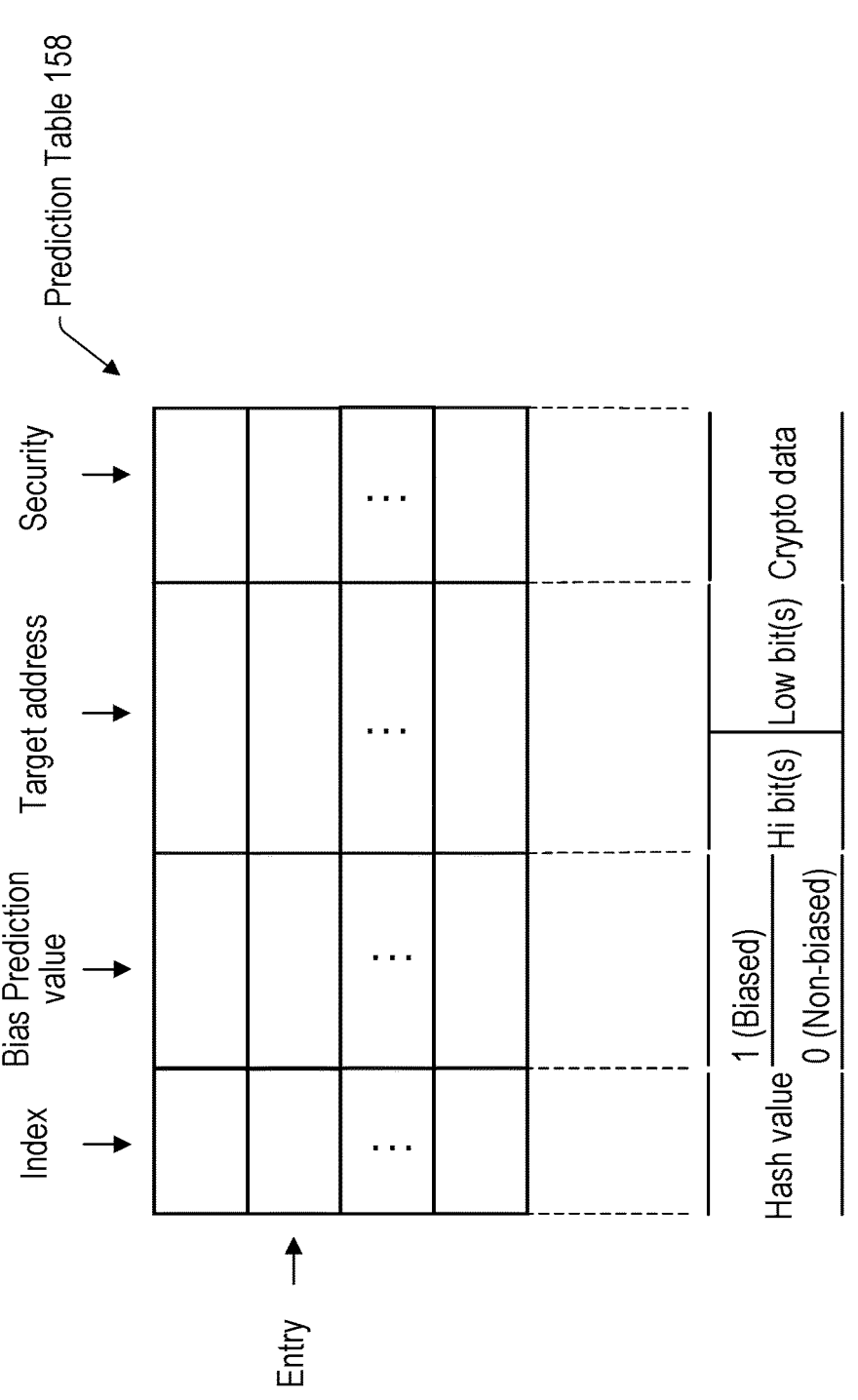
FIG. 12 shows one embodiment of a prediction table of an indirect control transfer prediction circuit.

In the illustrated embodiment, the fetch and decode unit 100 may use the bias prediction circuit 156 to predict bias of indirect control transfer instructions and speculatively process the indirect control transfer instructions according to these predictions. In the illustrated embodiment, the bias prediction circuit 156, as part of instruction prefetching, may use a prediction table 158 to make predictions for indirect control transfer instructions. An example of prediction table 158 is shown in FIG. 12 below. In the illustrated embodiment, the prediction table 158 may include one or more entries corresponding respectively to one or more indirect control transfer instructions. Each entry may include an index, a bias prediction value and a target address. Each index may be associated with one corresponding indirect control transfer instruction and thus may be used by the bias prediction circuit 156 to search the prediction table 158 to identify the corresponding entry for a given indirect control transfer instruction. Once an entry is identified, the bias prediction circuit 156 may use the prediction value in the entry to make the bias prediction for the indirect control transfer instruction during prefetching of the instruction. In addition, the bias prediction circuit 156 may provide the predicted target address as the target address of the next instruction.

A positive bias prediction, or prediction of bias, of an indirect control transfer instruction indicates that the indirect control transfer instruction is predicted to always branch to the same target address for executing the next instruction. For example, in the illustrated embodiment, the prefetch circuit 150 may fetch one or more instructions from the memory or cache 12 and write instructions to the Icache 102, the instructions including one or more indirect control transfer instructions. For a given indirect control transfer instruction, during fetch of the indirect control transfer instruction to be written into the Icache 102 (in the prefetch stage), the bias prediction circuit 156 may predict whether or not the indirect control transfer instruction is biased. When an indirect control transfer instruction is predicted to be biased, it means that the instruction is predicted to always branch to the same target address for executing the same next instruction (even though, e.g., the indirect control transfer instruction is coded as if it is possible branch to multiple target addresses). Responsive to a prediction that the indirect control transfer instruction is biased, the bias prediction circuit 156 may cause the indirect control transfer instruction to be executed as an unconditional direct control transfer instruction according to the predicted bias. For example, if an indirect control transfer instruction is predicted to be biased, the bias prediction circuit 156 may cause the indirect control transfer instruction to be recoded, e.g., in the Icache 102, to an unconditional direct control transfer instruction including a predicted target address. As a result, when the unconditional direct control transfer instruction is decoded and/or executed, the processor 30 may use the predicted target address directly to fetch and execute the next instruction.

As biased indirect control transfer instructions may be recoded as unconditional direct control transfer instructions, fetching instructions at target may be performed in fewer clock cycles of the processor as compared to indirect control transfer instructions using a target instruction prediction circuit such as shown in 160. This is due to target addresses for the instructions being encoded in the unconditional direct control transfer instructions stored in the Icache. As these instructions are fetched, target addresses may be accessed more quickly than if the processor obtains them from an instruction prediction circuit (e.g., 160). Therefore, use of bias prediction to convert indirect control transfer instructions to unconditional direct control transfer instructions for execution may result in a shortening of execution time by one or more clock cycles, in various embodiments.

In some embodiments, when a bias prediction from the bias prediction circuit 156 indicates that the indirect control transfer instruction is in an unbiased state or when bias of an instruction cannot be predicted, the fetch and decode circuit 100 may use an instruction prediction circuit 160 to provide a target address prediction for the instruction. In the illustrated embodiment, the instruction prediction circuit 160 may be an Indirect Target (ITTAGE) predictor having a total of (M+1) predictors, such as a basic predictor T0 with a basic prediction table 162(0) and one or more additional (partially) tagged predictors Ti with respective prediction tables 162(i) (1≤i≤M). The prediction tables 162(i) of the tagged predictors Ti (1≤i≤M) may be associated with a history-related geometric series of a respective history length. Furthermore, in some embodiments, for indirect control transfer instruction for which bias prediction circuit 156 provides bias predictions (e.g., indicates a biased state for the instruction and the instruction has been recoded in the Icache as an unconditional control transfer instruction, the instruction prediction circuit 160 will not be utilized for predictions for such instructions indicated as biased. As a result, the use of bias prediction may reduce pressure on the instruction prediction circuit 160. For example, accesses to prediction tables 162 may be reduced. Finally, the use of bias predictions may improve prediction accuracy as predictions made during the prefetch stage may be fully encoded in the Icache 102, whereas predictions made at the instruction prediction circuit 160 during fetch and decode may rely on a hash of information encoded in the Icache 102 which introduces a potential for hash collisions during ITTAGE prediction.

Target addresses within the bias table 158 may be obtained from previous execution of respective indirect control transfer instructions. Thus, the bias prediction circuit 156 may be much simpler, and entirely different in implementation, than the instruction prediction circuit 160, which may be an ITTAGE predictor as discussed above, in some embodiments. Furthermore, the bias prediction circuit provides bias predictions during the prefetch stage, as opposed to the instruction prediction circuit 160 which provides target predictions in the fetch and decode stage. Therefore, it should be understood that the bias prediction circuit 156 and the instruction prediction circuit are different, are not mutually exclusive, and may provide complimentary performance benefits in some embodiments. For example, as mentioned earlier bias predictions, by virtue of being performed separately from instruction target predictions, may reduce pressure on instruction prediction tables and thus may further enhance performance, not only of biased instructions, but of unbiased instructions, in some embodiments.

As indicated in FIG. 12, in the illustrated embodiment, the index for an indirect control transfer instruction may be generated based on hashing an address associated with the indirect control transfer instruction, which may be obtained from a program counter ("PC"). Thus, the indirect control transfer instruction address, prediction value, and (predicted) target address may be considered a key-values pair, where the indirect control transfer instruction address is the "key" that may be used to search for the prediction value and (predicted) target address, or the "values", corresponding to the indirect control transfer instruction. Sometimes the hashing may include the indirect control transfer instruction address as well as a resolution history of the indirect control transfer instructions from previous executions. Any appropriate hashing function, e.g., exclusive-OR (XOR) and the like, may be used to generate indices of the entries. In the illustrated embodiment, the prediction value in an entry of the prediction table 158 may be one of two 1-bit values. For example, a value "1" may represent that an indirect control transfer instruction is predicted to be biased, whereas a value "0" may represent that the indirect control transfer instruction is predicted to be non-biased. As described above, when an indirect control transfer instruction is predicted to be biased, it means that the instruction is predicted to always branch to the same target address to execute the same next instruction. Thus, the processor 30 may execute the indirect control transfer instruction as an unconditional direct control transfer instruction to fetch and execute the same next instruction from the same target address indicated by the (predicted) target address. Conversely, when an indirect control transfer instruction is predicted to be non-biased, the target address of the next instruction may not necessarily always be the same, and thus the processor 30 may have to treat the instruction as a regular indirect control transfer instruction to obtain the content of the argument(s) in order to determine the target address of the next instruction. Note that the prediction table 158 of FIG. 12 is provided only as an example for purposes of illustration. In some embodiments, the prediction values of a prediction table may have less or more bits. For example, sometimes the prediction values may have more bits to implement a prediction hysteresis.

As indicated in FIG. 12, sometimes a (predicted) target address in the prediction table 158 may be divided into high bits and low bits, where the high bits represent the most significant bits (MSBs) and the low bits represent the least significant bits (LSBs) of the address. In addition, sometimes the high bits may be hashed into a fewer number of bits to reduce the size of the prediction table 158, and only the low bits may be explicitly included in the prediction table 158. This may be implemented especially if the target address is within a specific range and the low bits alone are mostly sufficient to represent the address. Note that the prediction table 158 is provided only as an example for purposes of illustration. Sometimes an entry of the prediction table 158 may include less or more elements. For example, as indicated in FIG. 12, sometimes an entry may optionally include cryptographic data to provide security protection, e.g., to verify and/or authenticate an indirect control transfer instruction and/or a (predicted) target address before jumping to the target address. In addition, sometimes the processor 30 may use the same prediction circuit 156, and/or the prediction circuit 156 may also use the same prediction table 158, to make bias predictions for other types of instruction, e.g., conditional direct control transfer instructions, control transfer instructions (e.g., conditional selection or CSEL instructions), and/or the like.

Figure 13:
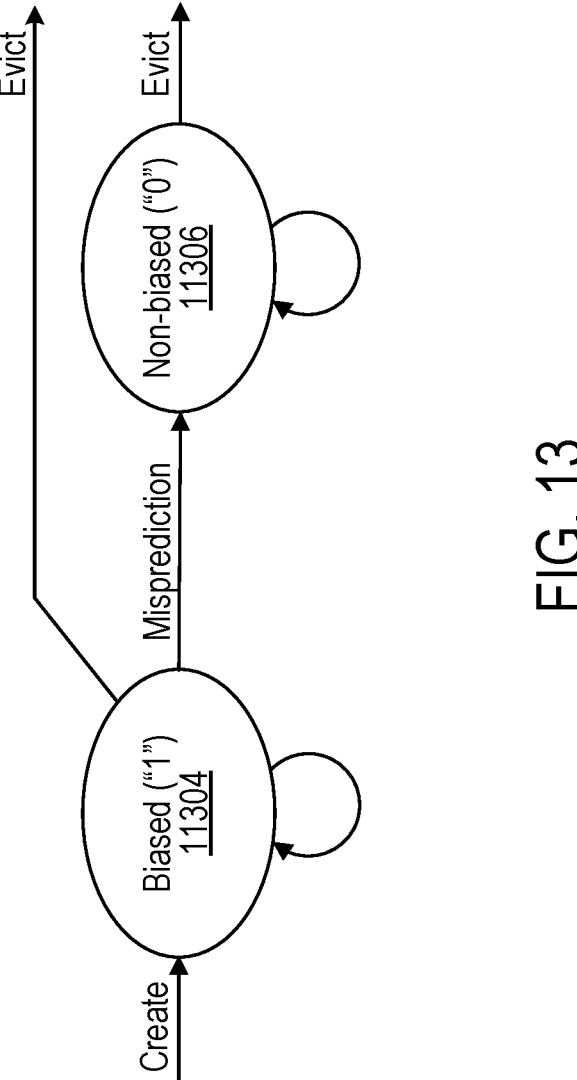
FIG. 13 shows one embodiment of a state machine to illustrate operations of an indirect control transfer prediction circuit to generate and update a prediction table.

Turning now to FIG. 13, a state machine is shown to illustrate operations of the prediction circuit 156 to generate and update the prediction table 158. As indicated in FIG. 13, circles 11304 and 11306 may represent the possible prediction values in the prediction table 158 of FIG. 12. For example, the circle 11304 may represent the bias prediction value "1", whereas the circle 11306 may represent the non-biased prediction value "0".

As described above, when an indirect control transfer instruction is fetched by the prefetch circuit 150 from the memory or cache 12 to the Icache 102 (in the prefetch stage), the prediction circuit 156 may search the prediction table 158 for an entry corresponding to the indirect control transfer instruction. For example, the prediction circuit 156 may use the indirect control transfer instruction address as the "key" to determine an index. The prediction circuit 156 may use the index to search the prediction table 158 for the corresponding entry. If no prediction has been provided to the indirect control transfer instruction in the past (e.g., if the bias prediction circuit 156 has not encountered the indirect control transfer instruction before), there may be no entry for the indirect control transfer instruction in the bias table 158.

Next, the indirect control transfer instruction may be fetched by the fetch circuit 152 out of the Icache 102 to the decoder 154. The decoder 154 may decode the indirect control transfer instruction and send it to the execution unit 112 for execution. The execution of the indirect control transfer instruction may resolve the indirect control transfer instruction to thus determine the actual target address of the next instruction to execute. The prediction circuit 156 may use the resolution result for future bias prediction of the indirect control transfer instruction. For example, the prediction circuit 156 may set the prediction value to "1" (i.e., the biased value) and store the actual target address from the resolution result in the prediction table 158. When the indirect control transfer instruction is fetched again by the prefetch circuit 150, the prediction circuit 156 may then use the information from the prediction table 158 to determine that the instruction is biased and provide the (predicted) target address of the next instruction to execute. For example, the prediction circuit 156 may, upon first prefetching of an indirect control transfer instruction, encode the instruction as an unconditional indirect control transfer instruction in the instruction cache. Then, upon execution of the unconditional indirect control transfer instruction, the prediction circuit 156 may set the prediction value to "1" (i.e., the biased value) and store the actual target address determined during execution in the prediction table 158.

In other words, when an indirect control transfer instruction is encountered for the first time, the prediction circuit 156 may store the actual target address it branched to and mark the indirect control transfer instruction as biased in the prediction table 158. The bias prediction means that the instruction is predicted to be a single target indirect control transfer instruction (always going to the same target address). The prediction circuit 156 may not necessarily predict if a branch is taken or not taken. Instead, it may predict if the instruction always branches to the same target address.

Sometimes the processor 30 may execute instructions out of order. Or in other words, an indirect control transfer instruction may be executed speculatively prior to other instructions older than the indirect control transfer instruction. In that case, the prediction circuit 156 may optionally use a training buffer 11308 to temporarily store the prediction value and target address until the indirect control transfer instruction becomes non-speculative, as indicated by the edges of FIG. 13. For instance, in the aforementioned example, the prediction circuit may generate a prediction value "1" (biased) and store the actual target address from the resolution result in the training buffer 11310. The prediction circuit 156 may wait until a determination that the indirect control transfer instruction becomes non-speculative, or in other words, all instructions older than the indirect control transfer instructions have retired or at least have been executed. Until then, the prediction circuit 156 may set the prediction value to "1" (biased) and store the actual target address in the corresponding entry of the prediction table 158, according to information in the training buffer 11308. Sometimes the training buffer 11308 may be implemented using any appropriate memory storage components and/or devices, e.g., register(s) and/or memory cache(es).

Sometimes the prediction circuit 156 may obtain the determination of non-speculativeness based on information in a reorder buffer circuit 108 (hereinafter reorder buffer or ROB) of the processor 30. As described below in FIG. 19, the reorder buffer 108 may be used to track the program order of ops and manage retirement/flush. The reorder buffer 108 may maintain a queue having entries corresponding to instructions under execution. When the indirect control transfer instruction becomes non-speculative, the entry corresponding to the indirect control transfer instruction may move to the top of the queue. Thus, by monitoring the position of the entry in the queue, the non-speculativeness of the indirect control transfer instruction may be determined. Once an indirect control transfer instruction becomes non-speculative, the prediction circuit 156 may proceed to update the corresponding entry of the prediction table 158 according to information temporarily stored in the training buffer 308, as described above. Sometimes the prediction instruction circuit 156 may delete the temporary information from the training buffer 11308 after the prediction table 158 is updated. Sometimes the training may be performed only on an indirect control transfer instruction in the initial state. When the indirect control transfer instruction is fetched by the prefetch circuit 150 for the second time, the prediction circuit 156 may directly use information from the prediction table 158 to make the prediction.

Sometimes the bias of an indirect control transfer instruction may be mis-predicted. In that case, the prediction circuit 156 may use the misprediction to update the prediction value in the prediction table 158. For example, as described above, when an indirect control transfer instruction is fetched and executed for the first time, the prediction circuit 156 may assume the indirect control transfer instruction is biased and set the prediction value to "1" (biased). When the indirect control transfer instruction is fetched for the second time by the prefetch circuit 150, the prediction circuit 156 may search the prediction table 158 to find the entry corresponding to the indirect control transfer instruction, and identify the prediction value and target address from the entry. Accordingly, the prediction circuit 156 may predict that the indirect control transfer instruction is biased and always branch to the (predicted) target address.

Then, the prediction circuit 156 may cause the indirect control transfer instruction to be executed according to the predicted bias, e.g., as an unconditional direct control transfer instruction. As described, the recoded instruction may include encoded data representing the original instruction, so that the actual target of the original instruction may be resolved and misprediction may be determined. The prediction circuit 156 may use the resolution result to verify correctness of the bias prediction. For example, the prediction circuit 156 may compare the predicted target address with the actual target address from the resolution result. If the two match, the prediction circuit 156 may determine that the bias was correctly predicted. Conversely, if the two do not match, the prediction circuit 156 may determine that the bias was mis-predicted. In that case, the prediction circuit 156 may change the prediction value from "1" (biased) to "0" (non-biased), as indicated in FIG. 13. When the indirect control transfer instruction is fetched for the third time, the prediction circuit 156 may thus use the updated information from the prediction table 158 to predict that the indirect control transfer instruction is non-biased. Accordingly, the indirect control transfer instruction may not be recoded, e.g., in the Icache 102, and the processor 30 may treat the instruction as a regular indirect control transfer instruction (e.g., as if the processor 30 does not include the prediction circuit 156).

For example, the processor 30 may first execute the indirect control transfer instruction to obtain the content from the arguments to determine the target address, and next fetch and execute the next instruction from the determined target address. Sometimes when a misprediction is detected, the prediction circuit 156 may cause the mis-predicted indirect control transfer instruction and/or all the fetched instructions younger than the mis-predicted indirect control transfer instruction to be flushed or removed from the instruction pipeline of the processor 30. In other words, the speculative execution (based on the misprediction) may be thrown away in the event of a misprediction. As a result, the indirect control transfer instruction and/or those younger instructions may be re-fetched from the memory or cache 12 by the prefetch circuit 150 to the Icache 102. Once they are re-fetched, the indirect control transfer instruction (and/or those younger instructions) may be re-executed by the processor 30 as a non-biased indirect control transfer instruction, as described above, to thus correct the previous misprediction. Sometimes, responsive to detection of a misprediction, the prediction circuit 156 may cause the cache line to be invalidated.

In the illustrated embodiment, once an indirect instruction is predicted to be non-biased, the prediction circuit 156 may maintain the prediction value as the non-biased value "1"

and not update it further, as indicated in FIG. 13. This is provided only as an example for purposes of illustration. In some embodiments, the non-biased indirect control transfer instruction may be able to invoke a new training, such as by evicting the prediction value from the prediction table 158, and a new biased prediction may then be created. Sometimes the prediction circuit 156 may implement a prediction hysteresis. For example, the prediction circuit 156 may not necessarily change a biased prediction value to the non-biased value immediately after a misprediction is detected. Instead, the prediction circuit 156 may wait for a while to make the update. For example, when the prediction circuit 156 detects a misprediction for an indirect control transfer instruction for the first time, the prediction circuit 156 may update the prediction value to a weak biased value. If a misprediction is detected for the nth time, the prediction circuit 156 may then update the weak biased value to the non-biased value. To implement these additional states, the prediction values of the prediction table 158 may have more than 1 bit. For example, the prediction values may be 2-bit values, where "01" may represent a biased prediction, "10" may represent a weak biased prediction, and "00" may represent a non-biased prediction.

Figure 14:
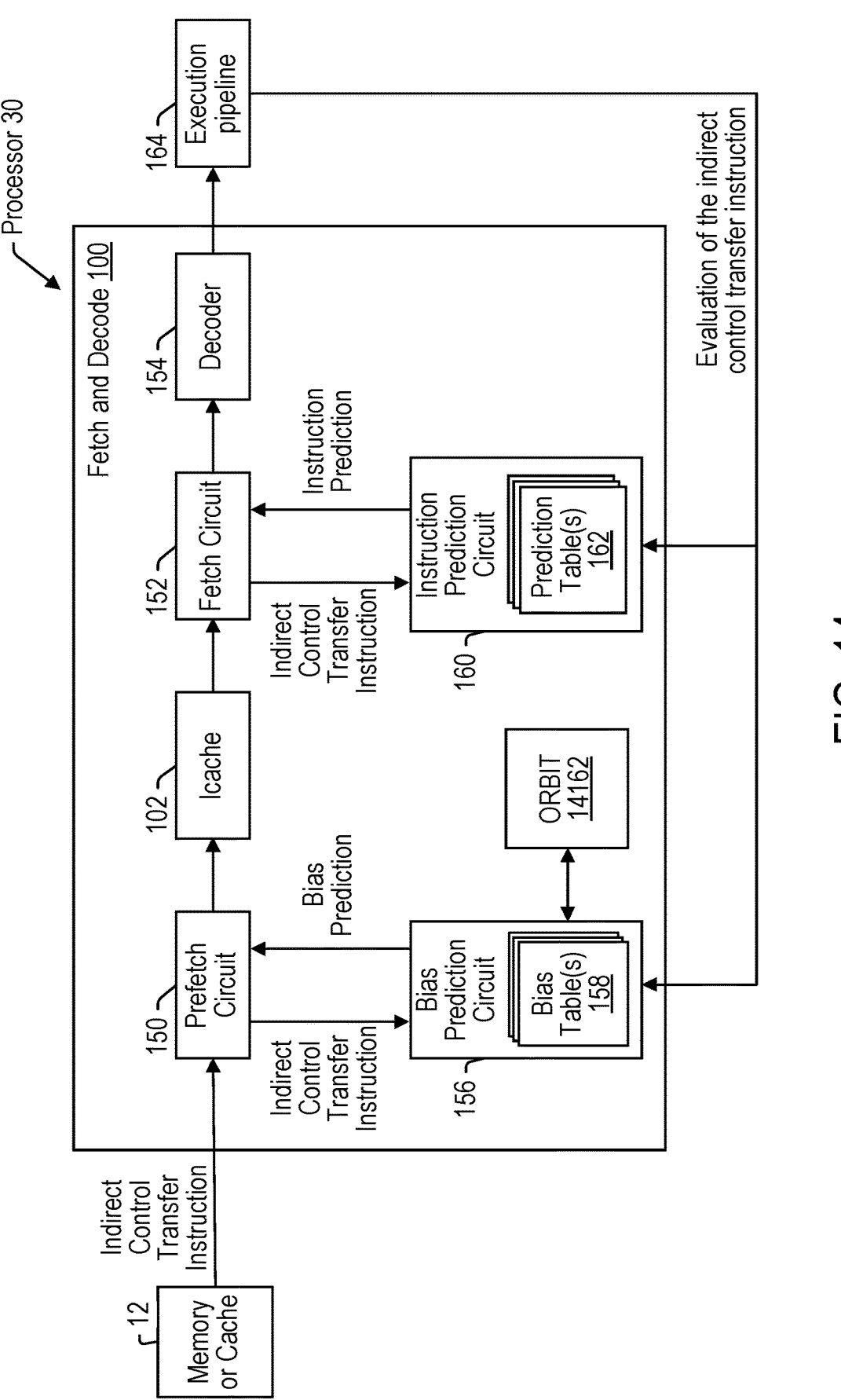
FIG. 14 is a block diagram of another embodiment of a portion of a processor including an indirect control transfer prediction circuit.

Turning now to FIG. 14, a block diagram of another embodiment of a portion of a processor 30 including an indirect control transfer prediction circuit 156 (hereinafter "prediction circuit") is shown. Sometimes during fetch of an indirect control transfer instruction to the Icache 102 (in the prefetch stage), prior to predicting the bias of the indirect control transfer instruction, the prediction circuit 156 may first determine whether the target address and/or address offset specified by (the argument(s) of) the indirect control transfer instruction is within a specific range, e.g., within a n-bit length. If the target address and/or address offset is within the range, the prediction circuit 156 may use the prediction table 158 to make the bias prediction for the indirect control transfer instruction, as described above. Conversely, if the target address and/or address offset is beyond the range, the prediction circuit 156 may use a separate prediction table 14162 (hereinafter "outside range biased indirects table" or "ORBIT") to make the bias prediction for the indirect control transfer instruction. Sometimes the ORBIT 14162 may be configured similarly to the prediction table 158 of FIG. 12 and may have more bits to store the (predicted) target address. Also, sometimes the prediction based on the ORBIT 14162 may be performed not during the prefetch stage, but rather a later stage, e.g., the fetch stage when the indirect control transfer instruction is fetched by the fetch circuit 152 out of the Icache 102 (e.g., to the decoder 154). Sometimes the processor 30 may include a TAGE-like (TAgged GEometric length) prediction table for predictions of conditional direct control transfer instructions. In that case, the ORBIT 14162 may be implemented as part of the TAGE-like prediction table to predict branches with long target addresses and/or address offsets. For example, the TAGE-like prediction table may include T0, T1, and T2 tables implemented based on different lengths of history, and the ORBIT 14162 may be implemented as a T3 table of the TAGE-like prediction table, except that it is generated/updated similar to the prediction table 158 as described above. Note that FIG. 14 is provided only as an example for purposes of illustration. As described above, sometimes the processor 30 may use the same prediction circuit 156, and/or the prediction circuit 156 may also use the same prediction table 158, to make bias predictions for other types of instruction, e.g., conditional direct control transfer instructions, conditional (e.g., conditional selection or CSEL) instructions, and/or the like. Sometimes the prediction tables 158 and 162 may be implemented as one single table.

Sometimes the prediction circuit 156 may be configured to support only specific types of indirect control transfer instructions and/or only specific registers. This may reduce the burden of the prediction circuit 156 such that the circuit may target only specific indirect control transfer instructions. This is beneficial especially if a large percentage of indirect control transfer instructions of a program is those specific types of indirect control transfer instructions using those specific registers. For example, for an ARM-based instruction set architecture (ISA), sometimes the prediction circuit 156 may be configured to support only the branch to register (BR) instruction, branch with link to register (BLR) instruction, branch to register with pointer authentication (BRAA, BLRAA, and BLRAAZ) instructions. In addition, sometimes the prediction circuit 156 may be configured to support only one or more specific registers (as arguments) (e.g., X16, X8, X9, X20, etc.), and/or one or more specific combinations of registers (as arguments) (e.g., X8X9, X9X8, X16X17, X2X2, etc.) due to constraints on the size of information stored for individual instructions in the Icache. As described above, sometimes the recoded unconditional direct control transfer instruction may include encoded data indicative of the types of these specific conditional indirect control transfer instructions, and/or the register or register combinations. This may allow the processor to resolve the actual targets for the original conditional indirect instructions to detect mispredictions.

Turning now to FIG. 15, a flowchart illustrating one embodiment of operations of a processor 30 including a prediction circuit 156 is shown. In the illustrated embodiment, one or more instructions including an indirect control transfer instruction may be fetched by a prefetch circuit 150 from a memory or cache 112 to an Icache 102, as indicated in block 11502. During fetch of the indirect control transfer instruction to the Icache 102, a prediction circuit 156 may predict whether the indirect control transfer instruction is biased, as indicated in block 11504. Responsive to a prediction that the indirect control transfer instruction is biased, the prediction circuit 156 may cause the indirect control transfer instruction to be executed as an unconditional direct control transfer instruction according to the predicted bias, as indicated in block 11506. As described above, sometimes the prediction circuit 156 may cause the indirect control transfer instruction to be recoded to an unconditional direct control transfer instruction including a (predicted) target address, such that the recoded instruction may be decoded and/or executed without having to obtain the content from the argument(s) to determine the target address of the next instruction to execute.

Turning now to FIG. 16, a flowchart illustrating another embodiment of operations of a processor 30 including a prediction circuit 156 is shown. As described above, in some embodiments, a prediction circuit 156 may use a prediction table 158 to make predictions for indirect control transfer instructions. As indicated in FIG. 16, in the illustrated embodiment, for a given indirect control transfer instruction, the prediction circuit 156 may determine an index associated with the indirect control transfer instruction, as indicated in block 11602. As described above, sometimes the index may be determined based on hashing (e.g., using an XOR hashing function) an address associated with the indirect control transfer instruction. The prediction circuit 156 may search the prediction table 158, based on the index, to identify an entry corresponding to the indirect control transfer instruction, as indicated in block 11604. Once the entry is identified, the prediction circuit 156 may provide a bias prediction for the indirect control transfer instruction based on the prediction value in the identified entry of the prediction table 158, as indicated in block 11606. As described above, sometimes the prediction value in an entry may be one of two 1-bit values, where a value "1" may represent that the indirect control transfer instruction is predicted to be biased and a value "0" may represent that the indirect control transfer instruction is predicted to be non-biased. Also, as described above, sometimes the prediction values may have less or more bits, e.g., to implement a prediction hysteresis. In addition, as described above, sometimes the entry may also include a (predicted) target address of the next instruction to execute. Thus, the prediction circuit 156 may cause the indirect control transfer instruction to be recoded to an unconditional direct control transfer instruction to include the (predicted) target address, as indicted in block 11608.

Figure 17:
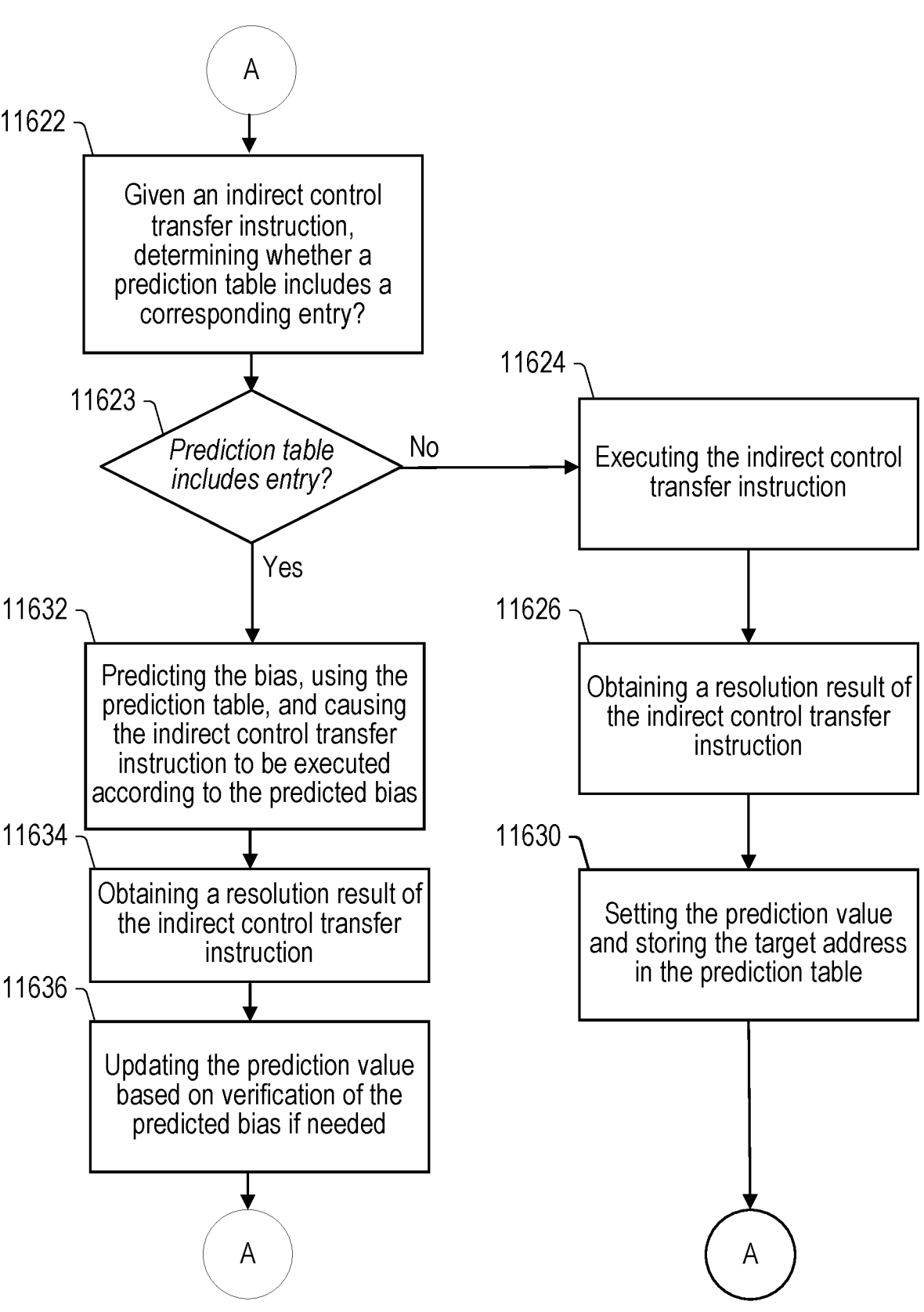
FIG. 17 is a flowchart illustrating yet another embodiment of operations of a processor including an indirect control transfer prediction circuit.

Turning now to FIG. 17, a flowchart illustrating yet another embodiment of operations of a processor 30 including a prediction circuit 156 is shown. FIG. 17 illustrates operations of a prediction circuit 156 to generate and update a prediction table 158. As indicated in FIG. 17, given an indirect control transfer instruction, the prediction circuit 156 may search the prediction table 158 to determine whether the prediction table 158 includes an entry corresponding to the indirect control transfer instruction, as indicated in block 11622. If the prediction table 158 does not include a corresponding entry for the indirect control transfer instruction, as indicated by a negative exit at 11623, the prediction circuit 156 may initiate creation of an entry for the indirect control transfer instruction in the prediction table 158. In some embodiments, creation of the entry may occur upon determination that the prediction table 158 does not include a corresponding entry for the indirect control transfer instruction while in other embodiments creation may deferred until after execution of the indirect control transfer instruction. The indirect control transfer instruction may then be executed, as indicated in block 11624.

After execution of the instruction, a resolution result from the execution of the indirect control transfer instruction may be obtained, as indicated in block 11626. The resolution result may indicate the actual target address of the next instruction that was executed. If an entry for the indirect control transfer instruction has not been created, it may be created at this time. Based on the resolution result, the prediction circuit may then set the prediction value to "1" (biased) and store the actual target address in the entry of the indirect control transfer instruction in the prediction table 158, as indicated in block 11630.

When the indirect control transfer instruction is fetched for the second time, the prediction tracking circuit 156 may again determine whether the prediction table 158 includes an entry corresponding to the indirect control transfer instruction, as indicated in block 11622. As described above, since an entry has been created for the indirect control transfer instruction (in block 11624), the prediction tracking circuit 156 may identify a corresponding entry from the prediction table 158 for the indirect control transfer instruction, as indicated by a positive exit at 11623. The prediction tracking circuit 156 may provide a bias prediction, using the prediction value of the identified entry of the prediction table 158, and cause the indirect control transfer instruction to be executed according to the predicted bias (as described in FIGS. 15-16), as indicated in block 11632. The prediction tracking circuit 156 may obtain a resolution result of the indirect control transfer instruction, as indicated in block

11634. As described above, the recoded instruction may include encoded data representing the original instruction, so that the true outcome of the original instruction may be resolved and misprediction may be determined. Given the resolution result, the prediction tracking circuit 156 may verify correctness of the bias prediction. For example, the prediction tracking circuit 156 may compare the predicted target address with the actual target address indicated by the resolution result. If the predicted target address does not match the actual target address, the prediction tracking circuit 156 may determine that the indirect control transfer instruction was mis-predicted, and then update the prediction value for the indirect control transfer instruction in the prediction table 158 from a biased value "1" to a no-biased value "0", as indicated in block 11636. As described above, sometimes once an indirect control transfer instruction is predicted to be non-biased, the prediction tracking circuit 156 may not update the prediction value in the prediction table 158 anymore and maintain it as the non-bias value "0". Also as described above, when the prediction tracking circuit 156 determines a misprediction, the prediction tracking circuit 156 may cause instructions younger than the indirect control transfer instruction to be flushed or removed from the instruction pipeline of the processor 30. As a result, other younger instructions may be fetched from a memory and/or cache 12 to an Icache 102. Once the previously-mis-predicted indirect control transfer instruction is fetched, it may be re-executed by the processor 30 as a non-biased indirect control transfer instruction.

Figure 18:
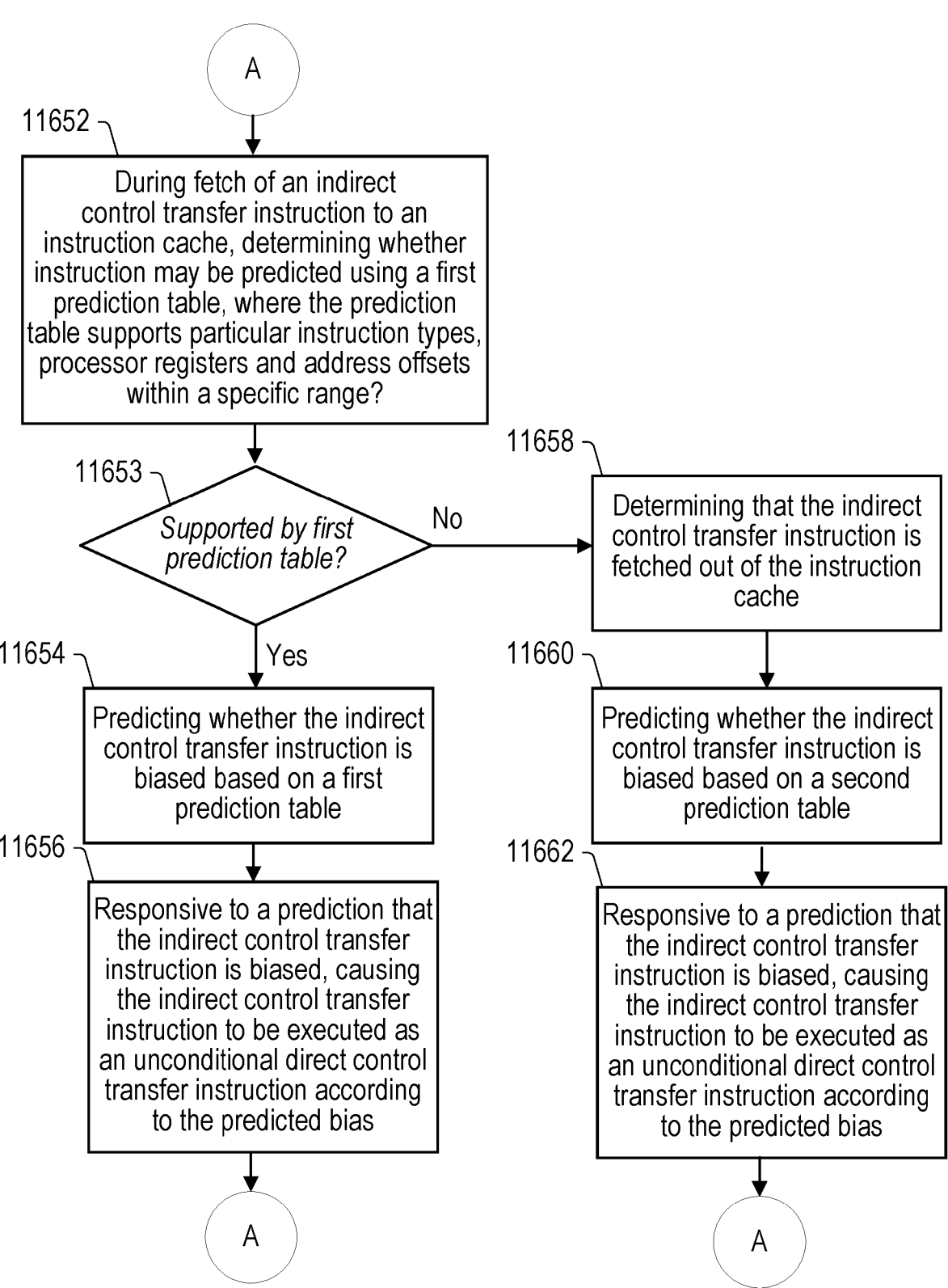
FIG. 18 is a flowchart illustrating still another embodiment of operations of a processor including an indirect control transfer prediction circuit.

Turning now to FIG. 18, a flowchart illustrating still another embodiment of operations of a processor 30 including a prediction circuit 156 is shown. In the illustrated embodiment, for a given indirect control transfer instruction, during fetch of the instruction from a memory or cache 12 to an Icache 102, the prediction circuit 156 may determine whether a bias prediction may be made for the instruction using a first or primary prediction table, such as a first prediction table 158. A primary prediction table may be usable for bias predictions, in various embodiments, provided prediction constraints on the indirect control transfer instruction are met.

For example, as discussed above in FIG. 14, sometimes the prediction circuit 156 may be configured to support, through a first prediction table, only specific types of indirect control transfer instructions and/or only specific registers. This may reduce the burden of the first prediction table and is beneficial especially if a large percentage of indirect control transfer instructions of a program is those specific types of indirect control transfer instructions using those specific registers. For example, for an ARM-based instruction set architecture (ISA), sometimes the first prediction table may be configured to support only the branch to register (BR) instruction, branch with link to register (BLR) instruction, branch to register with pointer authentication (BRAA, BLRAA, and BLRAAZ) instructions. In addition, sometimes the first prediction table may be configured to support only one or more specific registers (as arguments) (e.g., X16, X8, X9, X20, etc.), and/or one or more specific combinations of registers (as arguments) (e.g., X8X9, X9X8, X16X17, X2X2, etc.) due to constraints on the size of information stored for individual instructions in the Icache.

Furthermore, to support an instruction prediction using a first prediction table, a target address and/or an address offset specified by (the argument(s) of) the instruction is within a specified range, as indicated in block 11652. Responsive to a determination that the instruction type and target registers are supported and that the target address and/or address offset is within the specified range, as shown as a positive exit from 163, the prediction circuit 156 may provide a bias prediction for the indirect control transfer instruction and cause the instruction to be executed according to the predicted bias, as indicated in blocks 11654-11656. As described above, the prediction circuit 156 may perform the bias prediction during the prefetch stage of execution of the indirect control transfer instruction based on the prediction table 158. Conversely, responsive to a determination that an instruction type or register is not supported by the first prediction table or the target address and/or address offset is outside the specified range, as shown as a negative exit from 163, the prediction circuit 156 may wait until the instruction is fetched out of the Icache 102, e.g., to a decoder 154, as indicated in block 11658. The prediction circuit 156 may then provide a bias prediction for the indirect control transfer instruction and cause the instruction to be executed according to the predicted bias, as indicated in blocks 11660 and 11662. As described above, the prediction circuit 156 may perform the bias prediction during the fetch stage of the indirect control transfer instruction based on the ORBIT 14162. As described above, sometimes the two tables may be implemented using a single table.

Figure 19:
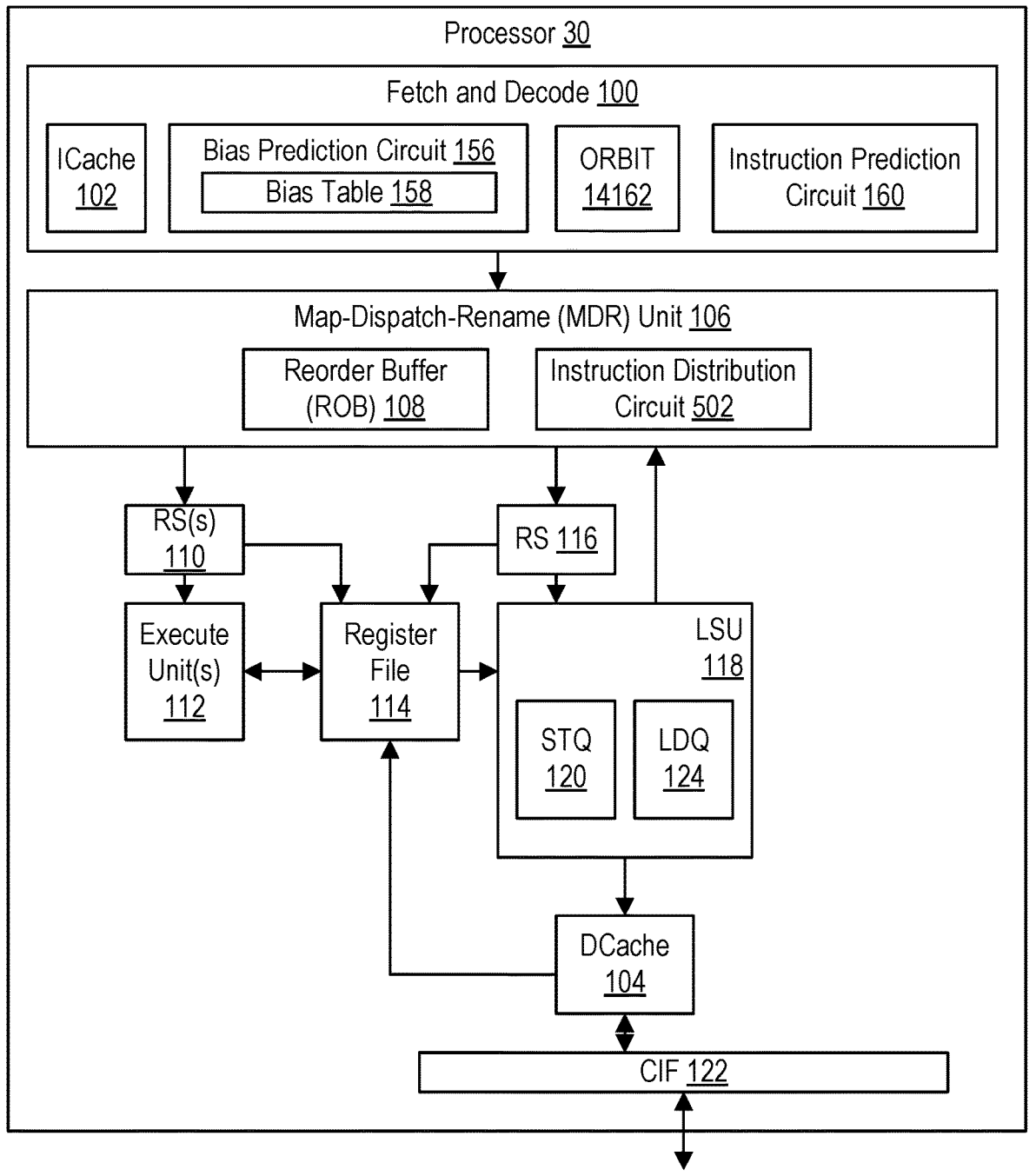
FIG. 19 is a block diagram of one embodiment of a processor shown in FIGS. 11-18 that includes an indirect control transfer prediction circuit.

FIG. 19 is a block diagram of one embodiment of a processor 30 that includes a prediction circuit 156 described in FIGS. 11-18. In the illustrated embodiment, the processor 30 includes a fetch and decode unit 100 (including the prediction circuit 156), a map-dispatch-rename (MDR) unit 106 (including a reorder buffer (ROB) 108), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 1128. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

As described above, the fetch and decode unit 100 may be configured to fetch instructions for execution by the processor 30 and decode the instructions into ops for execution. Note that FIG. 19 is provided only as an example for purposes of illustration and for purposes of illustration may not necessarily include all the components of the processor 30. For example, as described in FIG. 11, sometimes the fetch and decode unit 100 may further include a prefetch circuit 150, an Icache 102, a fetch circuit 152, and a decoder 154. More particularly, the fetch and decode unit 100 may be configured to cache instructions previously fetched from memory (through the CIF 122) in the ICache 102, and may be configured to fetch a speculative path of instructions for the processor 30. As described above, in the illustrated embodiment, the fetch and decode unit 100 may include a prediction circuit 156 to provide bias predictions for indirect control transfer instructions based on prediction table 158 and/or ORBIT 14162. Responsive to a determination that an indirect control transfer instruction is biased, the fetch and decode unit 100 may be configured to cause the indirect control transfer instruction to be executed as an unconditional direct control transfer instruction, e.g., through recoding, according to the predicted bias. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The MDR unit 106 may be configured to map the ops to speculative resources (e.g., physical registers) to permit out-of-order and/or speculative execution and may dispatch the ops to the reservation stations 110 and 116. The ops may be mapped to physical registers in the register file 114 from the architectural registers used in the corresponding instructions. That is, the register file 114 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for the speculative execution and retiring ops or flushing mis-speculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 1128 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 1146/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledge-ment/non-acknowledgement signals from/to a peripheral device of the system including the processor 30.

The execution units 112 may include any types of execu-tion units in various embodiments. For example, the execu-tion units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of one other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodi-ments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 20:
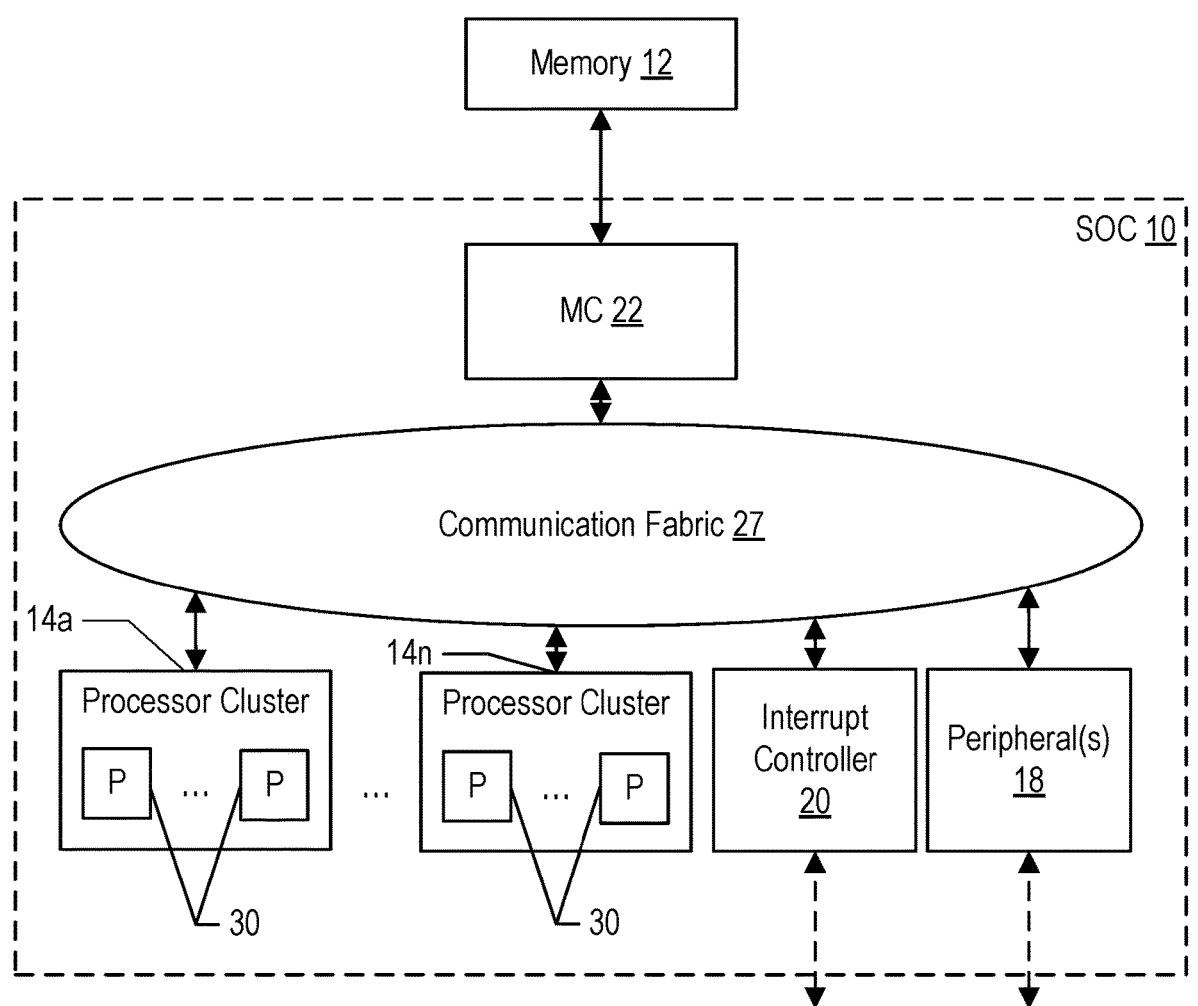
FIG. 20 is a block diagram of one embodiment of system on a chip (SOC) that may include one or more processors shown in FIG. 19.

Turning now to FIG. 20, a block diagram one embodiment of a system 10 that may include one or more processors 30 described in FIGS. 11-19. In the illustrated embodiment, the system 10 may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14a-14n, the interrupt con-troller 20, one or more peripheral components 18 (more briefly, "peripherals"), a memory controller 22, and a com-munication fabric 27. The components 14a-14n, 18, 20, and 22 may all be coupled to the communication fabric 27. The memory controller 22 may be coupled to the memory 12 during use. In some embodiments, there may be more than one memory controller coupled to corresponding memory.

The memory address space may be mapped across the memory controllers in any desired fashion. In the illustrated embodiment, the processor clusters 14a-14n may include the respective plurality of processors (P) 30 and the respective processors (P) 30 may further include a respective prediction circuit 156 (and prediction table 158 and/or ORBIT 14162) as described in FIGS. 11-19. The processors 30 may form the central processing units (CPU(s)) of the SOC 10. In an embodiment, one or more processor clusters 14a-14n may not be used as CPUs.

As mentioned above, the processor clusters 14a-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 20, such as the processors 30 in each processor cluster 14a-14n may vary from embodiment to embodiment. Additionally, the number of processors 30 in one processor cluster 14a-14n may differ from the number of processors 30 in another processor cluster 14a-14n. There may be more or fewer of each component/subcomponent than the number shown in FIG. 20.

Biased Conditional Select Prediction

Computing systems generally include one or more processors that serve as central processing units (CPUs). The CPUs execute the control software (e.g., an operating system) that controls operation of the various peripherals. The CPUs can also execute applications which provide user functionality in the system. Sometimes a processor may implement an instruction pipeline that includes multiple stages, where instructions are divided into a series of steps individually executed at the corresponding stages of the pipeline. Sometimes the instructions of a program may include conditional instructions, for example conditional select instructions, conditional set instructions, conditional set mask instructions, conditional increment instructions, conditional invert instructions, conditional negate instructions, conditional select increment instructions, conditional select invert instructions, conditional select negate instructions and so forth. The following discussion will use the terms conditional instruction and conditional select instruction interchangeably, although it should be understood that the various aspects of these instructions could be applied to any number of conditional instruction types, in various embodiments.

A conditional select instruction may generally choose one of two alternative data values to load according to a condition of the instruction. Sometimes a conditional select instruction may be biased, meaning that the comparison of the conditional select instruction always or at least most times is true (or false). If the bias of a conditional select instruction can be predicted ahead of time, a processor may not necessarily have to wait for the condition to be resolved, and may instead execute the conditional select instruction and the next instruction(s) in advance. This can reduce waiting time and delays and improve executional speed and performance of a processor. Thus, it is desirable for a processor to have the abilities to predict the bias of conditional select instructions and execute the conditional select instructions according to the predictions.

As used herein, a "biased conditional select instruction" refers to a conditional select instruction that (a) depends on a condition that is not guaranteed to be known with certainty (i.e., remains speculative) until the instruction actually executes (for example, whether the conditional select instruction is taken or not taken, the target value of the conditional select instruction, and/or any other aspect of the conditional select instruction that may remain speculative prior to execution) and (b) based on actual execution behavior (i.e., dynamically, as opposed to statically), is treated as an unconditional conditional select instruction during a period of time.

That is, when a conditional select instruction is dynamically designated as "biased" (or equivalently, in a "biased state"), this is a prediction that the conditional select instruction will behave unconditionally in a consistent manner for a period of time.

It is noted that designating a conditional select instruction as biased is a dynamic form of prediction that is dependent upon runtime behavior of the instruction, not a static prediction that could be performed independently of instruction execution (e.g., at compile time).

In some embodiments, a conditional select instruction that is initially not designated as biased could transition to a biased state based on its execution behavior the first time it is encountered. For example, if the conditional select instruction initially selects a first operand, it may be designated as biased, and thereafter treated as unconditional. If on some later occasion, the instruction is determined to select a different operand, it may transition to an unbiased state. In other embodiments, other criteria may be used to determine the transition into and out of the biased state. For example, the behavior of multiple instances of instruction execution may be considered before transitioning into or out of the biased state. Thus, for the period of time between when a conditional select instruction is designated as biased until this designation is removed, the conditional select instruction may be treated as unconditional. During this period, other forms of prediction, if available, may not be utilized. Once a conditional select instruction is no longer in a biased state, other types of predictors may be used to predict the instruction's behavior.

Figure 21:
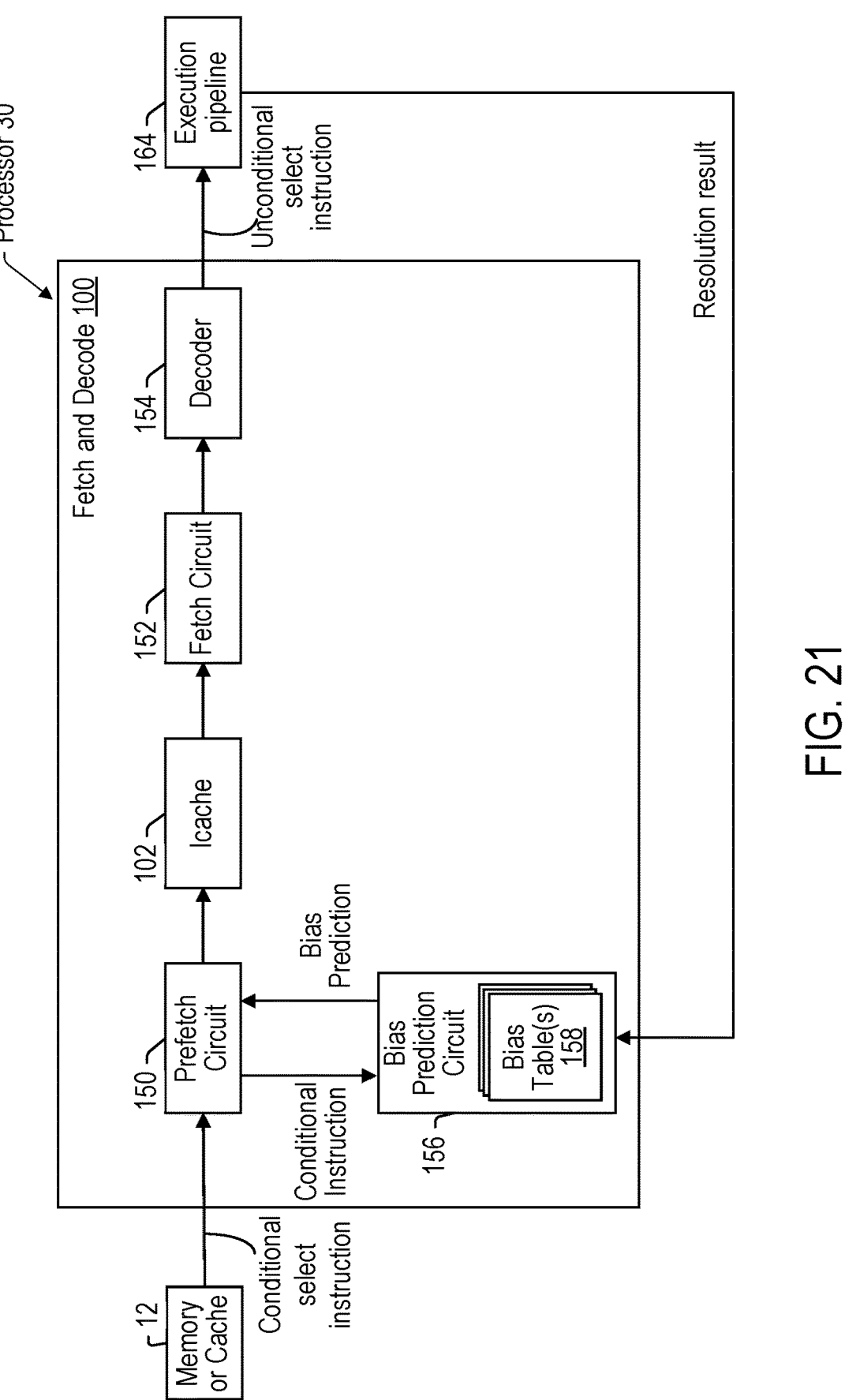
FIG. 21 is a block diagram of one embodiment of a portion of a processor including a control transfer prediction circuit.

Turning now to FIG. 21, a block diagram of one embodiment of a portion of a processor 30 including a conditional select prediction circuit 156 (hereinafter "prediction circuit") is shown. As indicated in FIG. 21, in the illustrated embodiment, a fetch and decode unit 100 of the processor 30 may include a prefetch circuit 150, a prediction circuit 156, an instruction cache (hereinafter "Icache") 102, a fetch circuit 152, and an instruction decoding circuit (hereinafter "decoder") 154. In the illustrated embodiment, for purposes of illustration, the prediction circuit 156 is shown to be implemented as a component separate from the prefetch circuit 150 of the fetch and decode unit 100. Alternatively, in some embodiments, the prediction circuit 156 may be implemented as part of the prefetch circuit 150, or outside the fetch and decode unit 100.

The fetch and decode unit 100 may fetch and decode instructions in a series of stages. For example, given an instruction, the fetch and decode unit 100 may first use the prefetch circuit 150 to fetch the instruction from a memory or cache 12 to the Icache 102 (hereinafter the "prefetch" stage). Sometimes the memory or cache 12 may be a main memory, such as a hard disk or flash memory, outside the processor 30, and/or a cache (e.g., a level-2 cache) functioning as an intermediary through which instructions may be fetched from a main memory to the instruction cache 102. Next, the instruction may be fetched by the fetch circuit 152 from the Icache 102 to the decoder 154 (hereinafter the "fetch" stage). The decoder 154 may decode the instruction, convert it to operation(s) and/or micro-operation(s) (hereinafter the "decoding" stage), and send the operation(s) and/or micro-operation(s) to an execution unit 212 for execution. Sometimes the execution unit 212 may be an integer, a floating point, and/or a vector execution unit, and may be associated with a reservation station 210, as described in FIG. 27. For purposes of illustration, FIG. 21 may not necessarily depict all the components of the processor 30. For example, sometimes the fetch and decode unit 100 may not necessarily send the operation(s) and/or micro-operation(s) to the execution unit 212 directly. Instead, there may be one or more other components coupled operatively in-between. For example, sometimes the processor 30 may include a map-dispatch-rename (MDR) unit 106 between the fetch and decode unit 100 and the execution pipeline 212, which may map the operation(s) and/or micro-operation(s) to speculative resources (e.g., physical registers) to permit out-of-order and/or speculative execution, and may dispatch the operation(s) and/or micro-operation(s) to the reservation stations 210.

Data flow of a program including a conditional select instruction may depend on the condition outcome of the conditional select instruction. Consider the following pseudocode of a conditional select (CSEL) instruction as an example. When the condition is true, the processor 30 may move w1 to w0 (e.g., w0=w1), or in other words, the first path (e.g., moving w1 to w0) may be taken and accordingly data may flow from w1 to w0. Conversely, when the condition is false, the processor 30 may move w2 to w0 (e.g., w0=w2), or in other words, the first path may not be taken and accordingly data may flow from w2 to 20. Like conditional control transfer instructions, a conditional select instruction may express a form of conditional expression to control how a program to be processed by the processor 30. However, unlike conditional control transfer instructions, a conditional select instruction may provide benefits such as compilation optimization. For example, the above 2-path selection example may be coded using the following pseudocode based on a conditional control transfer instruction. In addition, after compilation, the CSEL instruction and the conditional control transfer instruction may respectively generate the following exemplary assembly codes. As shown, the CSEL may be compiled into one line of assembly code, whereas the conditional control transfer instruction may have to generate assembly codes for each of the two paths. Thus, the compiled code of the CSEL instruction may apparently be more compact. The compaction of the conditional select instructions may sometimes result in fast execution and storage savings especially for mobile devices. Note that the CSEL instruction is provided only as an example for purposes of illustration. Sometimes, the conditional select instructions may include one or more other types of conditional select instructions. For example, for an ARM-based instruction set architecture (ISA), the conditional select instructions may include conditional select (CSEL) instruction, conditional set (CSET) instruction, conditional set mask (CSETM) instruction, conditional increment (CINC) instruction, conditional invert (CINV) instruction, conditional negate (CNEG) instruction, conditional select increment (CSINC) instruction, conditional select invert (CSINV) instruction, conditional select negate (CSNEG) instruction, and the like.

```
============================================================
CSEL w0, w1, w2, <condition>        // conditional select instruction
============================================================

============================================================
if <condition>                      // conditional control
                                    // transfer instruction
{
    w0 = w1;
}
else
{
    w0 = w2;
}
============================================================

============================================================
0x1004          cmp w11, #0         // condition>: does w11 equal 0?
                                    // set eq to 1 if <condition> is
                                    // true or 0 otherwise
0x1008          csel w0, w1, eq     // move w1 or w2 to w0 according
                                    // to eq's value
============================================================

============================================================
0x1004          cmp w11, #0         // <condition>; does w11 equal 0?
0x1008          b.neq 0x1014        // jump to 0x1014 if eq == 0
0x100b          mov w0, w1          // move w1 to w0
0x100F          b 0x1018            // jump to 0x1018
0x1014          mov w0, w2          // move w2 to w0
0x1018          ...
============================================================
```

In the illustrated embodiment, the fetch and decode unit 100 may use the prediction circuit 156 to predict the bias of conditional select instructions, and speculatively process the conditional select instructions according to the predictions. For example, in the illustrated embodiment, the prefetch circuit 150 may fetch one or more instructions from the memory or cache 12 to the Icache 102, and sometimes the instructions may include one or more conditional select instructions. For a given conditional select instruction, during fetch of the conditional select instruction to the Icache 102 (in the prefetch stage), the prediction circuit 156 may predict whether or not the conditional select instruction is biased to a condition outcome (e.g., biased true or biased false) affecting a data flow for the instruction. Responsive to a prediction that the comparison of the conditional select instruction is biased, the prediction circuit 156 may cause the conditional select instruction to be executed according to the predicted bias to effect the data flow. Again, consider the above CSEL instruction as an example. The prediction circuit 156 may predict that the condition of the CSEL dict a particular data flow (e.g., predicting how data flows from a source to a destination), as opposed to predicting a control flow as in the case for conditional control transfer instructions (e.g., predicting a target address from which a next instruction is to be fetched and executed). For other types of conditional select instructions, the prediction circuit 156 may cause the conditional select instructions to be re-coded to include an indication of the predicted bias. When the re-coded instructions are decoded and/or executed, the decoder 154 and/or execution unit 212 may be able to recognize the indication and execute the instructions according to the encoded predicted bias without having to wait for or check the conditions. Sometimes even though a conditional select instruction is caused to be executed as an unconditional select instruction, the original conditional select instruction may be still dispatched so that its condition may be resolved to verify correctness of the bias prediction, albeit the original conditional select instruction may not be entirely executed.

```
============================================================
MOV w0 w1   // re-coded to a move instruction
============================================================
``` instruction is biased false or biased true. If the CSEL instruction is predicted to be a biased instruction, the prediction circuit 156 may cause the CSEL instruction to be re-coded to a move (MOV) or zero-cycle move (ZCM) instruction according to the predicted bias. For example, if the CSEL instruction is predicted to be biased true, the prediction circuit 156 may cause the CSEL instruction to be re-coded to the following move instruction to thus move data from w1 to w0, and not include the <condition> anymore. Alternatively, if the CSEL instruction is predicted to be biased false, the prediction circuit 156 may cause the CSEL instruction to be re-coded to a MOV or ZCM instruction to thus move data from w2 to w0. In other words, the prediction of the conditional selection instruction may pre- One with skills in the art shall understand the disclosed prediction circuit 156 can increase executional speed and improve performance of the processor 30. The prediction circuit 156 may allow the processor 30 to speculatively execute a conditional select instruction based on a predicted bias of the conditional select instruction. This may reduce dependencies between the conditional select instructions and other instructions to reduce waiting time and delays. For example, for a given CSEL instruction, sometimes the source values (e.g., w1 and w2) may be ready, whereas the <condition> has to wait for an outcome of a <cmp> operation and the <cmp> operation is in-turn waiting for a data load after a cache miss. If the CSEL instruction is predicted to be a biased instruction, the processor 30 may bypass these dependencies to move the appropriate readily available source value (e.g., w1 or w2) to the destination (e.g., w0). In another example, one of the source values (e.g., w2) may be missing, e.g., due to a cache miss. If the CSEL instruction is predicted to be true, the unavailable source value (e.g., w2) does not matter anymore, as the processor 30 may proceed to move the available source value (e.g., w1) to the destination (e.g., w0). Thus, if the bias of a conditional select instruction can be predicted ahead of time, the processor 30 may be able to avoid the waiting time and delays and execute the conditional select instruction and rest of the instructions in advance.

Figure 22:
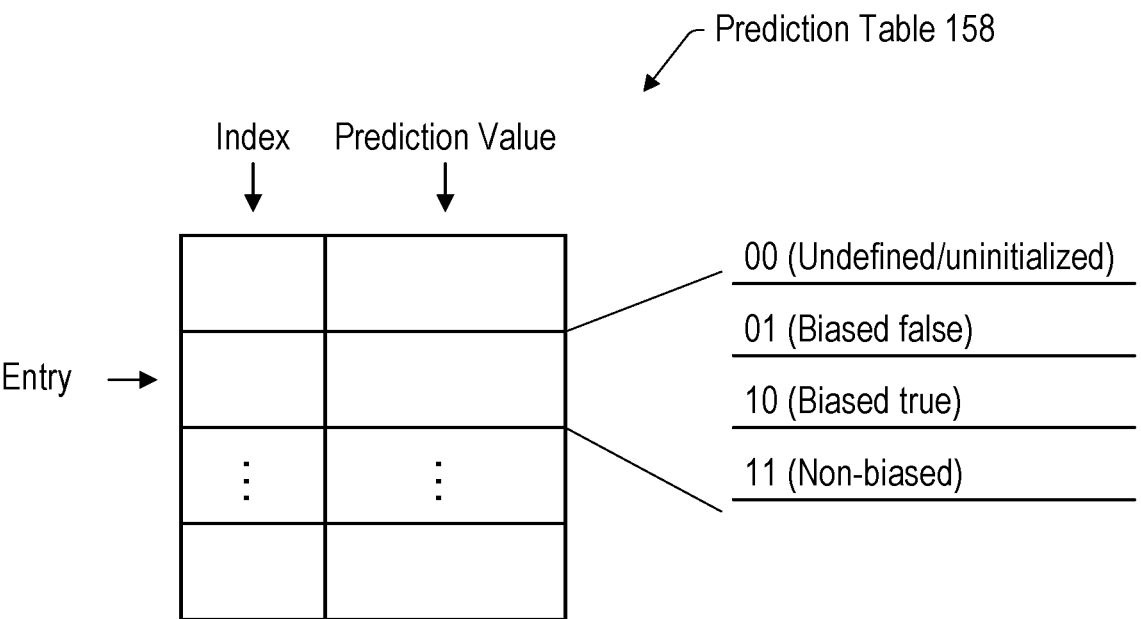
FIG. 22 shows one embodiment of a prediction table of a control transfer prediction circuit.

In the illustrated embodiment, the prediction circuit 156 may use a prediction table 158 to make predictions for conditional select instructions. FIG. 22 shows an example prediction table 158. In the illustrated embodiment, the prediction table 158 may include one or more entries corresponding respectively to one or more conditional select instructions. Each entry may include an index and a prediction value. Each index may be associated with one corresponding conditional select instruction, and thus may be used by the prediction circuit 156 to search the prediction table 158 to identify the corresponding entry for a given conditional select instruction. Once an entry is identified, the prediction circuit 156 may use the prediction value in the entry to make the bias prediction for the conditional select instruction. Sometimes the index for a conditional select instruction may be generated based on hashing an address associated with the conditional select instruction, which may be obtained from a program counter ("PC"). Thus, the conditional select instruction address and the prediction value may be considered a key-value pair, where the conditional select instruction address is the "key" that may be used to search for prediction value, or the "value", corresponding to the conditional select instruction. Sometimes the hashing may include the conditional select instruction address as well as a resolution history of the conditional select instructions from previous executions. Any appropriate hashing function, e.g., exclusive-OR (XOR) and the like, may be used to generate indices of the entries.

As indicated in FIG. 22, in the illustrated embodiment, the prediction value in an entry of the prediction table 158 may be one of four 2-bit values. For example, a value "00" may represent an initial state that no prediction has been provided by the prediction circuit 156 for the corresponding conditional select instruction. Or in other words, the conditional select instruction has not been encountered or fetched by the prefetch circuit 150 in the past. A value "01" may represent that the condition of a conditional select instruction is predicted to be biased false. A value "10" may represent that the condition of a conditional select instruction is predicted to be biased true. A value "11" may represent that the conditional select instruction is predicted to be not biased (e.g., neither biased true nor biased false). Note that the prediction table 158 of FIG. 22 is provided only as an example for purposes of illustration. In some embodiments, the prediction values of a prediction table may have less or more bits. For example, sometimes the prediction values may have more bits to implement a prediction hysteresis.

In addition, sometimes the processor 30 may use the same prediction circuit 156, and/or the prediction circuit 156 may also use the same prediction table 158, to make bias predictions for conditional control transfer instructions. For example, the prediction circuit 156 may expand the size or number of entries of the prediction table 158, such that it may cover not only the conditional select instructions as described above but also conditional control transfer instructions encountered by the prefetch circuit 156 and the prediction circuit 156. In that case, the prediction circuit 156 may predict whether a conditional control transfer instruction is biased, similar to the above described predictions provided for conditional select instructions, e.g., during the fetch of the conditional control transfer instruction by the prefetch circuit 150 to the Icache 102. The prediction may indicate if the conditional control transfer instruction is in the initial state (e.g., encountered by the prefetch circuit 150 and the prediction circuit 156 for the first time), biased true (e.g., the comparison of the conditional control transfer instruction is predicted to be always true), biased false (e.g., the comparison of the conditional control transfer instruction is predicted to be always false), or non-biased. Responsive to a prediction that the conditional control transfer instruction is biased (e.g., biased true or biased false), the prediction circuit 156 may cause the conditional control transfer instruction to be executed according to the predicted bias. For example, the prediction circuit 156 may cause the conditional control transfer instruction to be re-coded as an unconditional control transfer instruction according to the biased true or false prediction. Note that the above is provided only an example for purposes of illustration. Sometimes alternatively the processor 30 may use separate prediction circuits and/or separate prediction tables for conditional select instructions and conditional control transfer instructions.

Figure 23:
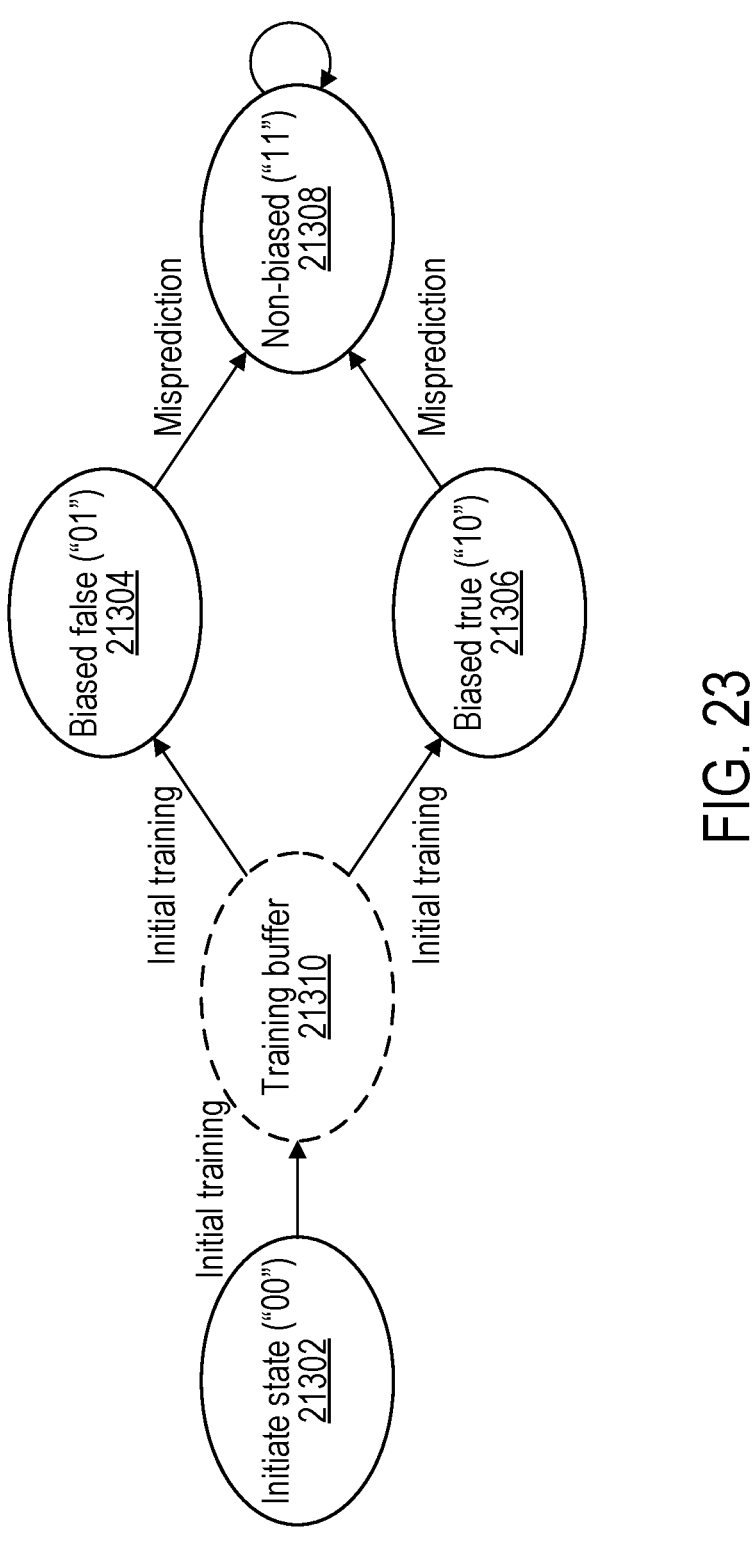
FIG. 23 shows one embodiment of a state machine to illustrate operations of a conditional prediction circuit to generate and update a prediction table.

Turning now to FIG. 213, a state machine is shown to illustrate operations of the prediction circuit 156 to generate and update the prediction table 158. As indicated in FIG. 23, circles 21302, 21304, 21306, and 21308 may represent the four possible prediction values in the prediction table 158 of FIG. 22. For example, the circle 21302 may represent the initial state "00", circle 21304 may represent the false prediction "01", circle 21306 may represent the true prediction "10", and circle 21308 may represent the non-biased prediction "11". Sometimes, as described below, the prediction circuit 156 may optionally use an training buffer 21310 to train the prediction table 158 for a conditional select instruction in the initial state. In addition, the edges of FIG. 23 may indicate the change of values when a value gets updated by the prediction circuit 156.

As described above, when a conditional select instruction is fetched by the prefetch circuit 150 from the memory or cache 12 to the Icache 102 (in the prefetch stage), the prediction circuit 156 may search the prediction table 158 for an entry corresponding to the conditional select instruction. For example, the prediction circuit 156 may use the conditional select instruction address as the "key" to determine an index. The prediction circuit 156 may use the index to search the prediction table 158 for the corresponding entry. If no prediction has been provided to the conditional select instruction in the past (e.g., if the prediction circuit 156 has not encountered the conditional select instruction before), there may be no entry for the conditional select instruction in the prediction table 158. In that case, the prediction circuit 156 may create an entry for the conditional select instruction in the prediction table 158, and set the prediction value for the conditional select instruction to the initial state value "00". Sometimes the prediction circuit 158 may set all prediction values in the prediction table 158 to the initial state value "00" at booting or power-up of the processor 30.

Next, the conditional select instruction may be fetched by the fetch circuit 152 from the Icache 102 to the decoder 154. The decoder 154 may decode the conditional select instruction and send it to the execution unit 212 for execution. The execution of the conditional select instruction may resolve the comparison of the conditional select instruction to thus actually determine whether the condition is true or false. The prediction circuit 156 may use the resolution result for predicting the bias of the conditional select instruction in the future. For example, if the resolution result indicates that the comparison of the conditional select instruction is true (or, alternatively, false), the prediction circuit 156 may accordingly update the prediction value for the conditional select instruction in the prediction table 158 to "1" (biased true) (or "01" when biased false). The prediction circuit 156 may then provide the prediction for the conditional select instruction based on the updated prediction value from the prediction table 158 the next time when it is fetched by the prefetch circuit 150 to the Icache 102.

Sometimes the processor 30 may execute instructions out of order. Or in other words, the conditional select instruction may be executed speculatively prior to other instructions older than the conditional select instruction. In that case, the prediction circuit 156 may optionally use a training buffer 21310 to temporarily store a bias prediction value until the conditional select instruction becomes non-speculative, as indicated by the edges of FIG. 23. For instance, in the aforementioned example, the prediction circuit may generate a prediction value "10" (or "01" when biased false) for the conditional select instruction in the training buffer 21310 based on the resolution result from the execution of the conditional select instruction. The prediction circuit 156 may wait until a determination that the conditional select instruction becomes non-speculative, or in other words, all instructions older than the conditional select instructions have retired or at least have been executed. Until then, the prediction circuit 156 may update the prediction value in the prediction table 158 from the initial state "00" to the biased true value "10" (or "01" when biased false) according to the temporary prediction value stored in the training buffer 21310. Sometimes the training buffer 21310 may be implemented using any appropriate memory storage components and/or devices, e.g., register(s) and/or memory cache(es).

Sometimes the prediction circuit 156 may obtain the determination of non-speculativeness based on information in a reorder buffer circuit 108 (hereinafter reorder buffer or ROB) of the processor 30. As described below in FIG. 27, the reorder buffer 108 may be used to track the program order of ops and manage retirement/flush. The reorder buffer 108 may maintain a queue having entries corresponding to instructions under execution. When the conditional select instruction becomes non-speculative, the entry corresponding to the conditional select instruction may move to the top of the queue. Thus, by monitoring the position of the entry in the queue, the non-speculativeness of the conditional select instruction may be determined. Once a conditional select instruction becomes non-speculative, the prediction circuit 156 may proceed to update the prediction value for the conditional select instruction in the prediction table 158 according to the temporary prediction value stored in the training buffer 21310, as described above. Sometimes the prediction instruction circuit 156 may delete the temporary prediction value from the training buffer 21310 after the prediction table 158 is updated. Sometimes the training may be performed only on a conditional select instruction in the initial state. Once a training is performed and the initial state is updated to a non-initial value, the prediction circuit 156 may not necessarily perform the training on the conditional select instruction anymore. When the conditional select instruction is fetched by the prefetch circuit 150 for the second time, the prediction circuit 156 may directly use the non-initial prediction value from the prediction table 158 to make the prediction.

Sometimes the bias of a conditional select instruction may be mis-predicted. In that case, the prediction circuit 156 may use the misprediction to further update the prediction value in the prediction table 158 for the conditional select instruction. For example, as described above, when a conditional select instruction is fetched and executed for the first time, the prediction circuit 156 may update the prediction value for the conditional select instruction in the prediction table 158 from the initial state value "00" to a biased prediction value, e.g., biased true "10" (or "01" when biased false). When the conditional select instruction is fetched for the second time by the prefetch circuit 150, the prediction circuit 156 may search the prediction table 158 to find the entry corresponding to the conditional select instruction, and identify that the prediction value in the entry is the biased state value, e.g., biased true "10" (or "01" when biased false). Accordingly, the prediction circuit 156 may predict that the conditional select instruction is biased true (or biased false) based on the prediction value from the prediction table 158. Then, the prediction circuit 156 may cause the conditional select instruction to be executed according to the predicted bias, e.g., as an unconditional select instruction. For example, as described above, if the conditional select instruction is a CSEL instruction, the prediction circuit 156 may cause the CSEL instruction to be re-coded to a MOV or ZCM instruction not including the <condition> anymore.

As described, the prediction circuit 156 may still cause the original conditional select instruction to be dispatched, so that the instruction may be resolved and the actual outcome of the condition may be determined. The prediction circuit 156 may use the resolution result to verify correctness of the bias prediction. For example, the prediction circuit 156 may compare the bias prediction with the resolution result, e.g., the actual outcome of the condition. If the two match, the prediction circuit 156 may determine that the bias was correctly predicted. Conversely, if the bias prediction does not match the resolution result, the prediction circuit 156 may determine that the bias was mis-predicted. In that case, the prediction circuit 156 may update the prediction value, e.g., biased true "10" (or "01" when biased false), to the non-bias value "11", as indicated by the edges of FIG. 23. When the conditional select instruction is fetched for the third time, the prediction circuit 156 may thus use the updated information from the prediction table 158 to predict that the conditional select instruction is non-biased. Accordingly, the conditional select instruction may not be re-coded, and the processor 30 may treat the instruction as a regular conditional select instruction (e.g., as if the processor 30 does not include the prediction circuit 156). For example, if the conditional select instruction is a CSEL instruction, the processor 30 may wait until the outcome of the condition of the CSEL instruction is resolved, and then choose one of the two paths for executing the CSEL instruction based on the resolved outcome of the condition. Sometimes when a misprediction is detected, the prediction circuit 156 may cause the mis-predicted conditional select instruction and/or all the fetched instructions younger than the mis-predicted conditional select instruction to be flushed or removed from the instruction pipeline of the processor 30. In other words, the speculative execution (based on the misprediction) may be thrown away in the event of a misprediction. As a result, the conditional select instruction and/or those younger instructions may be re-fetched from the memory or cache 12 by the prefetch circuit 150 to the Icache 102. Once they are re-fetched, the conditional select instruction (and/or those younger instructions) may be re-executed by the processor 30 as a non-biased conditional select instruction, as described above, to thus correct the previous misprediction. Sometimes, responsive to detection of a misprediction, the prediction circuit 156 may cause the cache line to be invalidated.

In the illustrated embodiment, once a conditional select instruction is predicted to be non-biased, the prediction circuit 156 may maintain the prediction value as non-biased value "11" and not update it anymore, as indicated by the edge of FIG. 23. This may allow the prediction circuit 156 to provide predictions only for conditional select instructions that always or at least most times are biased, instead of all conditional select instructions in a program. However, this is provided only as an example for purposes of illustration. In some embodiments, the non-biased conditional select instruction may be able to invoke a new training and a new biased prediction, e.g., biased true or false, may then be re-created. Sometimes the prediction circuit 156 may implement a prediction hysteresis. For example, the prediction circuit 156 may not necessarily update a biased prediction value to the non-biased value immediately after a misprediction is detected. Instead, the prediction circuit 156 may wait for a while to make the update. For example, when the prediction circuit 156 detects a misprediction for a conditional select instruction for the first time, the prediction circuit 156 may update the prediction value to a weak biased true value (or weak biased false value). If a misprediction is detected for the nth time, the prediction circuit 156 may then update the weak biased true value (or weak biased false value) to the non-biased value. To implement the additional states, the prediction values of the prediction table 158 may have more than 2 bits. For example, the prediction values may be 3-bit values, where "000" may represent an initial state, "001" may represent a biased false prediction, "010" may represent a weak biased false prediction, "011" may represent a weak biased true prediction, "100" may represent a biased true prediction, and "101" may represent a non-biased prediction.

Turning now to FIG. 24, a flowchart illustrating one embodiment of operations of a processor 30 including a prediction circuit 156 is shown. In the illustrated embodiment, one or more instructions including a conditional select instruction may be fetched by a prefetch circuit 150 from a memory or cache 12 to an Icache 102, as indicated in block 21402. During fetch of the conditional select instruction to the Icache 102, a prediction circuit 156 may predict whether the conditional select instruction is biased, as indicated in block 21404. Responsive to a prediction that the conditional select instruction is biased, e.g., biased true or biased false, the prediction circuit 156 may cause the conditional select instruction to be executed by the processor 30 according to the predicted bias, e.g., as an unconditional select instruction, as indicated in block 406. As described above, in some embodiments, the prediction circuit 156 may cause the conditional select instruction to be re-coded to include an indication of the predicted bias, such that the re-coded instruction may be decoded and/or executed without waiting for or checking the outcome of the condition. For example, if the conditional select instruction is a CSEL instruction, the prediction circuit 156 may cause the CSEL instruction to be re-coded to a MOV or ZCM instruction that does not include the <condition> anymore.

Turning now to FIG. 25, a flowchart illustrating another embodiment of operations of a processor 30 including a prediction circuit 156 is shown. As described above, in some embodiments, a prediction circuit 156 may use a prediction table 158 to make predictions for conditional select instructions. As indicated in FIG. 25, in the illustrated embodiment, for a given conditional select instruction, the prediction circuit 156 may determine an index associated with the conditional select instruction, as indicated in block 21502. As described above, sometimes the index may be determined based on hashing (e.g., using an XOR hashing function) an address associated with the conditional select instruction. The prediction circuit 156 may search the prediction table 158, based on the index, to identify an entry corresponding to the conditional select instruction, as indicated in block 21504. Once the entry is identified, the prediction circuit 156 may provide a bias prediction for the conditional select instruction based on the prediction value in the identified entry of the prediction table 158, as indicated in block 21506. As described above, sometimes the prediction value in an entry may be one of four 2-bit values, where a value "00" may represent an initial state that no prediction has been provided to the conditional select instruction, a value "01" may represent that the condition of a conditional select instruction is predicted to be biased false, a value "10" may represent that the condition of a conditional select instruction is predicted to be biased true, and a value "11" may represent that the conditional select instruction is predicted to be not biased (e.g., neither biased true nor biased false). Also, as described above, sometimes the prediction values may have less or more bits, e.g., to implement a prediction hysteresis.

Figure 26:
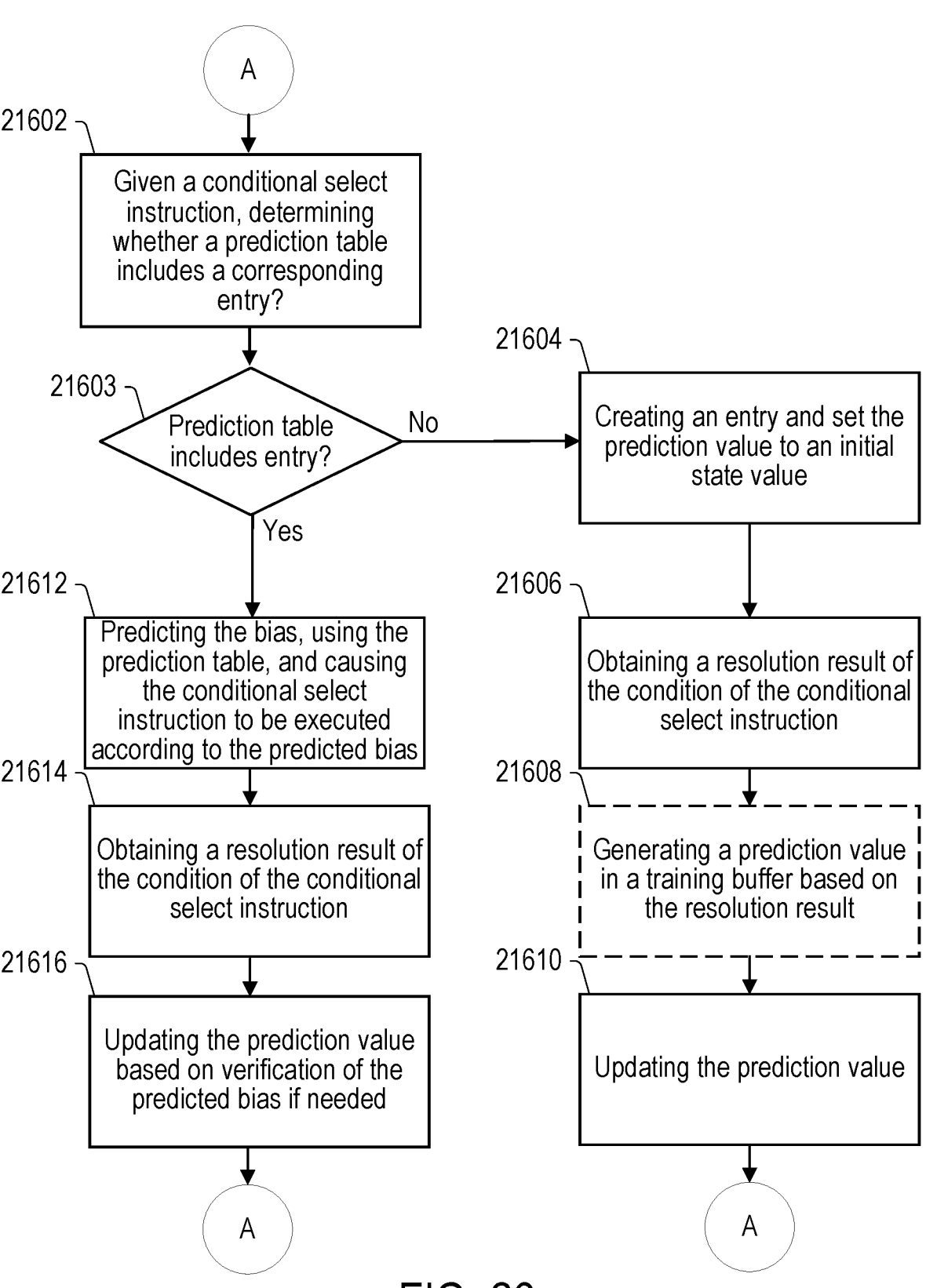
FIG. 26 is a flowchart illustrating yet another embodiment of operations of a processor including a control transfer prediction circuit.

Turning now to FIG. 26, a flowchart illustrating yet another embodiment of operations of a processor 30 including a prediction circuit 156 is shown. FIG. 26 illustrates operations of a prediction circuit 156 to generate and update a prediction table 158. As indicated in FIG. 26, given a conditional select instruction, the prediction circuit 156 may search the prediction table 158 to determine whether the prediction table 158 includes an entry corresponding to the conditional select instruction, as indicated in block 21602. If the prediction table 158 does not include a corresponding entry for the conditional select instruction, as indicated by a negative exit from 21603, the prediction circuit 156 may create an entry for the conditional select instruction in the prediction table 158, and set the prediction value for the conditional select instruction to an initial state value (e.g., "00"), as indicated in block 21604. This may happen when the conditional select instruction is fetched by the prefetch circuit 150 for the first time, and/or at booting or power-up of the processor 30.

The prediction instruction 156 may wait for the conditional select instruction to be executed and then obtain a resolution result of the condition from the execution of the conditional select instruction, as indicated in block 21606. The resolution result may indicate whether the conditional select instruction was actually true or false. Based on the resolution result, the prediction circuit may update the prediction value of the prediction table 158 for the conditional select instruction from the initial state value to a bias true or a biased false value, as indicted in block 21610.

As described above, sometimes the processor 30 may execute the conditional select instruction speculatively out of order. Thus, sometimes the prediction circuit 156 may optionally use a training buffer 21310 to perform a training on the conditional select instruction before updating the prediction table 158. For example, the prediction circuit 156 may first generate a (temporary) prediction value for the conditional select instruction in the training buffer 21310 based on the resolution result, as indicated in block 21608. If the resolution result indicates that the conditional select instruction was actually true, the (temporary) prediction value may be biased true (or "10"). Conversely, if the resolution result indicates that the conditional select instruction was actually false, the (temporary) prediction value may be biased false (or "01"). The prediction circuit 156 may wait until a determination that the conditional select instruction becomes non-speculative, and then update the prediction value for the conditional select instruction in the prediction table 158 according to the (temporary) prediction value in the training buffer 21310, as indicated in block 21610. As described above, sometimes the training may be performed only on a conditional select instruction in the initial state. Once a training is performed and the initial state is updated to a non-initial value, the prediction circuit 156 may not necessarily perform the training on the conditional select instruction anymore.

When the conditional select instruction is fetched for the second time, the prediction circuit 156 may again determine whether the prediction table 158 includes an entry corresponding to the conditional select instruction, as indicated in block 21602. As described above, since an entry has been created for the conditional select instruction (in block 21604), the prediction circuit 156 may identify a corresponding entry from the prediction table 158 for the conditional select instruction, as indicated by a positive exit from 21603. The prediction circuit 156 may provide a bias prediction, using the prediction value of the identified entry of the prediction table 158, and cause the conditional select instruction to be executed according to the predicted bias (as described in FIGS. 24-25), as indicated in block 21612. The prediction circuit 156 may obtain a resolution result of the comparison of the conditional select instruction, as indicated in block 21614. As described above, even though the conditional select instruction is executed according to the predicted bias, the original conditional select instruction may be still dispatched so that its condition may be resolved to verify correctness of the bias prediction, albeit the original conditional select instruction may not be entirely executed. Given the resolution result, the prediction circuit 156 may verify correctness of the bias prediction. For example, the prediction circuit 156 may compare the bias prediction with the resolution result. If the bias prediction does not match the resolution result, the prediction circuit 156 may determine that the conditional select instruction was mis-predicted, and then update the prediction value for the conditional select instruction in the prediction table 158 from the biased true (or biased false) value to a non-bias value, as indicated in block 21616. As described above, sometimes once a conditional select instruction is predicted to be non-biased, the prediction circuit 156 may not update the prediction value in the prediction table 158 anymore and maintain it as the non-bias value. Also as described above, when the prediction circuit 156 determines a misprediction, the prediction circuit 156 may cause the conditional select instruction and/or instructions younger than the conditional select instruction to be flushed or removed from the instruction pipeline of the processor. As a result, the conditional select instruction and/or the younger instructions may be re-fetched by a prefetch circuit 150 from a memory and/or cache 12 to an Icache 102. Once the previously-mis-predicted conditional select instruction is re-fetched, it may be re-executed by the processor 30 as a non-biased conditional select instruction.

Figure 27:
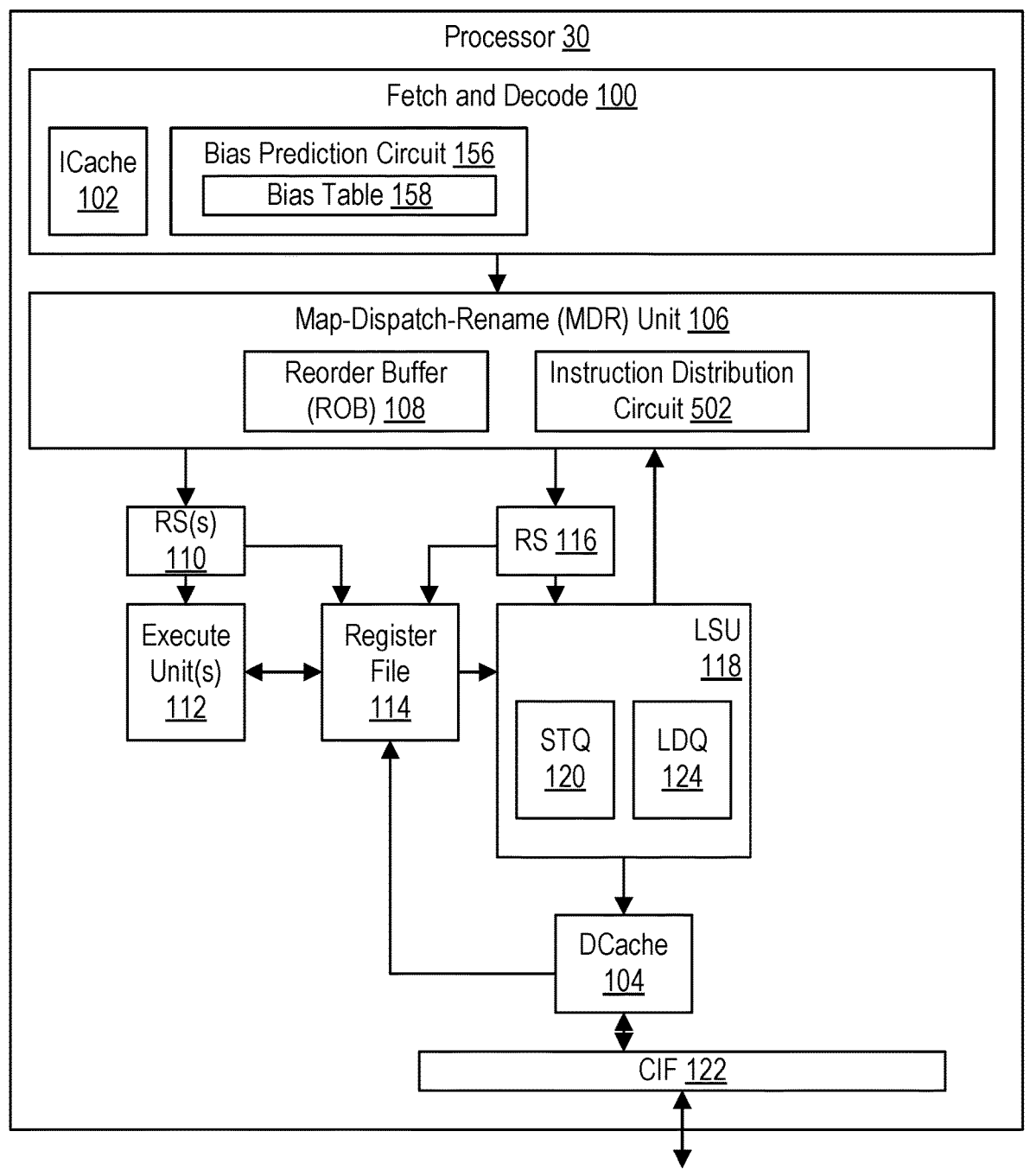
FIG. 27 is a block diagram of one embodiment of a processor shown in FIGS. 21-26 that includes a control transfer prediction circuit.

FIG. 27 is a block diagram of one embodiment of a processor 30 that includes a prediction circuit 156 described in FIGS. 21-26. In the illustrated embodiment, the processor 30 includes a fetch and decode unit 100 (including the prediction circuit 156), a map-dispatch-rename (MDR) unit 106 (including a reorder buffer (ROB) 108), one or more reservation stations 110, one or more execute units 212, a register file 214, a data cache (DCache) 104, a load/store unit (LSU) 218, a reservation station (RS) for the load/store unit 216, and a core interface unit (CIF) 122. The fetch and decode unit 100 is coupled to the MDR unit 106, which is coupled to the reservation stations 210, the reservation station 216, and the LSU 218. The reservation stations 210 are coupled to the execution units 2128. The register file 214 is coupled to the execute units 212 and the LSU 218. The LSU 218 is also coupled to the DCache 104, which is coupled to the CIF 122 and the register file 214. The LSU 218 includes a store queue 120 (STQ 120) and a load queue (LDQ 124).

As described above, the fetch and decode unit 100 may be configured to fetch instructions for execution by the processor 30 and decode the instructions into ops for execution. Note that FIG. 27 is provided only as an example for purposes of illustration and for purposes of illustration may not necessarily include all the components of the processor 30. For example, as described in FIG. 21, sometimes the fetch and decode unit 100 may further include a prefetch circuit 150, a Icache 102, a fetch circuit 152, and a decoder 154. More particularly, the fetch and decode unit 100 may be configured to cache instructions previously fetched from memory (through the CIF 122) in the ICache 102, and may be configured to fetch a speculative path of instructions for the processor 30. As described above, in the illustrated embodiment, the fetch and decode unit 100 may include a prediction circuit 156 to provide bias predictions for conditional select instructions. Responsive to a determination that a conditional select instruction is biased, the fetch and decode unit 100 may be configured to generate an indication of the predicted bias so that the conditional select instruction may be decoded and/or executed according to the predicted bias. Sometimes, the fetch and decode unit 100 may re-code a conditional select instruction, e.g., from a CSEL instruction to a MOV instruction, such that the conditional select instruction may be decoded and/or executed as an unconditional select instruction. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or op.

The MDR unit 106 may be configured to map the ops to speculative resources (e.g., physical registers) to permit out-of-order and/or speculative execution, and may dispatch the ops to the reservation stations 210 and 216. The ops may be mapped to physical registers in the register file 214 from the architectural registers used in the corresponding instructions. That is, the register file 214 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for the speculative execution and retiring ops or flushing mis-speculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 2128 and the LSU 218, e.g., in reservation stations 216 and 210. Other embodiments may implement a centralized scheduler if desired.

The LSU 218 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 216, which may be configured to monitor the source operands of the operations to determine when they are available and then issue the operations to the load or store pipelines, respectively. Some source operands may be available when the operations are received in the reservation station 216, which may be indicated in the data received by the reservation station 216 from the MDR unit 106 for the corresponding operation. Other operands may become available via execution of operations by other execution units 212 or even via execution of earlier load ops. The operands may be gathered by the reservation station 116, or may be read from a register file 214 upon issue from the reservation station 216.

In an embodiment, the reservation station 216 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 216, the MDR unit 106 may include circuitry that pre-allocates LDQ 124 or STQ 120 entries to operations transmitted to the load/store unit 218. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 216 may issue operations in program order and LRQ 2146/STQ 120 assignment may occur at issue from the reservation station 216.

The LDQ 124 may track loads from initial execution to retirement by the LSU 218. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 216, the LSU 218 may be configured to generate the address accessed by the load/store, and may be configured to translate the address from an effective or virtual address created from the address operands of the load/store address op to a physical address actually used to address memory. The LSU 218 may be configured to generate an access to the DCache 104. For load operations that hit in the DCache 104, data may be speculatively forwarded from the DCache 104 to the destination operand of the load operation (e.g., a register in the register file 214), unless the address hits a preceding operation in the STQ 120 (that is, an older store in program order) or the load is replayed. The data may also be forwarded to dependent ops that were speculatively scheduled and are in the execution units 212. The execution units 212 may bypass the forwarded data in place of the data output from the register file 214, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 218 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 216 may issue any number of loads up to the number of load pipes in the same clock cycle. The LSU 218 may also implement one or more store pipes, and in particular may implement multiple store pipes. The number of store pipes need not equal the number of load pipes, however. In an embodiment, for example, two store pipes may be used. The reservation station 216 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 218. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledgement/non-acknowledgement signals from/to a peripheral device of the system including the processor 30.

The execution units 212 may include any types of execution units in various embodiments. For example, the execution units 212 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 212 may comprise hardware configured to perform the operations defined for the ops that the particular execution unit is defined to handle. The execution units may generally be independent of one other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 212 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 28:
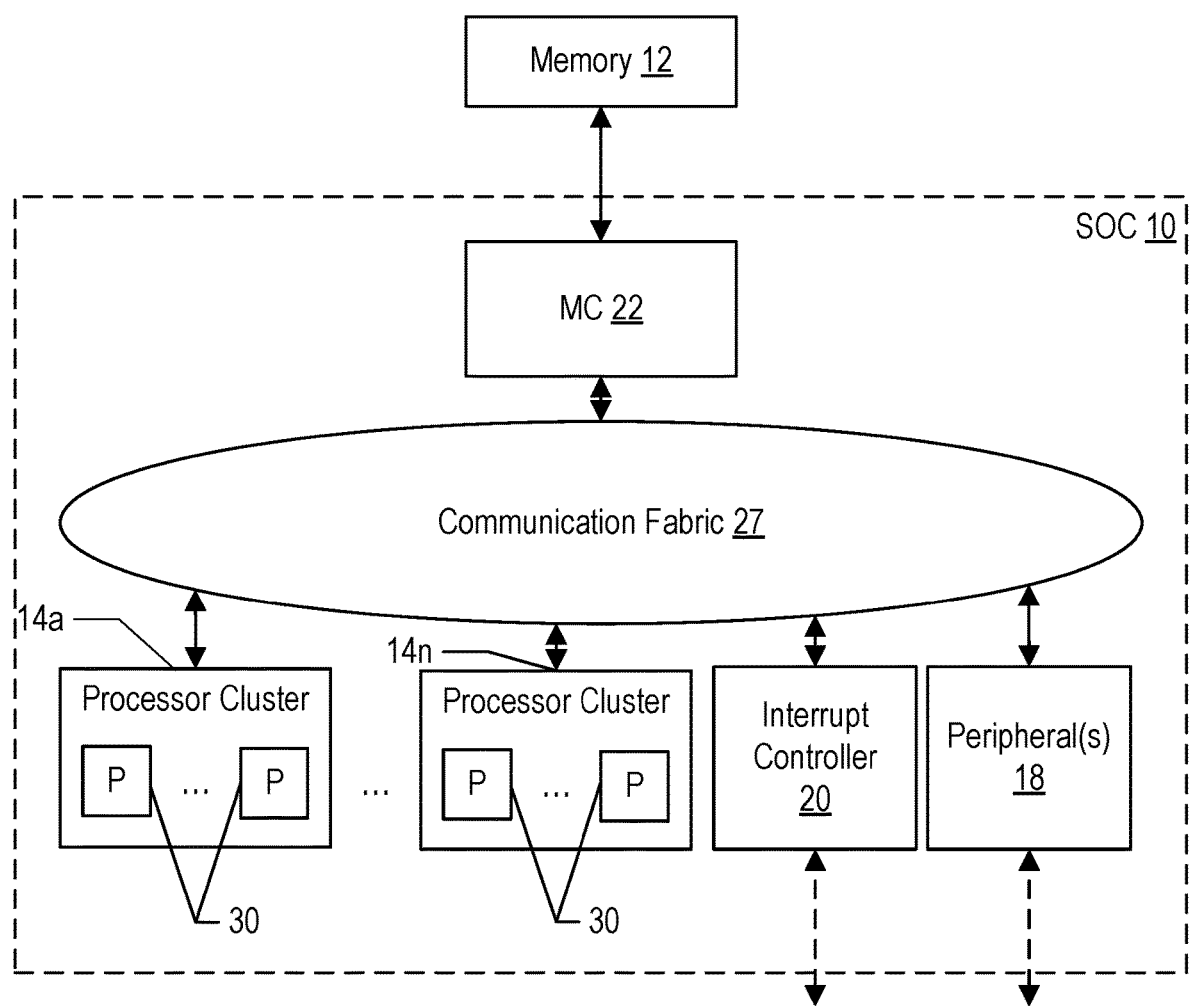
FIG. 28 is a block diagram of one embodiment of system on a chip (SOC) that may include one or more processors shown in FIG. 27.

Turning now to FIG. 28, a block diagram one embodiment of a system 10 that may include one or more processors 30 described in FIGS. 21-27. In the illustrated embodiment, the system 10 may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14a-14n, the interrupt controller 20, one or more peripheral components 18 (more briefly, "peripherals"), a memory controller 22, and a communication fabric 27. The components 14a-14n, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14a-14n may include the respective plurality of processors (P) 30 and the respective processors (P) 30 may further include a respective prediction circuit 156 as described in FIGS. 21-27. The processors 30 may form the central processing units (CPU(s)) of the SOC 10. In an embodiment, one or more processor clusters 14a-14n may not be used as CPUs.

As mentioned above, the processor clusters 14a-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding re-access of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 28, such as the processors 30 in each processor cluster 14a-14n may vary from embodiment to embodiment. Additionally, the number of processors 30 in one processor cluster 14a-14n may differ from the number of processors 30 in another processor cluster 14a-14n. There may be more or fewer of each component/subcomponent than the number shown in FIG. 28.

For purposes of illustrations, biased direct conditional control transfer prediction, biased indirect conditional control prediction, and biased conditional select prediction are described as implementations on respective processors 30, 30, and 30. Sometimes any combination of the features may be implemented on one single processor. For example, one processor may be designed to include any one, any two, or all of the biased direct conditional control prediction, biased indirect conditional control prediction, and biased conditional select prediction functions. Similarly, for purposes of illustration, the SOCs 10, 10, and 30 are described to respectively include one or more processors 30, 30, and 30. Sometimes one SOC may include one or more processors, and any of the processors of the SOC may include any combination of the prediction features. For example, one SOC may include two processors, where one processor may include any one, any two, or all of the biased direct conditional control prediction, biased indirect conditional control prediction, and biased conditional select prediction functions, and the other processor may include any one, any two, or all of the biased direct conditional control transfer instruction prediction, biased indirect conditional control transfer instruction prediction, and biased conditional select prediction functions. Sometimes the two processors may be "homogenous" processors having the same prediction feature(s). Alternatively sometimes the two processors may be "heterogenous" processors having different prediction feature(s).

Computer System

Figure 29:
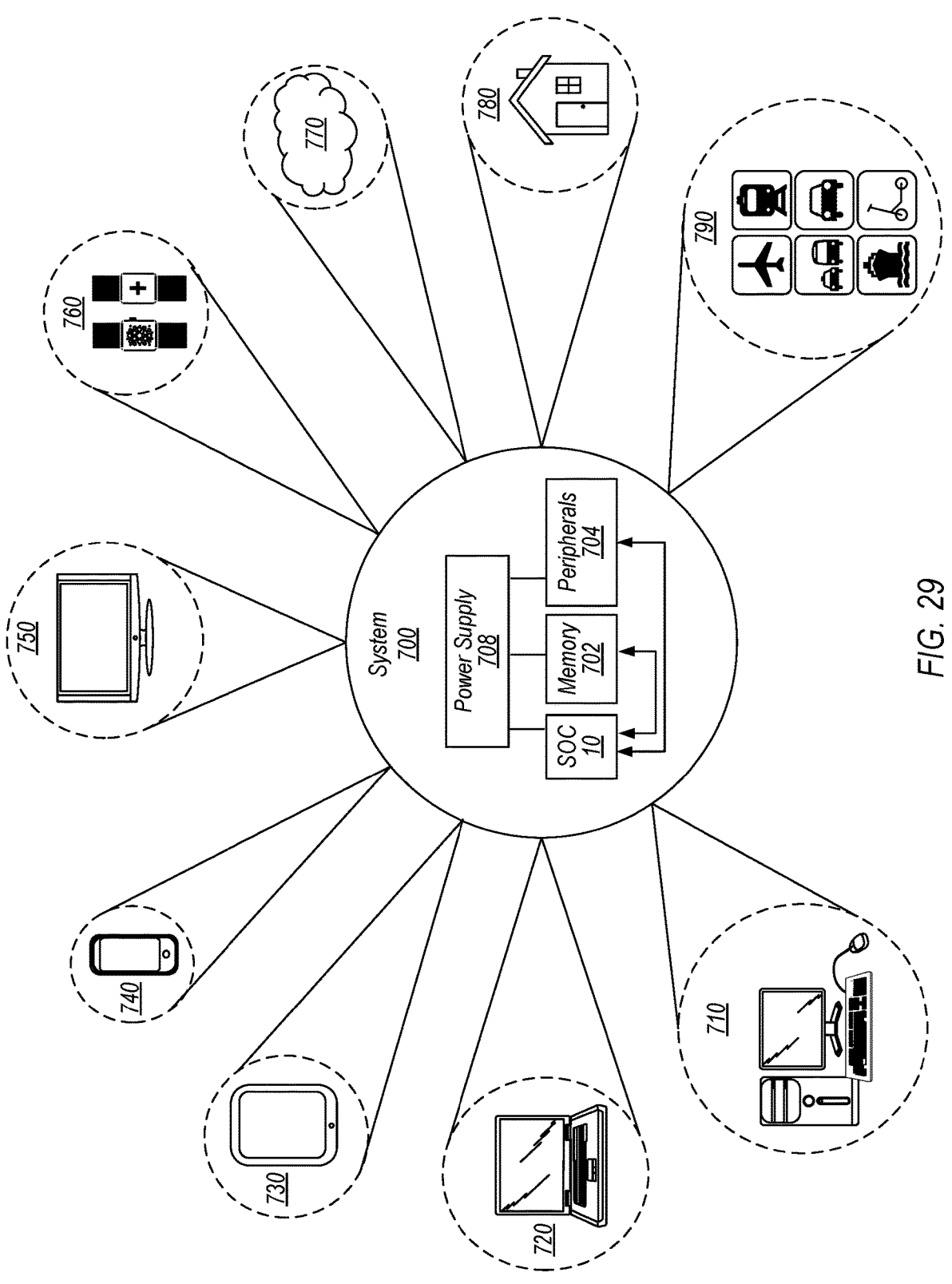
FIG. 29 is a block diagram of one embodiment of a system used in a variety of contexts.

Turning next to FIG. 29, a block diagram of one embodiment of a system 700 is shown. In the illustrated embodiment, the system 700 includes at least one instance of a system on a chip (SOC) 10, SOC 10, and/or SOC 10 coupled to one or more peripherals 704 and an external memory 702, as described in FIG. 10, FIG. 20, and FIG. 28. A power supply (PMU) 708 is provided which supplies the supply voltages to the SOC 10 as well as one or more supply voltages to the memory 702 and/or the peripherals 704. In some embodiments, more than one instance of the SOC 10 (e.g., the SOCs 10A-10q) may be included (and more than one memory 702 may be included as well). The memory 702 may include the memory 12, memory 12, and/or memory 12 illustrated in FIGS. 1-28, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

Computer Readable Storage Medium

Figure 30:
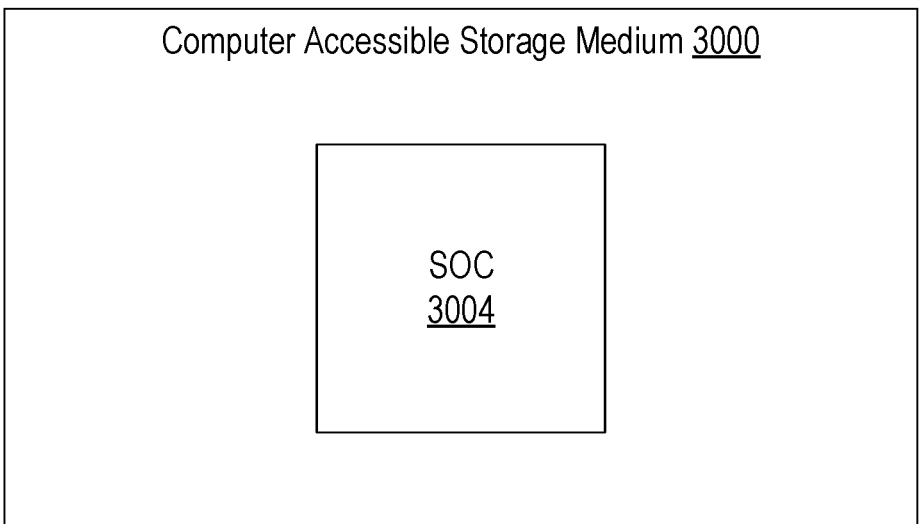
FIG. 30 is a block diagram of a computer accessible storage medium.

Turning now to FIG. 30, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 30 may store a database 3004 representative of the SOC 10 described above in FIGS. 10, 20, and 28. Generally, the database 3004 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 3004 on the computer accessible storage medium 3000 may be the netlist (with or without the synthesis library) or the data set, as desired.

While the computer accessible storage medium 3000 stores a representation of the SOC 10, other embodiments may carry a representation of any portion of the SOC 10, as desired. The database 3004 may represent any portion of the above.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to one other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor, comprising:
a prefetch circuit configured to prefetch instructions including an indirect control transfer instruction from memory to an instruction cache; and
a prediction circuit configured to perform, during prefetch of the indirect control transfer instruction to the instruction cache:
    predict whether the indirect control transfer instruction is biased; and
    direct, responsive to a prediction that the indirect control transfer instruction is biased, the prefetch circuit to store a predicted target address in the instruction cache to cause the indirect control transfer instruction to be executed, subsequent to fetching from the instruction cache, as an unconditional direct control transfer instruction according to the predicted bias.

2. The processor of claim 1, wherein to predict whether the indirect control transfer instruction is biased, the prediction circuit is configured to:
identify a prediction value for the indirect control transfer instruction from a prediction table which indicates that the indirect control transfer instruction is biased or non-biased; and
provide the prediction based on the prediction value for the indirect control transfer instruction.

3. The processor of claim 2, wherein the prediction table comprises one or more entries corresponding respectively to one or more indirect control transfer instructions, and wherein an entry for the indirect control transfer instruction comprises:
an index associated with the indirect control transfer instruction;
the prediction value for the indirect control transfer instruction indicating whether the indirect control transfer instruction is biased or non-biased; and
a predicted target address of a next instruction of the indirect control transfer instruction.

4. The processor of claim 3, wherein to cause the indirect control transfer instruction to be executed as an unconditional direct control transfer instruction, the prediction circuit is configured to cause the indirect control transfer instruction to be recoded to the unconditional direct control transfer instruction indicating the predicted target address of the next instruction.

5. The processor of claim 3, wherein the index associated with the indirect control transfer instruction is generated based on hashing an address associated with the indirect control transfer instruction.

6. The processor of claim 3, wherein to generate the entry for the indirect control transfer instruction, the prediction circuit is configured to:
determine whether the prediction table includes an entry corresponding to the indirect control transfer instruction;
responsive to a determination that the prediction table does not include the entry corresponding to the indirect control transfer instruction:
    obtain an actual target address of the indirect control transfer instruction;
    set the prediction value to a first value indicating that the indirect control transfer instruction is biased; and
    store, based on the actual target address, a predicted target address of a next instruction in the prediction table; and
responsive to a determination that the prediction table includes the entry for the indirect control transfer instruction and the prediction value of the entry is the first value:
    obtain the actual target address of the condition of the indirect control transfer instruction;
    determine whether the predicted target address matches the actual target address; and
    responsive to a determination that the predicted target address does not match the actual target address, update the prediction value from the first value to a second value to indicate that the indirect control transfer instruction is non-biased; and
responsive to a determination that the prediction table includes the entry for the indirect control transfer instruction and the prediction value of the entry is the second value, maintain the prediction value as the second value.

7. The processor of claim 6, wherein responsive to the determination that the predicted target address does not match the actual target address, the prediction circuit is configured to cause one or more other instructions to be fetched by the prefetch circuit from the memory to the instruction cache.

8. The processor of claim 1, wherein the instructions prefetched to the instruction cache include a second indirect control transfer instruction, and wherein the prediction circuit is further configured to:
during fetch of the second indirect control transfer instruction to the instruction cache, determine whether the second indirect control transfer instruction satisfies prediction constraints, wherein to determine whether the second indirect control transfer instruction satisfies the prediction constraints the prediction circuit is configured to:
    determine that the indirect control transfer instruction is one of one or more specific types of indirect control transfer instructions supported by the prediction circuit;
    determine that one or more registers specified by the indirect control transfer instruction is one or more of a plurality of specific registers supported by the prediction circuit; and
    determine that an address offset specified by the second indirect control transfer instruction is within a specific range;
responsive to a determination that the second indirect control transfer instruction does not satisfy the prediction constraints:
    determine that the second indirect control transfer is fetched out of the instruction cache; and during fetch of the second indirect control transfer instruction out of the instruction cache, predict whether the second indirect control transfer instruction is biased using a second prediction table separate from the prediction table that is used for the bias prediction during fetch of the second indirect control transfer instruction to the instruction cache.

9. The processor of claim 1, wherein the prediction circuit is configured to:

determine, prior to predicting whether the indirect control transfer instruction is biased, that the indirect control transfer instruction is one of one or more specific types of indirect control transfer instructions supported by the prediction circuit.

10. The processor of claim 1, wherein the prediction circuit is configured to:

determine, prior to predicting whether the indirect control transfer instruction is biased, that one or more registers specified by the indirect control transfer instruction is one or more of a plurality of specific registers supported by the prediction circuit.

11. The processor of claim 1, wherein a prediction that the indirect control transfer instruction is biased indicates that the indirect control transfer instruction is predicted to always branch to a particular target address for executing a next instruction.

12. A system, comprising:

one or more processors individually comprising an instruction cache;

memory configured to store instructions; and a display configured to display images;

wherein the one or more processors individually comprise:

a prefetch circuit configured to prefetch instructions including an indirect control transfer instruction from memory to an instruction cache; and a prediction circuit configured to perform, during prefetch of the indirect control transfer instruction to the instruction cache:

predict whether the indirect control transfer instruction is biased; and responsive to a prediction that the indirect control transfer instruction is biased, direct the prefetch circuit to store a predicted target address in the instruction cache to cause the indirect control transfer instruction to be executed, subsequent to fetching from the instruction cache, as, an unconditional direct control transfer instruction according to the predicted bias.

13. The system of claim 12, wherein to predict whether the indirect control transfer instruction is biased, the prediction circuit is configured to:

identify a prediction value for the indirect control transfer instruction from a prediction table, which indicates that the indirect control transfer instruction is biased or non-biased; and provide the prediction based on the prediction value for the indirect control transfer instruction.

14. The system of claim 13, wherein the prediction table comprises one or more entries corresponding respectively to one or more indirect control transfer instructions, and wherein an entry for the indirect control transfer instruction comprises:

an index associated with the indirect control transfer instruction;

the prediction value for the indirect control transfer instruction indicating whether the indirect control transfer instruction is biased or non-biased; and a predicted target address of a next instruction of the indirect control transfer instruction.

15. The system of claim 14, wherein to generate the entry for the indirect control transfer instruction, the prediction circuit is configured to:

determine whether the prediction table includes an entry corresponding to the indirect control transfer instruction;

responsive to a determination that the prediction table does not include the entry corresponding to the indirect control transfer instruction:

obtain a resolution result of the indirect control transfer instruction;

set the prediction value to a first value indicating that the indirect control transfer instruction is biased; and store, based on the resolution result, a predicted target address of a next instruction in the prediction table; and responsive to a determination that the prediction table includes the entry for the indirect control transfer instruction and the prediction value of the entry is the first value:

obtain a resolution result of the condition of the indirect control transfer instruction;

determine whether the predicted target address matches an actual target address indicated by the resolution result; and responsive to a determination that the predicted target address does not match the actual target address, update the prediction value from the first value to a second value to indicate that the indirect control transfer instruction is non-biased; and responsive to a determination that the prediction table includes the entry for the indirect control transfer instruction and the prediction value of the entry is the second value, maintain the prediction value as the second value.

16. The system of claim 12, wherein the instructions fetched to the instruction cache include a second indirect control transfer instruction, and wherein the prediction circuit is further configured to:

during fetch of the second indirect control transfer instruction to the instruction cache, determine whether the second indirect control transfer instruction satisfies prediction constraints, wherein to determine whether the second indirect control transfer instruction satisfies the prediction constraints the prediction circuit is configured to:

determine that the indirect control transfer instruction is one of one or more specific types of indirect control transfer instructions supported by the prediction circuit;

determine that one or more registers specified by the indirect control transfer instruction is one or more of a plurality of specific registers supported by the prediction circuit; and determine that an address offset specified by the second indirect control transfer instruction is within a specific range;

responsive to a determination that the second indirect control transfer instruction does not satisfy the prediction constraints:

determine that the second indirect control transfer is fetched out of the instruction cache; and during fetch of the second indirect control transfer instruction out of the instruction cache, predict whether the second indirect control transfer instruction is biased using a second prediction table separate from the prediction table that is used for the bias prediction during fetch of the second indirect control transfer instruction to the instruction cache.

17. A method, comprising:

prefetching instructions, including an indirect control transfer instruction, by a prefetch circuit of a processor from memory to an instruction cache;

performing, during prefetching of the indirect control transfer instruction to the instruction cache, by a bias prediction circuit of the processor:

predicting whether the indirect control transfer instruction is biased; and responsive to a prediction that the indirect control transfer instruction is biased, directing the prefetch circuit to store a predicted target address in the instruction cache to cause execution, by the processor subsequent to fetching from the instruction cache, of the indirect control transfer instruction as an unconditional direct control transfer instruction according to the predicted bias.

18. The method of claim 17, wherein predicting whether the indirect control transfer instruction is biased comprises performing, but the bias prediction circuit:

identifying a bias prediction for the indirect control transfer instruction from a prediction table, which indicates that the indirect control transfer instruction is biased or non-biased; and providing the prediction based on the bias prediction for the indirect control transfer instruction.

19. The method of claim 18, wherein the prediction table comprises one or more entries corresponding respectively to one or more indirect control transfer instructions, and wherein an entry for the indirect control transfer instruction comprises:

an index associated with the indirect control transfer instruction;

the bias prediction for the indirect control transfer instruction indicating whether the indirect control transfer instruction is biased or non-biased; and a predicted target address of a next instruction of the indirect control transfer instruction.

20. The method of claim 19, further comprising generating, by the bias prediction circuit, the entry for the indirect control transfer instruction, the generating comprising:

determining whether the prediction table includes an entry corresponding to the indirect control transfer instruction;

responsive to determining that the prediction table does not include the entry corresponding to the indirect control transfer instruction:

obtaining a resolution result of the indirect control transfer instruction;

setting the bias prediction to a first value indicating that the indirect control transfer instruction is biased; and storing, based on the resolution result, a predicted target address of a next instruction in the prediction table; and responsive to a determining that the prediction table includes the entry for the indirect control transfer instruction and the bias prediction of the entry is the first value:

obtaining a resolution result of the condition of the indirect control transfer instruction;

determining whether the predicted target address matches an actual target address indicated by the resolution result; and responsive to a determining that the predicted target address does not match the actual target address, updating the bias prediction from the first value to a second value to indicate that the indirect control transfer instruction is non-biased; and responsive to a determining that the prediction table includes the entry for the indirect control transfer instruction and the bias prediction of the entry is the second value, maintaining the bias prediction as the second value.

* * * * *